United States Patent
Jones et al.

(10) Patent No.: US 9,799,063 B2
(45) Date of Patent: Oct. 24, 2017

(54) PURCHASE GOOD OR SERVICE BASED UPON DETECTED ACTIVITY AND USER PREFERENCES IN WIRELESS COMMUNICATION DEVICE

(71) Applicants: Martin Kelly Jones, Vancouver (CA); Scott A. Horstemeyer, Atlanta, GA (US); Maria Khomenko, Pefferlaw (CA)

(72) Inventors: Martin Kelly Jones, Vancouver (CA); Scott A. Horstemeyer, Atlanta, GA (US); Maria Khomenko, Pefferlaw (CA)

(73) Assignee: IOT HUMAN MESSAGING LLC, Boynton Beach, FL (US)

( * ) Notice: Subject to any disclaimer, the term of this patent is extended or adjusted under 35 U.S.C. 154(b) by 432 days.

(21) Appl. No.: 14/621,473

(22) Filed: Feb. 13, 2015

(65) Prior Publication Data
US 2015/0170247 A1 Jun. 18, 2015

Related U.S. Application Data

(60) Division of application No. 14/180,558, filed on Feb. 14, 2014, now Pat. No. 9,141,974, which is a (Continued)

(51) Int. Cl.
*G06Q 30/00* (2012.01)
*G06Q 30/06* (2012.01)
(Continued)

(52) U.S. Cl.
CPC ......... *G06Q 30/0625* (2013.01); *G01P 13/00* (2013.01); *G01P 15/14* (2013.01);
(Continued)

(58) Field of Classification Search
CPC .......................... G06C 30/06; G06C 30/0625; G06C 30/0267; G06C 30/0268; G06C 30/0269;
(Continued)

(56) References Cited

U.S. PATENT DOCUMENTS

| 5,050,595 A | 9/1991 | Krafft |
| 5,304,215 A | 4/1994 | MacWhinnie et al. |

(Continued)

*Primary Examiner* — Yogesh C Garg
(74) *Attorney, Agent, or Firm* — Thomas | Horstemeyer, LLP

(57) ABSTRACT

Systems, apparatus, and methods are disclosed for accurately identifying one or more mobile thing motion activity (MTMAs; e.g., stationary, walking, running, biking, driving, etc.) associated with a mobile thing (MT; e.g., a person) using sensor data from one or more sensors associated with a wireless communication device (WCD) transported by the MT and for facilitating purchase of a good or service based at least in part upon the one or more MTMAs and one or more predefined user preferences. The sensor data from the one or more sensors (e.g., accelerometer, gyroscope, magnetometer, etc.) is designed to produce data indicative of physical movement of the WCD in three dimensions of a three dimensional (3D) space. In some embodiments, the one or more MTMAs are a plurality of instances of the same MTMA (e.g., a plurality of running sessions) and the purchase of the good or service (e.g., new running shoes) is initiated when a total time duration or total travel distance exceeds a predefined threshold (e.g., 300 hours or 500 miles, respectively), as defined by the WCD user in a predefined preference.

28 Claims, 62 Drawing Sheets

Related U.S. Application Data continuation-in-part of application No. 14/049,527, filed on Oct. 9, 2013, now Pat. No. 8,737,951, which is a continuation-in-part of application No. 12/354,927, filed on Jan. 16, 2009, now Pat. No. 8,559,914, which is a continuation-in-part of application No. PCT/US2013/056753, filed on Aug. 27, 2013, which is a continuation-in-part of application No. 13/935,672, filed on Jul. 5, 2013, now Pat. No. 9,049,558.

(60) Provisional application No. 61/021,447, filed on Jan. 16, 2008, provisional application No. 61/694,981, filed on Aug. 30, 2012, provisional application No. 61/695,001, filed on Aug. 30, 2012, provisional application No. 61/695,044, filed on Aug. 30, 2012, provisional application No. 61/843,077, filed on Jul. 5, 2013.

(51) Int. Cl.

| | | |
|---|---|---|
| *G01P 13/00* | (2006.01) | |
| *G08B 13/196* | (2006.01) | |
| *G08B 25/08* | (2006.01) | |
| *H04M 11/04* | (2006.01) | |
| *H04M 1/725* | (2006.01) | |
| *H04W 4/02* | (2009.01) | |
| *G06Q 30/02* | (2012.01) | |
| *G01P 15/14* | (2013.01) | |
| *G06F 17/30* | (2006.01) | |
| *G06Q 20/20* | (2012.01) | |
| *G06Q 20/32* | (2012.01) | |
| *H04W 8/22* | (2009.01) | |
| *G06F 3/0346* | (2013.01) | |
| *G09G 5/00* | (2006.01) | |
| *H04W 4/00* | (2009.01) | |
| *H04W 4/20* | (2009.01) | |
| *H04W 88/02* | (2009.01) | |

(52) U.S. Cl.
CPC ...... *G06F 3/0346* (2013.01); *G06F 17/30997* (2013.01); *G06Q 20/206* (2013.01); *G06Q 20/325* (2013.01); *G06Q 30/0267* (2013.01); *G08B 13/196* (2013.01); *G08B 25/08* (2013.01); *G09G 5/003* (2013.01); *H04M 1/72519* (2013.01); *H04M 1/72569* (2013.01); *H04M 11/04* (2013.01); *H04W 4/003* (2013.01); *H04W 4/02* (2013.01); *H04W 4/026* (2013.01); *H04W 4/027* (2013.01); *H04W 8/22* (2013.01); *G09G 2370/16* (2013.01); *H04M 2250/12* (2013.01); *H04W 4/206* (2013.01); *H04W 88/02* (2013.01)

(58) Field of Classification Search
CPC ...... H04W 4/027; H06F 3/0346; G01P 15/14; H04M 2250/12
USPC .............................................. 705/26.1, 26.62
See application file for complete search history.

(56) References Cited

U.S. PATENT DOCUMENTS

| | | |
|---|---|---|
| 5,409,500 A | 4/1995 | Dyrek |
| 5,897,580 A | 4/1999 | Silver |
| 6,083,254 A | 7/2000 | Evans |
| 6,522,265 B1 | 2/2003 | Hillman et al. |
| 7,499,797 B2 | 3/2009 | Mok |
| 7,917,768 B2 * | 3/2011 | Kahn ................. G06K 9/00348 |
| | | 713/156 |
| 8,737,951 B2 | 5/2014 | Jones |
| 2002/0070856 A1 | 6/2002 | Wolfe |
| 2002/0072348 A1 | 6/2002 | Wheeler et al. |
| 2003/0073930 A1 | 4/2003 | Morrissey et al. |
| 2004/0155781 A1 | 8/2004 | DeOme |
| 2005/0075116 A1 | 4/2005 | Laird et al. |
| 2007/0293186 A1 | 12/2007 | Lehmann |
| 2008/0147310 A1 | 6/2008 | Mok |
| 2009/0181640 A1 | 7/2009 | Jones |
| 2009/0191839 A1 | 7/2009 | Cannon, Jr. |
| 2009/0215426 A1 | 8/2009 | Dimsdale |
| 2010/0156788 A1 | 6/2010 | Nakaoka |
| 2011/0130112 A1 | 6/2011 | Saigh et al. |
| 2011/0227788 A1 | 9/2011 | Lundgren et al. |
| 2014/0065976 A1 | 3/2014 | Jones |

\* cited by examiner

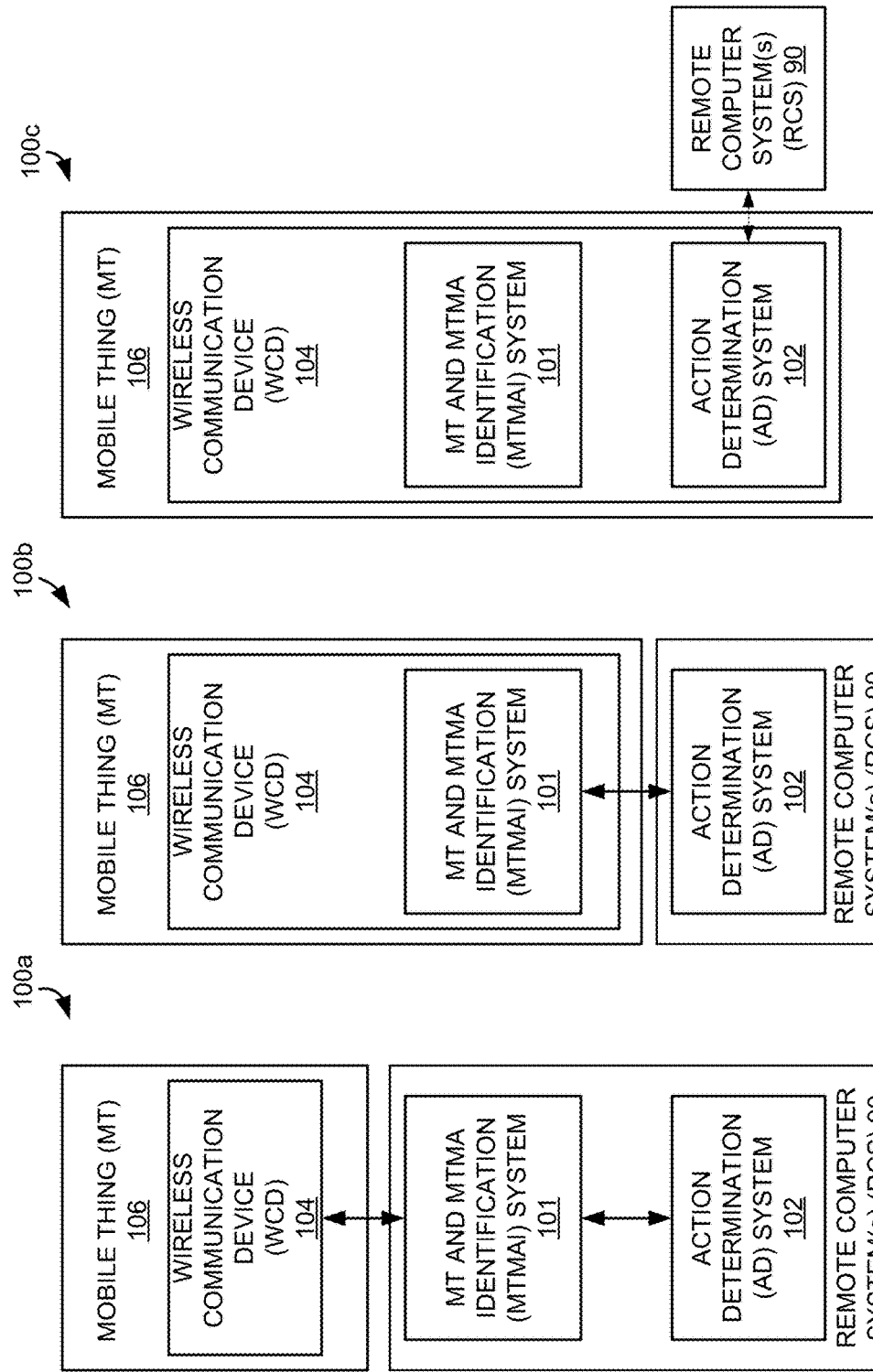

| TIME STAMP 120a | X-AXIS ACCELERATION 120b | Y-AXIS ACCELERATION 120c | Z-AXIS ACCELERATION 120d |

ACCEROMETER OUTPUT DATA STRUCTURE

FIG. 3A

| TIME STAMP 121a | ANGULAR RATE OF CHANGE ABOUT X-AXIS 121b | ANGULAR RATE OF CHANGE ABOUT Y-AXIS 121c | ANGULAR RATE OF CHANGE ABOUT Z-AXIS 121d |

GYROSCOPE OUTPUT DATA STRUCTURE

FIG. 3B

| TIME STAMP 122a | X-AXIS MAGNETIC FIELD STRENGTH 122b | Y-AXIS MAGNETIC FIELD STRENGTH 122c | Z-AXIS MAGNETIC FIELD STRENGTH 122d |

MAGNETOMETER OUTPUT DATA STRUCTURE

FIG. 3C

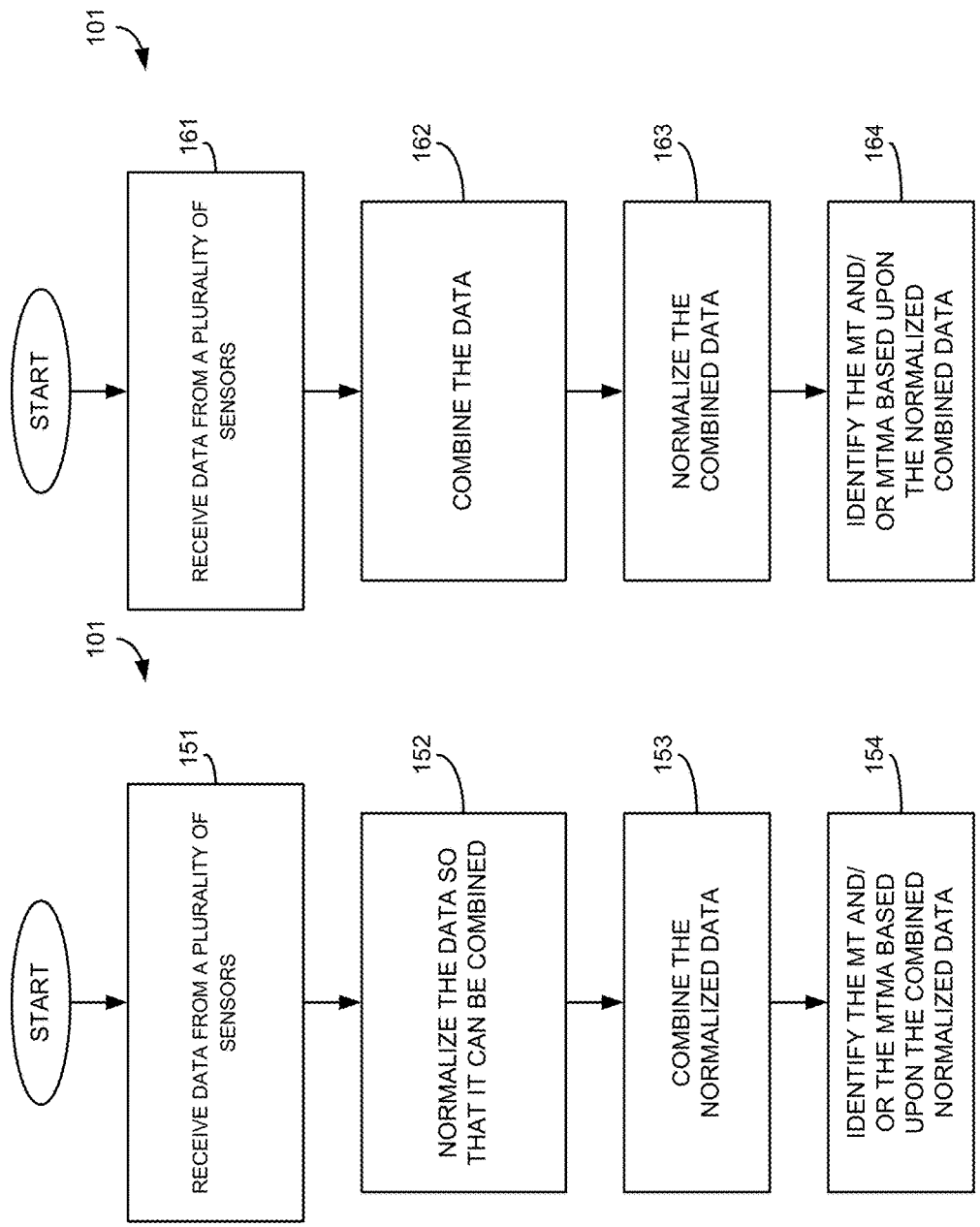

Determining a Users Activity From Accelerometer Data

Basic Parameters

1. Average, mean or median of the data set. A measure of where the data is centred.

2. Standard deviation or variance. A measure of how wide is the data distribution.

3. The above can be calculated from the whole interval or partial intervals. Such as average of the first half of data points or average of only one (or more) components.

4. Can also calculate average/variance of sets of points selected from the data. Such as the average of peak values. Also, can average several data intervals over prolonged period of time.

5. Averaging and Variance alone can obtain a certain degree of accuracy, requiring very little computation time and in some cases are sufficient.

6. It is possible to apply these basic methods without rotating the data.

7. After a certain accuracy is obtained with average and variance alone, it is very difficult to improve it without resorting to more sophisticated methods.

Advanced Parameters

1. Higher order moments, calculated about mean, zero or other value.

2. Root mean square (also can be used as an alternative to standard deviation) or generalized mean.

3. Signal Magnitude area, that is the area encompassed by the magnitude of the signal.

Fourier Transform (FT)

1. Identifying the peaks, which give the amplitude and frequency of all the oscillations presented in the signal.

2. Since the signal contains real values only, the FT will be symmetric, and only half can be used to save on computation costs.

3. The human motion, such as walking or running tends to have lower frequencies and motion with a transport (car, bike, etc.) has higher frequencies. Thus, the above techniques (averaging, rms, etc.) are applied in higher and lower frequency regions to compare their strength.

FIG. 6

WALKING

RUNNING

DRIVING

BIKING

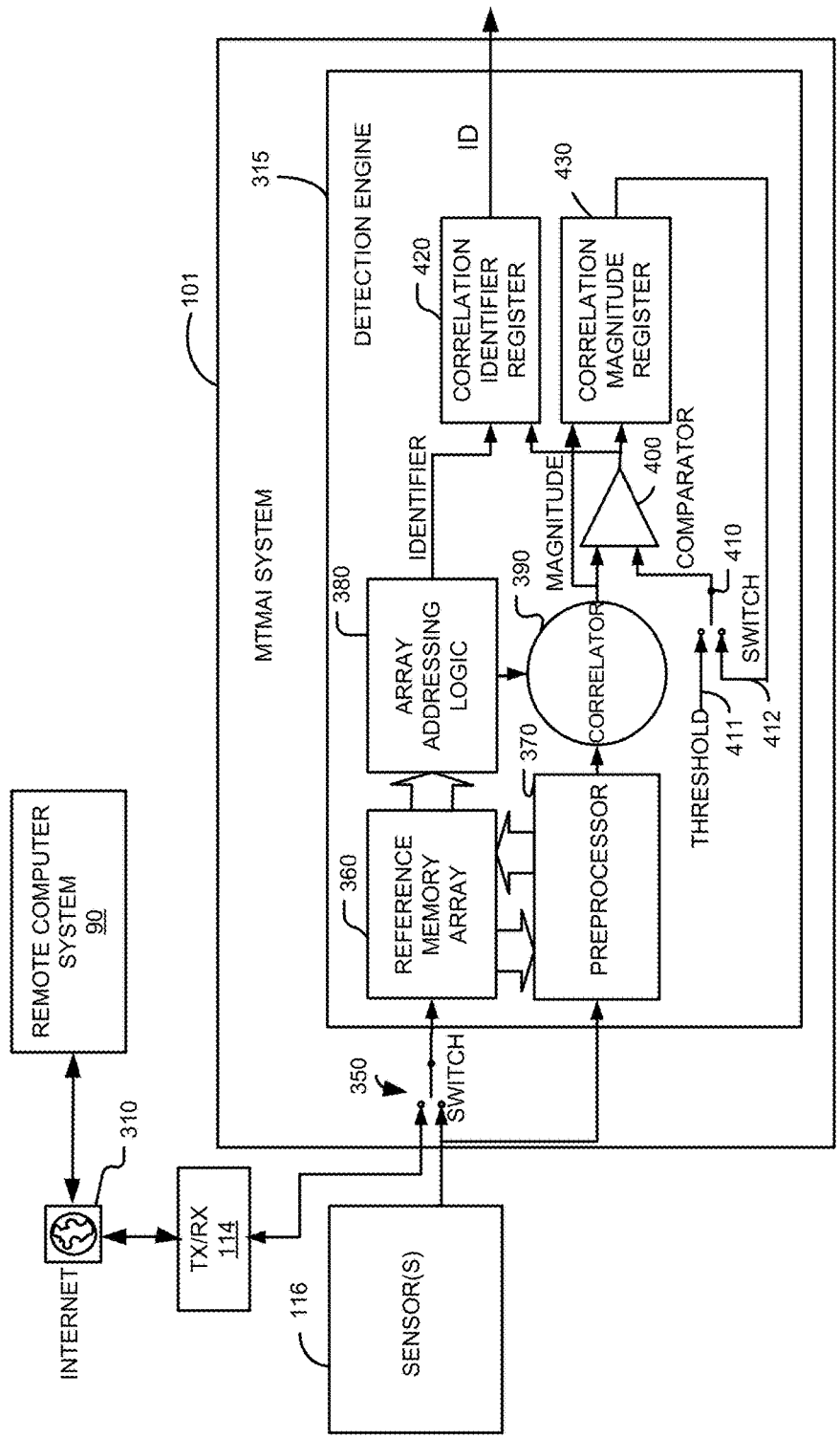

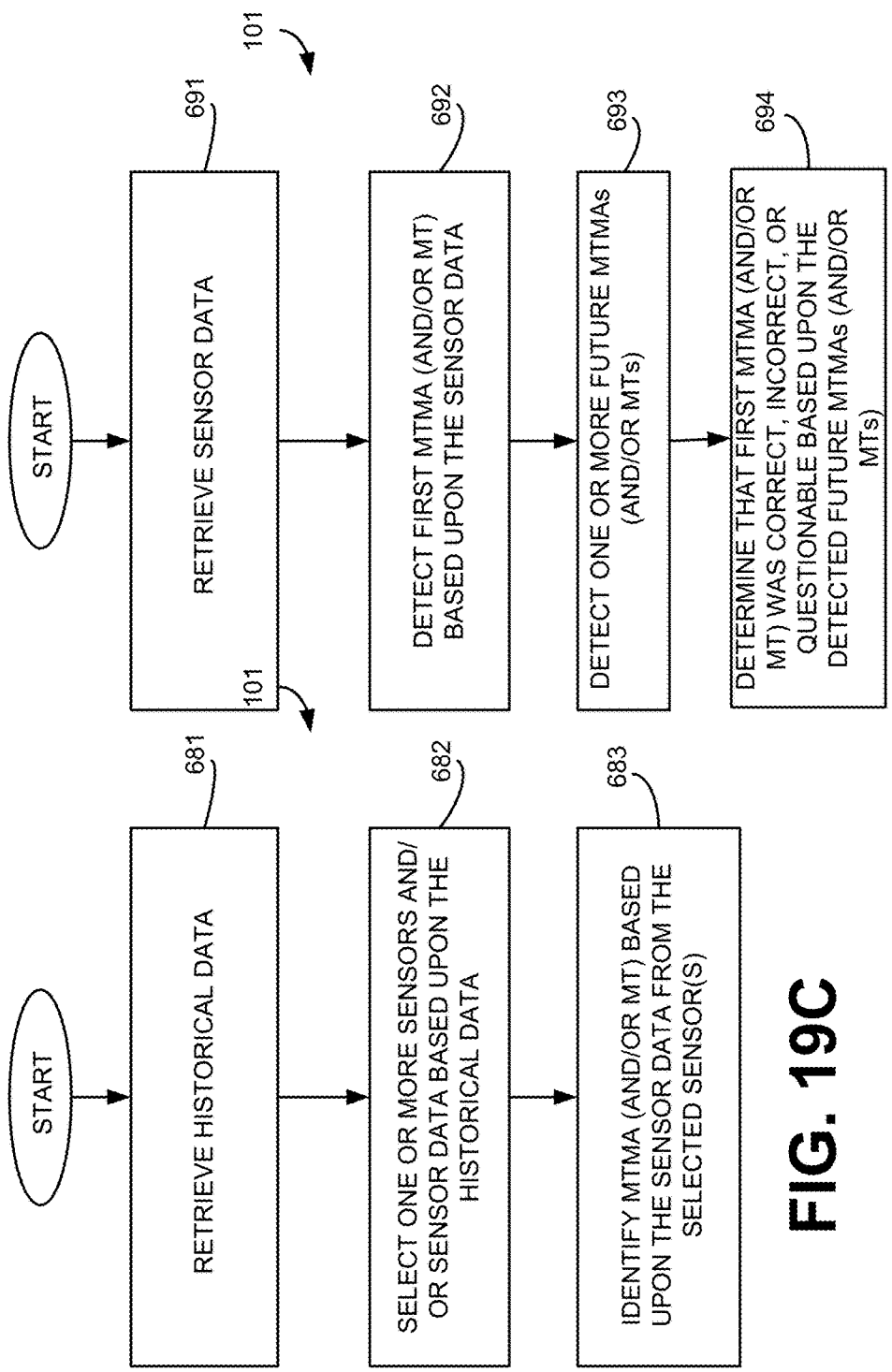

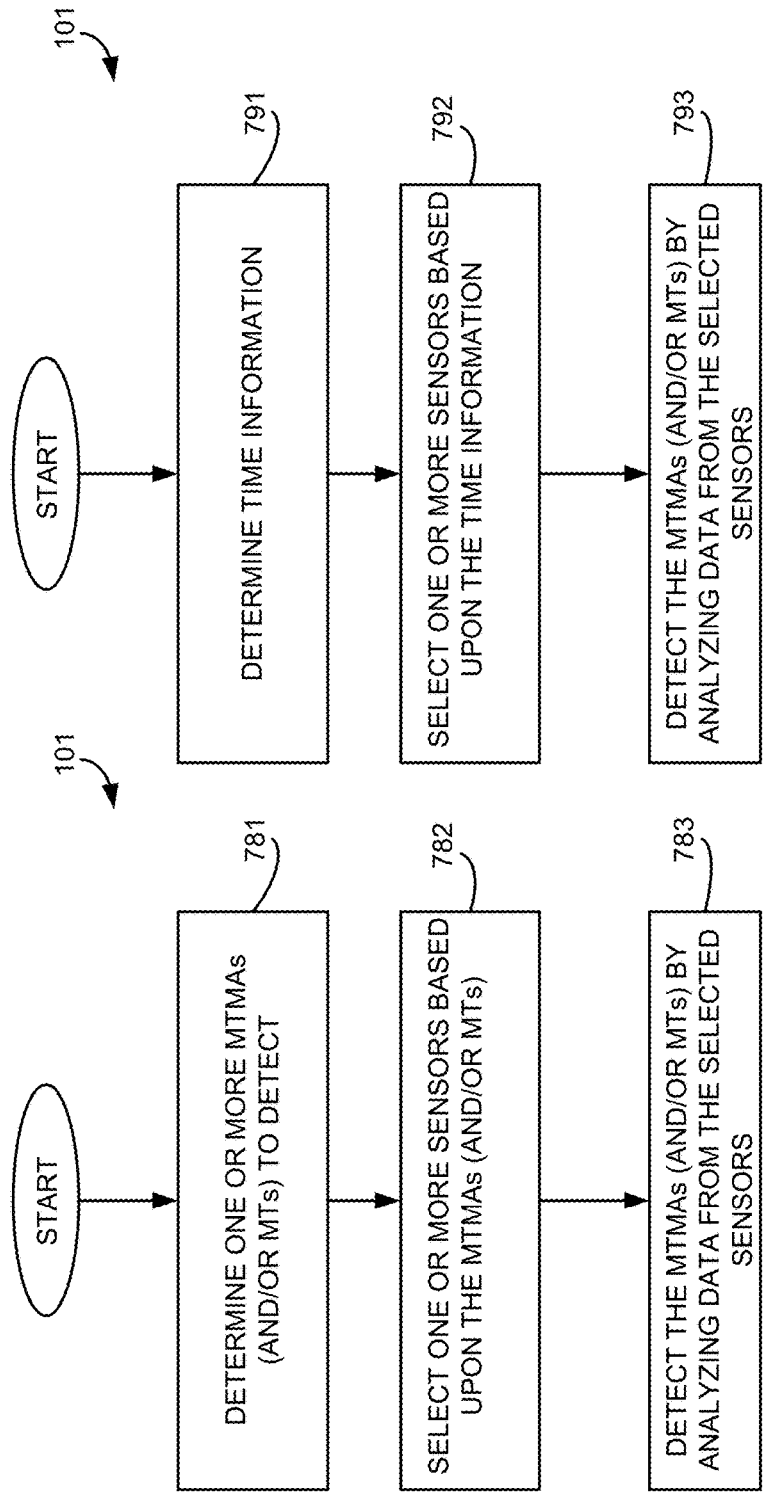

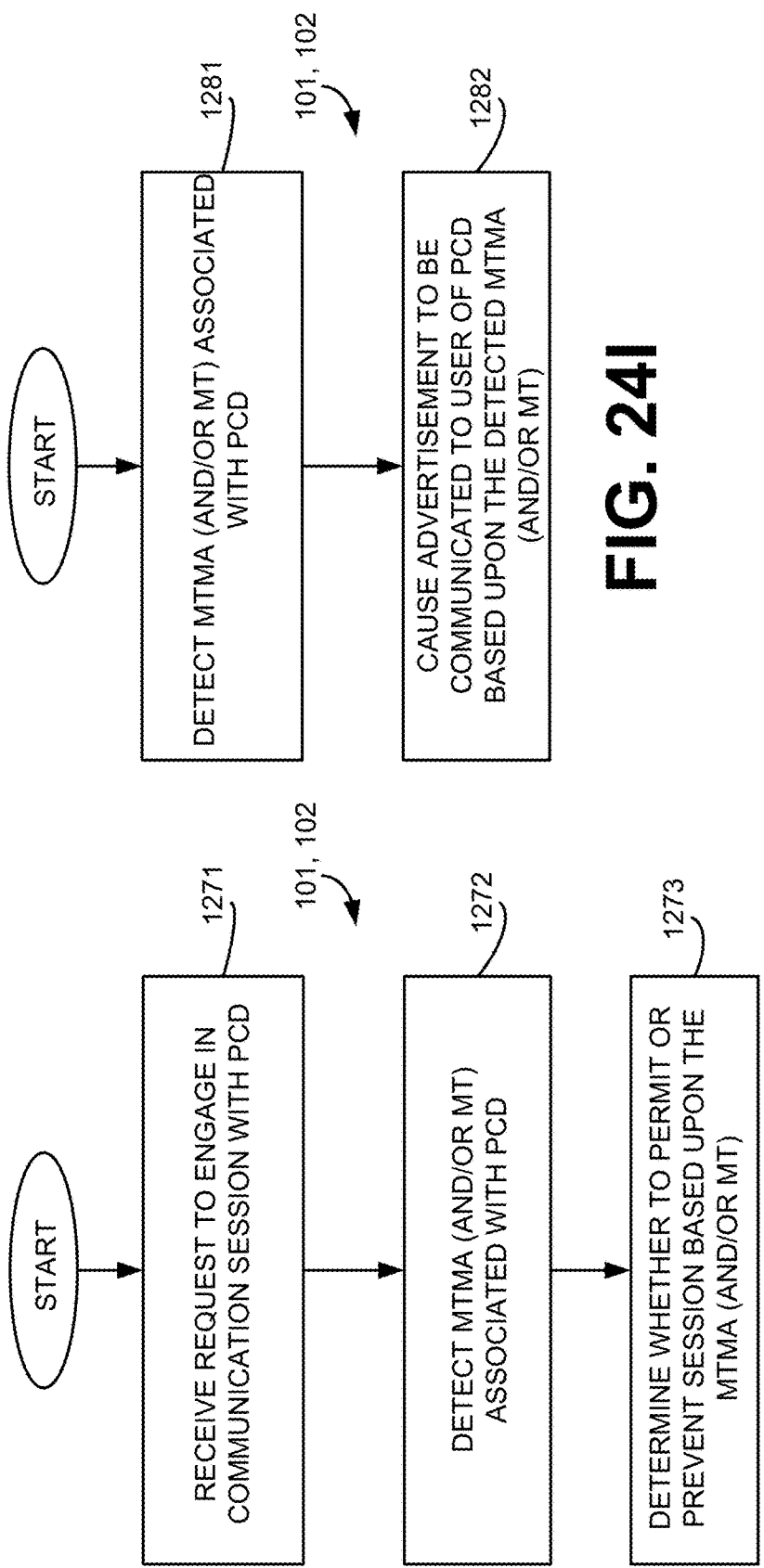

PURCHASE GOOD OR SERVICE BASED UPON DETECTED ACTIVITY AND USER PREFERENCES IN WIRELESS COMMUNICATION DEVICE

CLAIM OF PRIORITY

This application is a divisional of U.S. application Ser. No. 14/180,558, filed Feb. 14, 2014, which is:

(a) a continuation-in-part (CIP) of U.S. application Ser. No. 14/049,527, filed on Oct. 9, 2013, now U.S. Pat. No. 8,737,951, which is a continuation-in-part (CIP) of U.S. application Ser. No. 12/354,927, filed on Jan. 16, 2009, now U.S. Pat. No. 8,559,914, which claims priority to and the benefit of U.S. Provisional Application No. 61/021,447, filed on Jan. 16, 2008; and (b) a continuation-in-part (CIP) of International PCT Application No. PCT/US13/56753, filed on Aug. 27, 2013, which is a continuation-in-part (CIP) of U.S. application Ser. No. 13/935,672, filed Jul. 5, 2013, which claims priority to and the benefit of:

(1) U.S. Provisional Application No. 61/694,981, filed Aug. 30, 2012;

(2) U.S. Provisional Application No. 61/695,001, filed Aug. 30, 2012;

(3) U.S. Provisional Application No. 61/695,044, filed Aug. 30, 2012; and (4) U.S. Provisional Application No. 61/843,077, filed Jul. 5, 2013.

All of the foregoing applications are incorporated herein by reference in their entireties.

RELATED APPLICATION/PATENT

This application is related to the above-listed priority documents as well as the following: U.S. application Ser. No. 13/658,353, filed Oct. 23, 2012, now U.S. Pat. No. 8,452,273 and U.S. application Ser. No. 14/606,421, filed Jan. 27, 2015.

FIELD OF THE INVENTION

The present invention relates to electronic messaging technologies, and more particularly, to systems, methods, and apparatus for accurately identifying a mobile thing (MT) and/or a motion activity associated with the MT using sensor data, such as accelerometer data, gyroscope data, etc., from a wireless communication device (WCD) transported by the MT so as to enable or initiate a further one or more MT-identification-based and/or motion-based actions.

BACKGROUND

Electronic messaging and notification systems have been evolving over time, particularly in the last two decades. Much of this development has been due to the expansion of electronic networking, including the Internet, and the incorporation of more sophisticated capabilities in personal portable wireless communication devices (WCDs), for example, smartphones, tablets, mini tablets, etc.

SUMMARY OF THE INVENTION

After much thought, study, and analysis, the inventors have envisioned that the next generation of at least one species of electronic messaging systems should be based at least in part upon the detection of an identification of a mobile thing (MT; e.g., the name of a human being) that transports (e.g., carries, moves, etc.) a wireless communication device (WCD) and/or the detection of an identification of a mobile thing motion activity (MTMA; e.g., stationary, walking, running, biking, driving, etc.) in which the MT is engaged in the past, present, or future. Detecting the identity of the MT and/or detecting that the MT is currently involved in, has transitioned from, or has transitioned into an MTMA can lead to initiating more intelligent subsequent actions. Various inventions associated with this next generation of electronic messaging systems are set forth hereafter.

The present disclosure provides systems, methods, and apparatus for accurately identifying an MT and/or an MTMA (i.e., an MT, MTMA, or both) associated with an MT using data from one or more sensors, e.g., an accelerometer, gyroscope, microphone, magnetometer, GPS receiver, etc., of a WCD transported by the MT so as to enable or initiate a further one or more intelligent ID-based and/or activity-based actions.

One embodiment, among others, is a method for implementation in connection with a WCD that can be transported by a user. The method can be broadly summarized by the following steps: producing data, including accelerometer data, indicative of movement of the WCD in three dimensions of three dimensional (3D) space, storing user preferences in the memory that are selected or otherwise input by a user of the WCD, which define (a) a set of MTMAs to detect, (b) a predefined time or distance threshold for a specific MTMA of the defined set, and (c) an action to be intiated when one or more occurences of the specific MTMA have exceeded the predefined time or distance threshold, which involves (1) initiation of a communication session involving one or more data transfers with a remote computer system via the transceiver and (2) initiation of a purchase of a good or service during the communication session; tracking a duration, in terms of time or distance, of the one or more occurences of the specific MTMA based at least upon the data from the one or more sensors; and initiating the action involving the purchase of the good or service when the occurences exceed the predefined time or distance threshold. The steps of the foregoing method can be performed by the WCD, a remote computer system (RCS) communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by a user. The method can be broadly summarized by the following steps: analyzing information derived from sensor data, the sensor data from one or more sensors designed to produce data indicative of movement of a WCD in three dimensions of three dimensional (3D) space; storing a user preference in a memory that is input or selected by a user of the WCD, the user preference defining an action to be taken when one or more MTMAs associated with the user are detected, the action involving initiating a process for a purchase of a good or service during the communication session; detecting the one or more MTMAs based at least upon the analysis; and initiating the action involving the purchase based at least upon the detected one or more MTMAs and the user preference. In some embodiments, the one or more MTMAs are a plurality of instances of the same MTMA (e.g., a plurality of running sessions) and the purchase of the good or service (e.g., new running shoes) is initiated when a total time duration or total travel distance exceeds a predefined threshold (e.g., 300 hours or 500 miles, respectively), as defined by the WCD user in a predefined preference. The steps of the foregoing method can be performed by the WCD, a remote computer system (RCS) communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method can be broadly summarized by the following steps: receiving user preference information that defines a set of MTMAs associated with the MT (and/or a set of MTs) that a user wishes to detect; receiving data from a sensor associated with the WCD; and selecting an MTMA (and/or MT) in the set based at least in part upon the sensor data. The steps of the method can be performed by the WCD, a remote computer system (RCS) communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method can be broadly summarized by the following steps: receiving user preference information that identifies a set of MTMAs associated with the MT (and/or a set of MTs) that a user wishes to detect; receiving data from a set of sensors associated with the WCD; and identifying an MTMA (and/or MT) in the set of MTMAs (and/or MTs) based at least in part upon the data from the set of sensors. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing or receiving accelerometer data with an accelerometer based upon movement of the WCD; attempting to identify an MTMA of an MT transporting the WCD (and/or attempting to identify the MT itself) based upon the accelerometer data; requesting data from a different sensor when the MTMA (and/or MT) cannot be determined with sufficient accuracy or probability; and determining the MTMA (and/or MT) based upon the accelerometer data in addition to the different sensor data. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing or receiving data indicative of movement of the WCD with a plurality of sensors; selecting one or more of the plurality of sensors for identifying an MTMA of an MT that transports the WCD (and/or identifying the MT itself); acquiring data from the selected one or more sensors; and determining the MTMA (and/or MT) based upon the acquired data. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of providing or enabling (or initiating) access to a plurality of sensors designed to produce data indicative of movement of the WCD; selecting one or more of the sensors based upon time information (e.g., time of day, time of week, etc.); and identifying an MTMA associated with an MT that transports the WCD (and/or identifying the MT itself) based upon the produced sensor data from the selected one or more sensors. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of providing or enabling (or initiating) access to a plurality of sensors, each of the sensors designed to produce data indicative of movement of the WCD; selecting one or more of the sensors based upon one or more predefined user preferences; and identifying an MTMA associated with an MT that transports the WCD (and/or identifying the MT itself) based upon the produced sensor data from the selected one or more sensors. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing or receiving data indicative of movement of the WCD with one or more sensors; storing one or more user preferences, the user preferences defining an action to be taken when an MTMA associated with an MT that transports the WCD is detected (and/or the identity of the MT itself is detected); detecting the MTMA (and/or MT) based upon the produced sensor data from the one or more sensors; and initiating the action based upon the detected MTMA (and/or detected MT) and user preferences. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing or receiving data indicative of movement of the WCD with one or more sensors associated with the WCD; storing one or more user preferences, the user preferences defining one or more MTMAs (and/or MTs) to attempt to detect; and detecting one of the MTMAs (and/or MTs) based upon the produced sensor data from the one or more sensors. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of providing or enabling access to (or initiating initiating access to) a plurality of WCD sensors, each of the sensors designed to produce data based upon a sensed environmental condition; identifying an event in a local environment associated with the WCD by data produced by one or more of the sensors (first sensors); selecting one or more other sensors (second sensors) based upon the detected event, the other sensors designed to produce data indicative of movement of the WCD; and identifying an MTMA associated with an MT that transports the WCD (and/or identifying the MT itself) based upon the produced sensor data from the one or more other sensors (second sensors). The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of providing or enabling access to (or initiating access to) one or more WCD sensors designed to produce environment data based upon a sensed environmental condition and designed to produce movement data indicative of WCD movement; detecting transition to, transition from, or current involvement in an MTMA associated with an MT transporting the WCD (and/or detecting the MT itself), based upon the produced movement data from the one or more sensors; detecting an event in a local environment associated with the WCD based upon the produced environment data from the one or more of the sensors; initiating an action based upon MTMA detection (and/or MT detection) and the event detection. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing or receiving movement data indicative of WCD movement with one or more sensors that are associated with the WCD; detecting an MTMA associated with the MT transporting the WCD (and/or detecting the MT itself), based upon the produced movement data from the one or more sensors; detecting discontinuance or disruption of the MTMA (and/or existence of the MT); determining whether or not the MTMA (and/or existence of the MT) recommences within a predefined time period; and initiating an action based upon MTMA discontinuance (and/or discontinuance of MT detection) and lapse of the predefined time period. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing or receiving movement data indicative of WCD movement with one or more sensors associated with the WCD; detecting an MTMA associated with the MT transporting the WCD (and/or detection of the MT itself), based upon the produced movement data from the one or more sensors; detecting discontinuance or disruption of the MTMA (and/or MT identification); requesting a user input; and initiating an action based upon lack of the user input and lapse of a predefined time period. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling access to data from one or more sensors indicative of movement of the WCD; identifying an MTMA of the MT (and/or identifying the MT itself) based upon the data; communicating the identified MTMA to the MT (e.g., a human being user) and requesting confirmation from the MT that the identified MTMA is correct; and initiating or refraining from initiating a communication session with a remote communication device to request an action based upon whether or not the confirmation is received from the MT. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling access to (or initiating access to) data indicative of movement of the WCD with one or more sensors associated with the WCD; identifying a first MTMA associated with the MT (and/or identifying a first MT) based upon the produced data; and identifying a second MTMA (and/or identifying a second MT) based upon the produced data after a predetermined time period has lapsed since the first MTMA identification (and/or first MT identification). The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD with one or more sensors associate with the WCD; identifying a first MTMA associated with the MT (and/or identifying a first MT) based upon the produced data; detecting an event in a local environment of the WCD; and identifying a second MTMA (and/or second MT) based upon the produced data after detection of the event. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data produced directly or indirectly with one or more sensors associated with the WCD; identifying a first MTMA associated with the MT based upon the produced data; and identifying a second MTMA (and/or second MT), subsequent to the first MTMA identification (and/or first MT identification), based at least in part upon the produced data and the first MTMA Identification (and/or first MT identification). The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data produced directly or indirectly with one or more sensors associated with the WCD; receiving a message indicating that a remote MT (e.g., a human being user) is involved in an MTMA; and determining whether or not a local MT (e.g., a human being user) associated with the WCD is involved in the MTMA of the remote MT based upon the produced data. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data produced directly or indirectly with one or more sensors associated with the WCD; receiving a message indicating that a remote MT (e.g., a human being user) is involved in an MTMA; and identifying a local MTMA of a local MT (e.g., a human being user) based upon the produced data and the remote MTMA. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data produced directly or indirectly with one or more sensors associated with the WCD; detecting a plurality of MTMAs (for example, a specific succession from a first MTMA to a second MTMA; and/or detecting a plurality of MTs) based upon the produced data; and initiating a communication session with a remote communication device to request an action based upon the identification of the plurality of MTMAs (and/or MTs). The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data produced directly or indirectly with one or more sensors associated with the WCD; storing historical data; selecting one or more of the sensors based upon the historical data; and identifying an MTMA associated with the MT (and/or identifying the MT itself) based upon the produced sensor data from the one or more sensors. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data produced directly or indirectly with one or more sensors associated with the WCD; storing historical data; and identifying an MTMA associated with the MT (and/or identifying the MT itself) based upon the produced sensor data from the one or more sensors and the historical data. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data produced directly or indirectly with one or more sensors associated with the WCD; identifying a plurality of sessions of an MTMA (same or different) associated with the MT (and/or identifying a plurality of MTs (same or different)) based upon the produced sensor data from the one or more sensors; initiating a communication session with a remote communication device to request an action based upon the identification of the plurality of MTMA sessions (and/or MT identifications/detections). The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data produced directly or indirectly with one or more sensors associated with the WCD; determining a length of a session of an MTMA associated with the MT (and/or determining a length of MT detection) based upon the produced sensor data from the one or more sensors; initiating a communication session with a remote communication device to request an action based upon the length of the MTMA session (and/or length of MT detection). The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to first and second data indicative of movement of the WCD, the first and second data produced directly or indirectly with one or more sensors associated with the WCD; determining reference data for defining a reference framework of at least two dimensions in space from the first data; normalizing the second data with the reference data; and identifying the MTMA (and/or MT itself) based upon the normalized second data. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to first reference data and first movement data indicative of movement of the WCD with a first sensor associated with the WCD; determining a reference framework of at least two dimensions in space from the reference data; normalizing the first movement data with the first reference data; producing, receiving, or enabling or initiating access to second reference data and second movement data indicative of movement of the WCD with a second sensor; normalizing the second movement data with the second reference data; combining the normalized first movement data and the normalized second movement data; identifying the MTMA (and/or MT itself) based upon the normalized first movement data and the normalized second movement data. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to reference data and first movement data indicative of movement of the WCD with a first sensor associated with the WCD; determining a reference framework of at least two dimensions in space from the reference data; normalizing the first movement data with the reference data; producing, receiving, or enabling or initiating access to second movement data indicative of movement of the WCD with a second sensor; normalizing the second movement data with the reference data; combining the normalized first movement data and the normalized second movement data; and identifying the MTMA (and/or MT itself) based upon the normalized first movement data and the normalized second movement data. The steps of the method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data derived directly or indirectly with a sensor associated with the WCD, the data produced at a sampling rate; and increasing the sampling rate to one or more other sampling rates when the MTMA (and/or MT) cannot be identified beyond a predefined probability until the MTMA (and/or MT) can be identified beyond the predefined probability. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of identifying a first MTMA (and/or first MT) based upon the data from one or more sensors associated with the WCD; determining that the identified MTMA (and/or the identified MT) is in error based upon one or more previous MTMAs (and/or previous MTs); and re-identifying the MTMA (and/or MT) as a second MTMA (and/or second MT) that is different than the first MTMA (and/or first MT) based upon the determined error. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data derived directly or indirectly with one or more sensors associated with the WCD; determining a contingent MTMA (and/or contingent MT) based upon an initial analysis of the sensor produced data; requesting commencement of at least one of a sequence of steps for implementation an action based upon the determined contingent MTMA (and/or the determined contingent MT), based upon a further analysis of the sensor produced data, concluding that the contingent MTMA (and/or contingent MT) is incorrect and cancelling the action by stopping the commencement of a further one or more steps of the sequence. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data derived directly or indirectly with one or more sensors associated with the WCD; identifying a first contingent MTMA and a second contingent MTMA (and/or a first contingent MT and a second contingent MT) based upon an initial analysis of the sensor produced data; requesting commencement of at least one of a first sequence of first steps for implementation a first action based upon the determined first contingent MTMA (and/or determined first contingent MT); requesting commencement of at least one of a second sequence of second steps for implementation a second action based upon the determined second contingent MTMA (and/or determined second contingent MT); based upon a further analysis of the sensor produced data (for example, based upon probabilities), determining that the first contingent MTMA (and/or first contingent MT) was incorrect, cancelling the first action by stopping the commencement of a further one or more first steps of the first sequence, and permitting the second action to be implemented. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data indicative of movement of the WCD, the data derived directly or indirectly with one or more sensors associated with the WCD, the data representing amplitude information in the time domain; transforming the data to frequency domain data, the frequency domain data representing amplitude information in the frequency domain; In the frequency domain data, identifying an ambiguous MTMA and a first certain MTMA (and/or an ambiguous MT and a first certain MT); filtering the first certain MTMA (and/or first certain MT) from the time domain data, in whole or in part, to produce better time domain data for better analyzing the ambiguous MTMA (and/or ambiguous MT); transforming the better time domain data to better frequency domain data; and identifying a second certain MTMA (and/or second certain MT) from the better frequency domain data. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data from one or more sensors associated with the WCD that is transported by the MT, the data indicative of movement of the WCD; correlating the movement data with a reference signature; and identifying an MTMA associated with the MT (and/or identifying the MT itself) based upon the correlation. The correlation can be a mathematical correlation or another type of comparison of arrays of magnitudes or vectors. The movement data and the reference signature can be a single or multi-dimensional array of magnitudes or vectors. The steps of the foregoing method can be performed by the WCD itself, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to a plurality of data streams from a respective plurality of sensors associated with a WCD that is transported by a MT, the data indicative of movement of the WCD; normalizing each data stream with respect to a reference; combining the normalized data streams; and identifying an MTMA associated with the MT (and/or identifying the MT itself) based upon the combined normalized data streams. The steps of the foregoing method can be performed by the WCD itself, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to a plurality of data streams from a respective plurality of sensors associated with a WCD that is transported by an MT, the data indicative of movement of the WCD; combining the data streams; normalizing the combined data stream with respect to a reference; identifying an MTMA associated with the MT (and/or identifying the MT itself) based upon the normalized combined data streams. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to data from each of a plurality of sensors associated with a WCD that is transported by a MT, the data indicative of movement of the WCD; and identifying an MTMA associated with the MT (and/or identifying the MT itself) based upon the data. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of receiving a request from a requestor to engage in a communication session with the WCD associated with the MT; detecting an MTMA pertaining to the MT associated with the WCD, based at least in part upon direct or indirect analysis of sensor data from one or more sensors associated with the WCD; and determining whether to permit or prevent consummation of the communication session based at least in part upon the detected MTMA. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD that is designed to detect a plurality of MTMAs associated with an MT and that is designed to communicate to a user or user designee upon occurrence of an incoming communication session request via one or more of a plurality of possible notification methods. The method comprises the steps of receiving a request from a requestor to engage in a communication session with the WCD associated with the MT; detecting an MTMA pertaining to the MT associated with the WCD from the plurality, based at least in part upon direct or indirect analysis of sensor data from one or more sensors associated with the WCD; and selecting one or more of the notification methods based at least in part upon the detected MTMA. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of detecting an MTMA pertaining to the MT associated with the WCD (and/or detecting the MT itself), based at least in part upon direct or indirect analysis of sensor data from one or more sensors associated with the WCD; and causing an appropriate advertisement to be communicated to the user of the WCD based at least in part upon the detected MTMA (and/or detected MT). The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of detecting an MTMA pertaining to the MT associated with the WCD (and/or detecting the MT itself), based at least in part upon direct or indirect analysis of sensor data from one or more sensors associated with the WCD; and activating and/or deactivating one or more programs and/or subsystems based at least in part upon the MTMA detection (and/or MT detection). An example would be to deactivate a power consuming program and/or subsystem (GPS receiver, WiFi transceiver, Bluetooth transceiver, cellular transceiver, etc.) to preserve battery power. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of detecting an MTMA pertaining to the MT associated with the WCD (and/or detecting the MT itself), based at least in part upon direct or indirect analysis of sensor data from one or more sensors associated with the WCD; and changing an operational characteristic of a computer program and/or subsystem based at least in part upon the MTMA detection (and/or MT detection). The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of producing, receiving, or enabling or initiating access to sensor data with one or more sensors associated with the WCD, the sensor data indicative of physical movement of the WCD in three dimensional space and including data sets comprising three movement values and a time value, each of the three movement values indicative of physical movement of the WCD relative to a respective axis in a three dimensional (3D) coordinate system at the time value; and determining an identification of the MT that is transporting the WCD based at least in part upon the sensor data. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps. Further note that the sensor data or a derivative thereof can be communicated from the WCD to an RCS, which is designed to determine the ID of the MT.

Another embodiment, among others, is a method for implementation in connection with a WCD that can be transported by an MT. The method comprises the steps of accessing identification information from an ID apparatus (e.g., credit, debit, or ATM card, passport, etc.) transported by the user with an identification verification device (IDVD), such as a point of sale (POS) device; accessing sensor information derived from one or more sensors associated with the WCD that is transported by the user; and determining whether the sensor information corresponds with the ID information. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in connection with a WCD that can be transported by an MT. The method comprises the steps of detecting an MTMA associated with an MT that transports the WCD; storing a media file; and associating metadata with the media file that is indicative of the MTMA (and/or ID of the MT). The media file is any image, audio, and/or video file. The steps of the foregoing method can be performed by the WCD, an RCS communicatively coupled to the WCD, or a combination of both. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Other systems, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWING FIGURES

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A is a block diagram illustrating an exemplary first set of embodiments of an MT/MTMA identification/action system in accordance with the present disclosure, wherein an MT and/or MTMA identification (MTMAI) system and an action determination (AD) system are implemented remotely from a wireless communication device (WCD) that is transported by the MT of FIG. 1.

FIG. 2B is a block diagram illustrating an exemplary second set of embodiments of an MT/MTMA identification/action system in accordance with the present disclosure, wherein the MTMAI system is implemented in or locally to the WCD and the AD system is implemented remotely from the WCD that is transported by the MT of FIG. 1.

FIG. 2C is a block diagram illustrating an exemplary third set of embodiments of an MT/MTMA identification/action system in accordance with the present disclosure, wherein the MTMAI system and the AD system are implemented in or locally to the WCD that is transported by the MT of FIG. 1.

FIG. 3A is an example of an output data structure from a three-axis accelerometer (x, y, z) that can be employed as one of the sensors of FIG. 2D.

FIG. 3B is an example of an output data structure from a three-axis gyroscope that can be employed as one of the sensors of FIG. 2D.

FIG. 3C is an example of an output data structure from a three-axis magnetometer that can be employed as one of the sensors of FIG. 2D.

FIG. 4D is a flowchart of an example of a fourth set of embodiments of the MTMAI system of FIG. 2D.

FIG. 4E is a flowchart of an example of a fifth set of embodiments of the MTMAI system of FIG. 2D.

FIG. 6 is a description of statistical parameters in the time domain and the frequency domain that can be utilized by the MTMAI system of FIG. 2D to identify an MT and/or an MTMA.

Figure 10A:
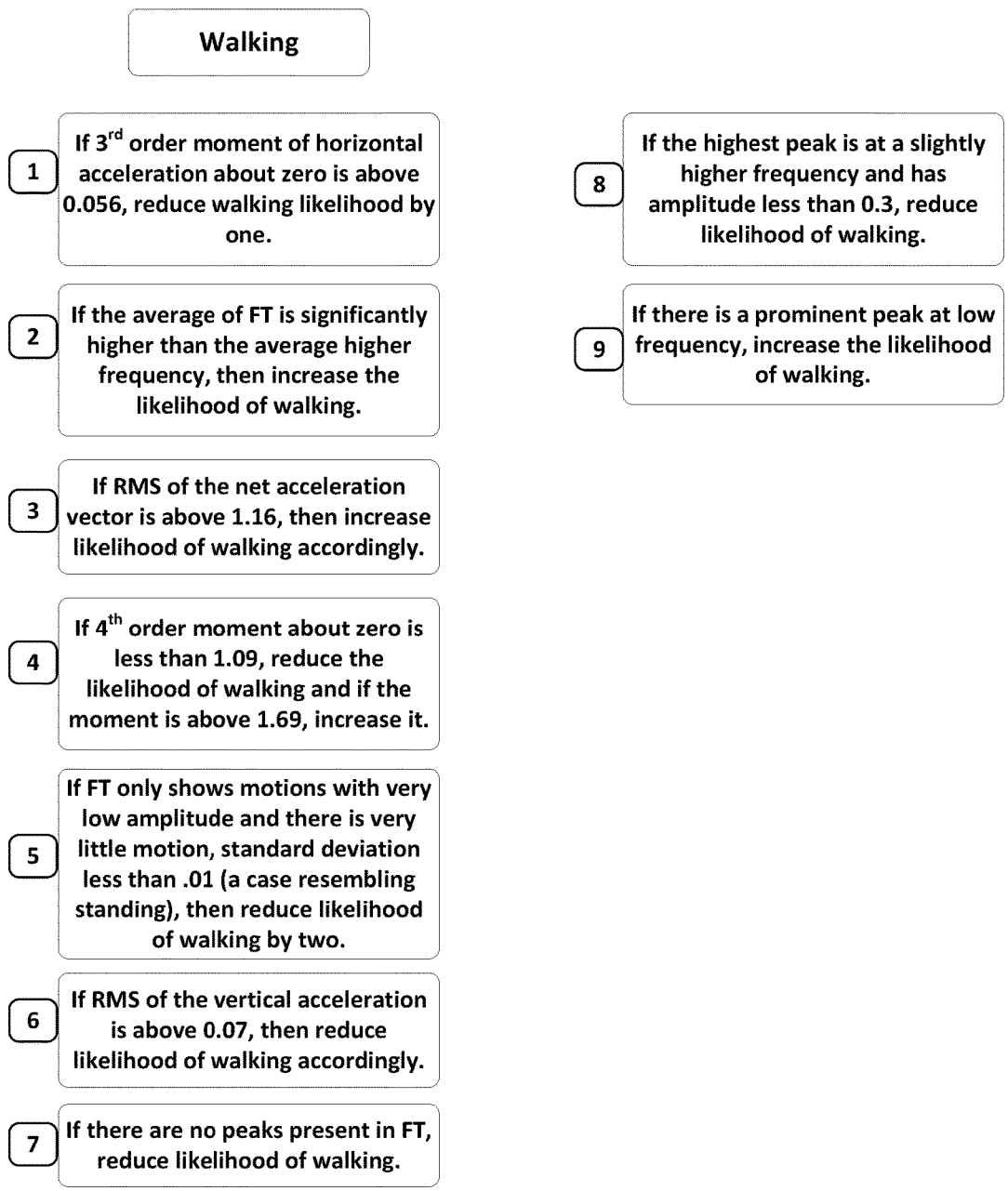
FIG. 10A is a description of parameters/methodology in the time domain and frequency domain that can be used by the MTMAI system of FIG. 2D to analyze walking in the exemplary methodology of FIG. 7.
Figure 10B:
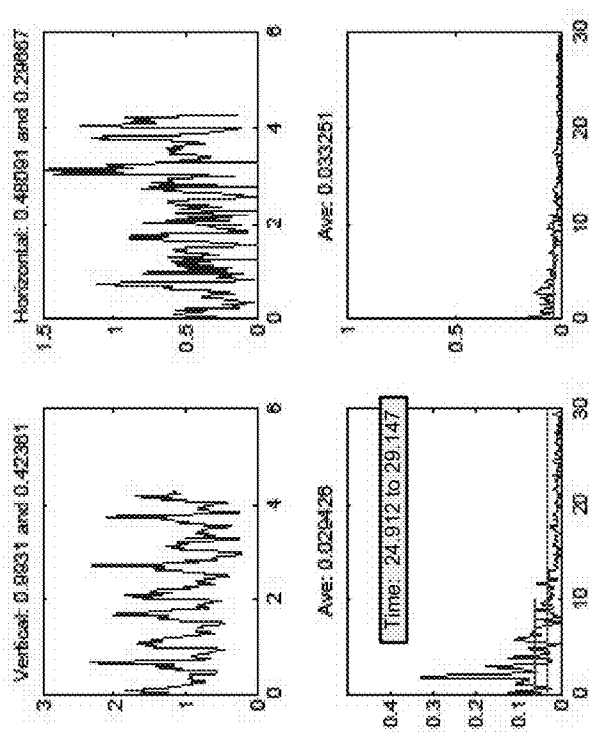

FIG. 10B is an example of time domain and frequency domain graphs, in connection with walking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 2D:
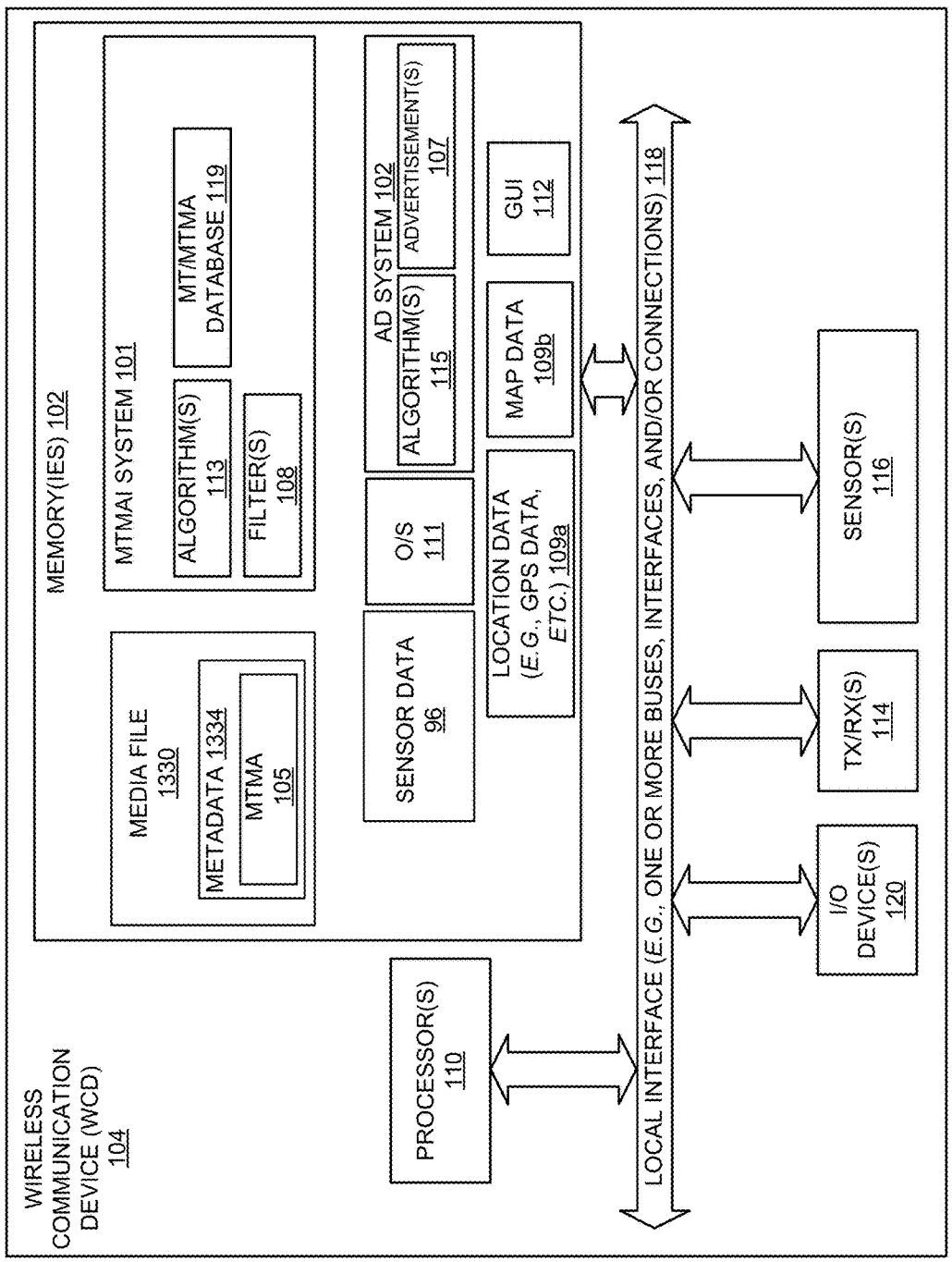
FIG. 2D is a block diagram illustrating an example of a computer system employing the architecture of FIG. 2C, wherein the MTMAI system and the AD system are implemented in software within the wireless communication device (WCD).
Figure 11A:
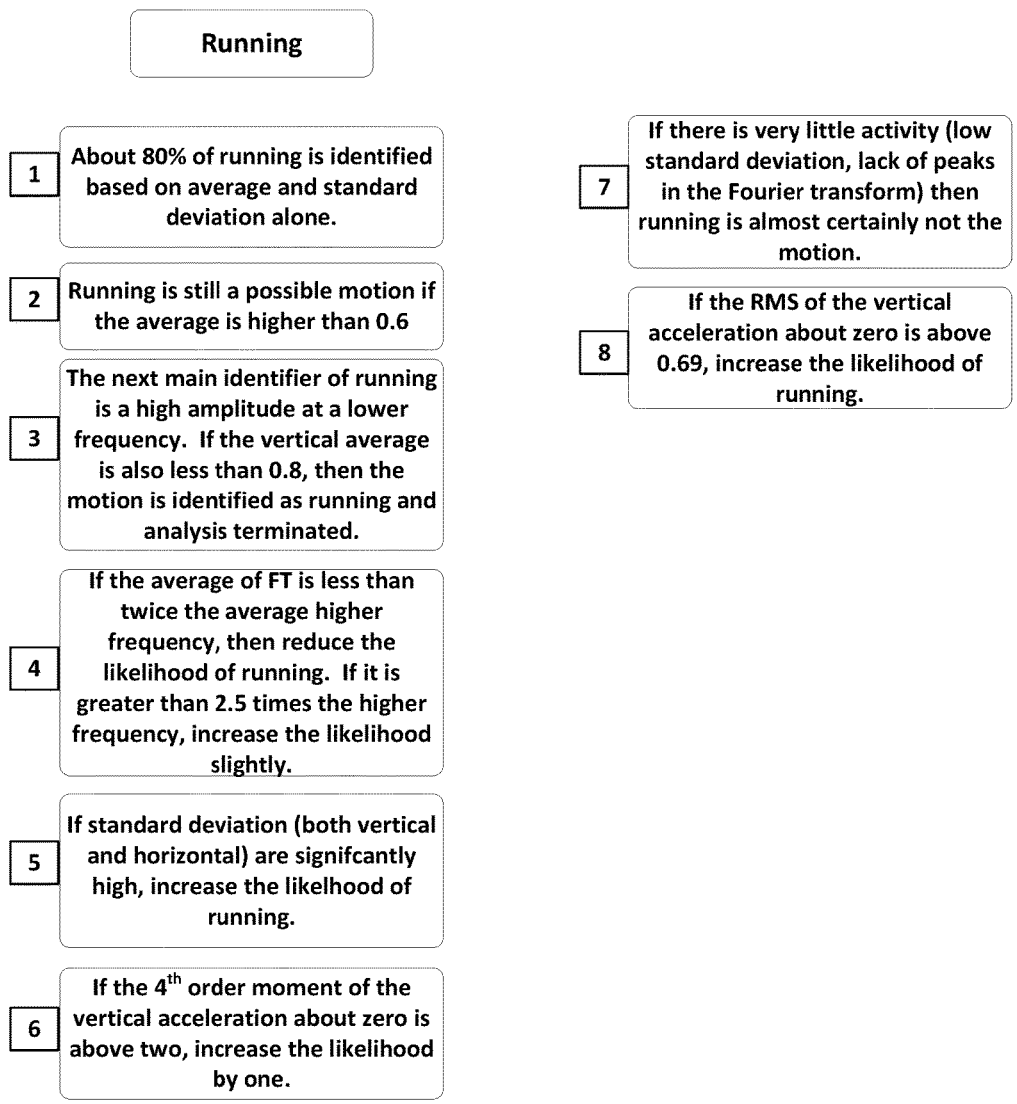

FIG. 11A is a description of parameters/methodology in the time domain and frequency domain that can be used by the MTMAI system of FIG. 2D to analyze running.

Figure 11B:
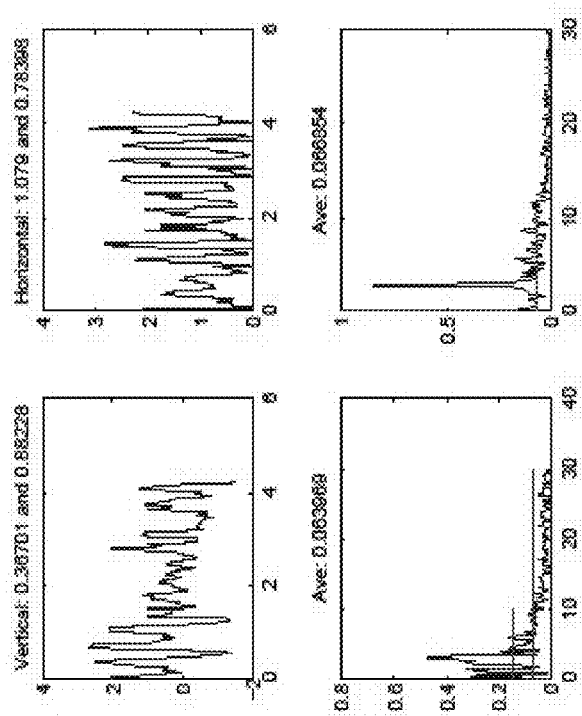

FIG. 11B is an example of time domain and frequency domain graphs, in connection with running, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 12A:
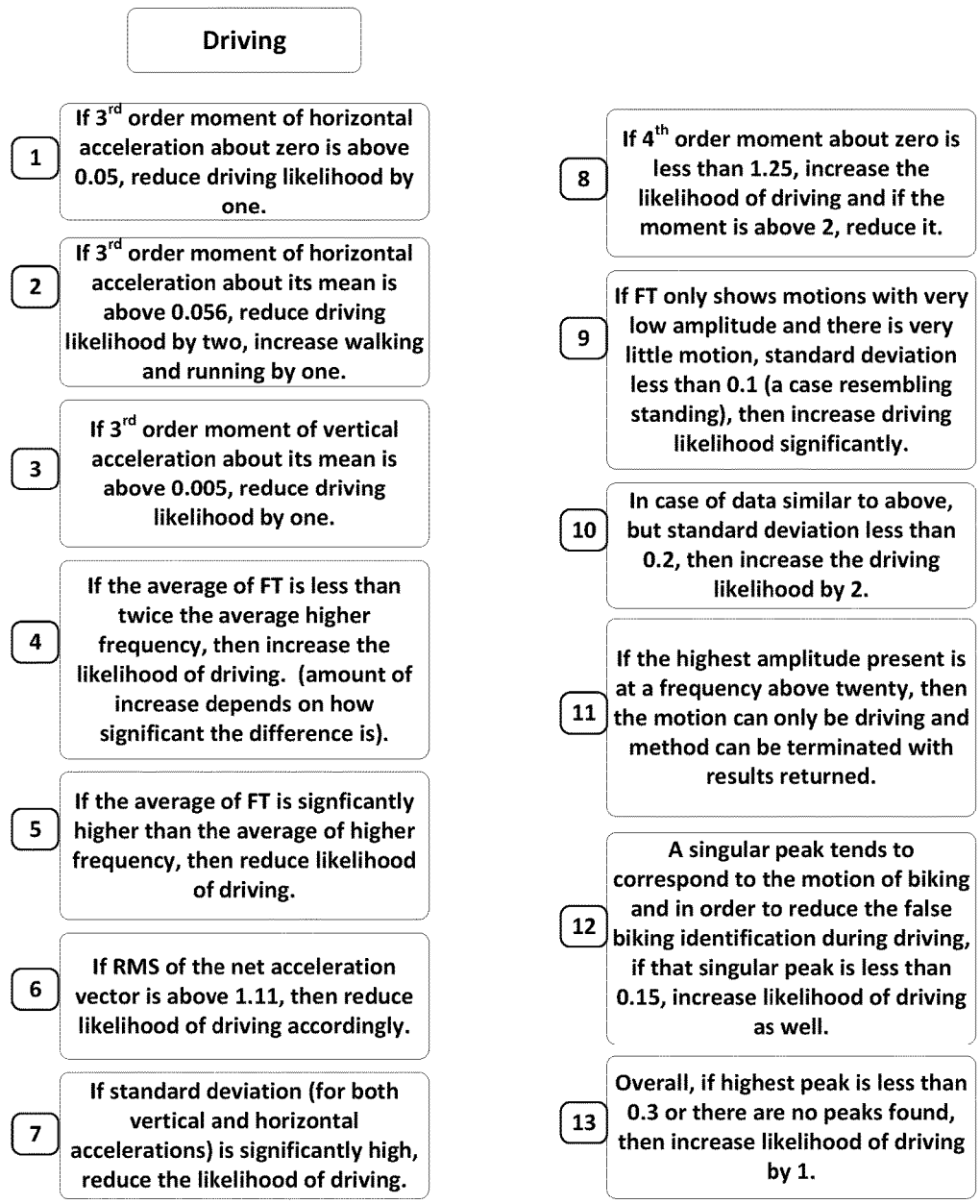

FIG. 12A is a description of parameters/methodology in the time domain and frequency domain that can be used by the MTMAI system of FIG. 2D to analyze driving.

Figure 12B:
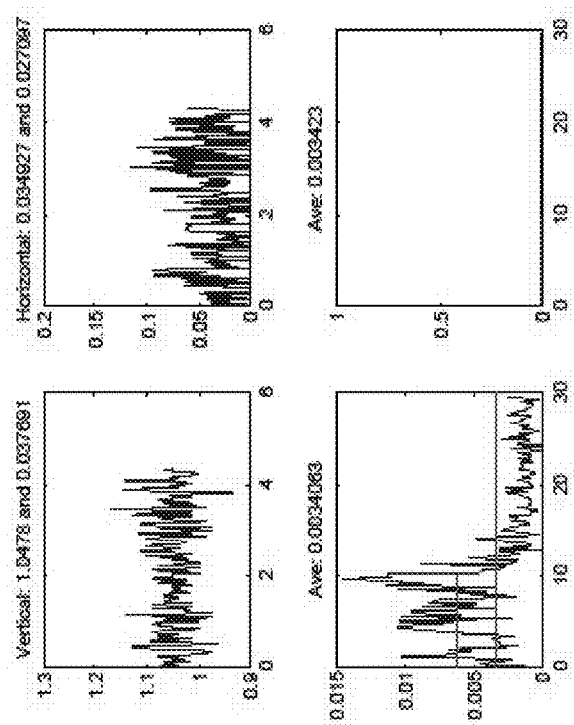

FIG. 12B is an example of time domain and frequency domain graphs, in connection with driving, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 13A:
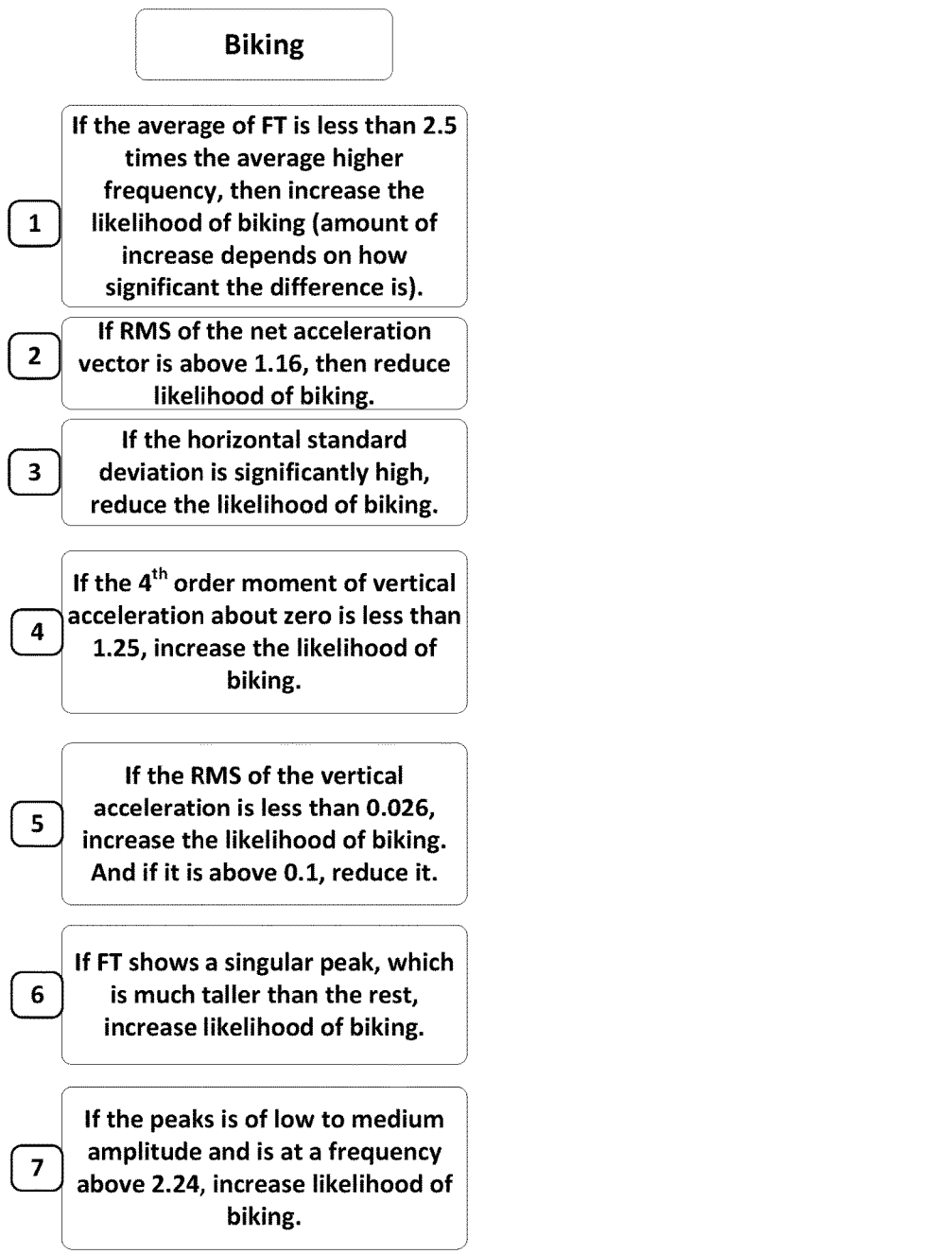

FIG. 13A is a description of parameters/methodology in the time domain and frequency domain that can be used by the MTMAI system of FIG. 2D to analyze biking.

Figure 13B:
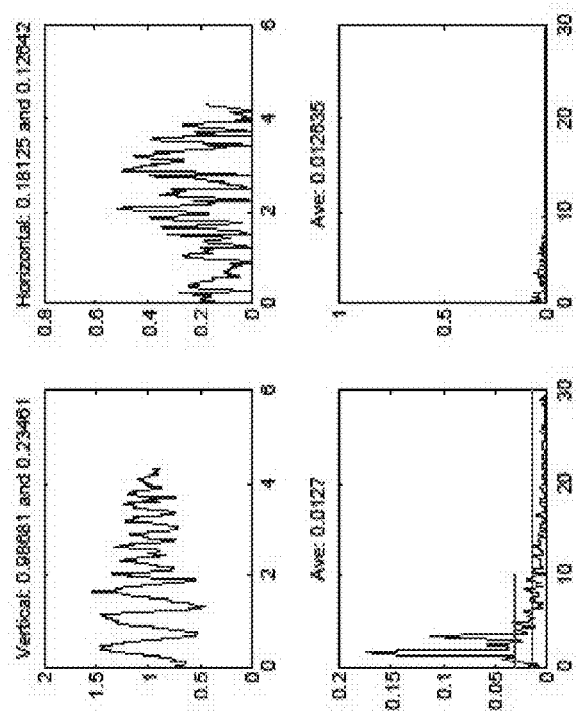

FIG. 13B is an example of time domain and frequency domain graphs, in connection with biking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 14A:
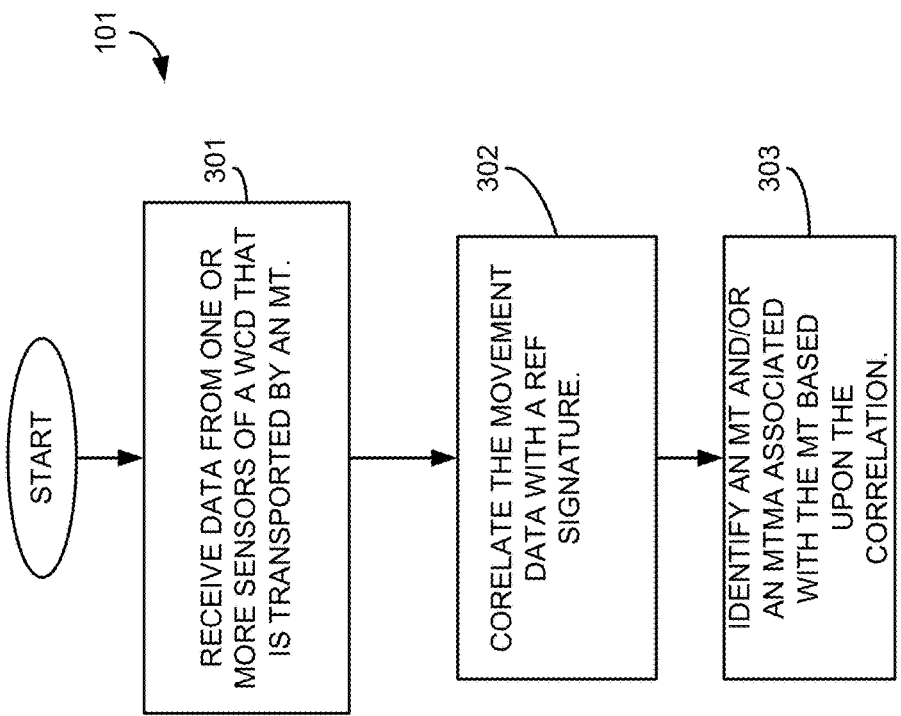

FIG. 14A is a flowchart showing a set of possible embodiments of the MTMAI system of FIG. 2D that employ correlation to identify the MT and/or the MTMA.

FIG. 14B is a block diagram of an example of a detection engine that can be employed in the MTMAI system of FIG. 14A for detecting the MT and/or the MTMA using correlation.

Figure 15A:
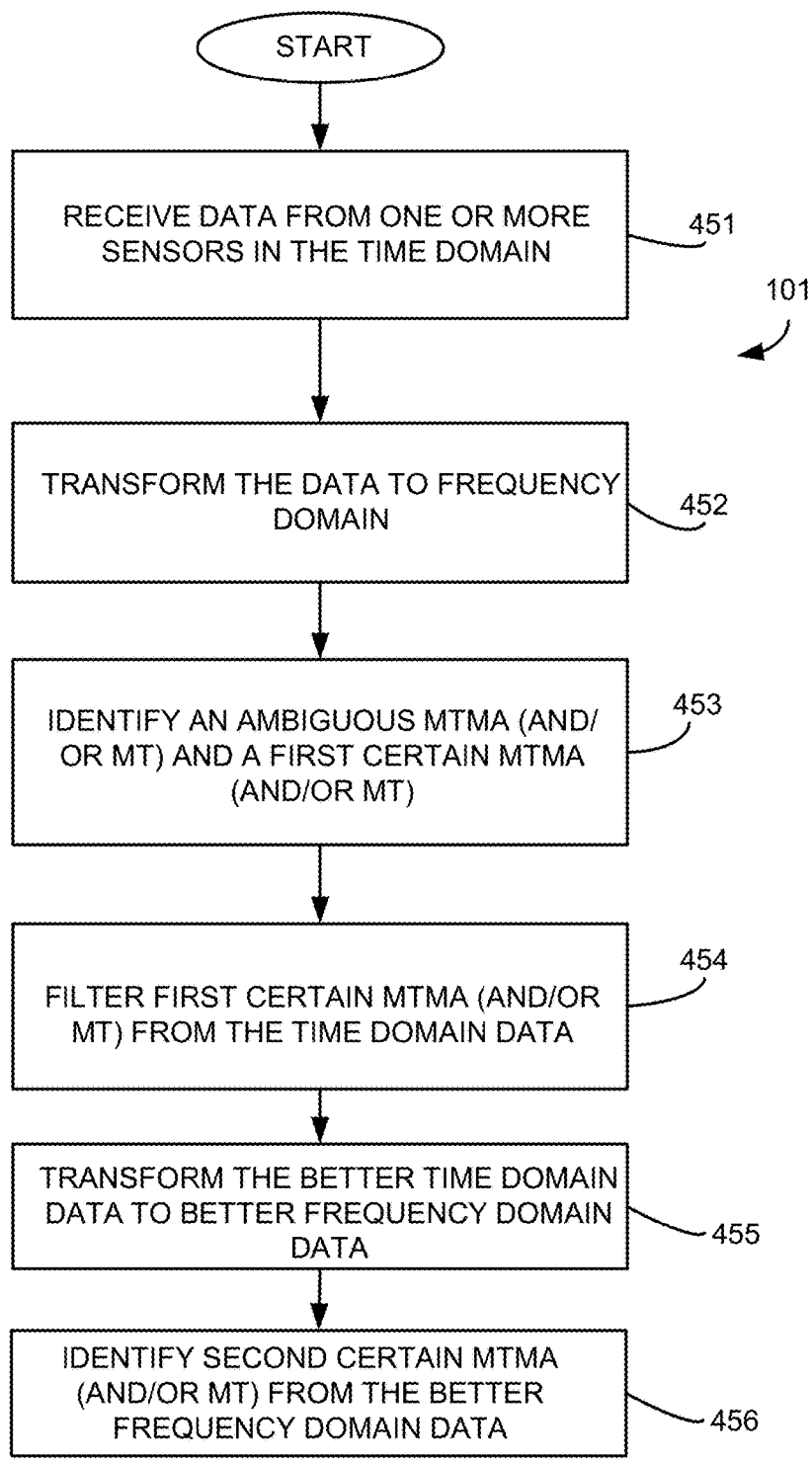

FIG. 15A is a flowchart of an example of a first set of embodiments of the MTMAI system of FIG. 2D that employs filtering via a filter(s) in order to more accurately identify an MT and/or MTMA that is among a plurality of MTs and/or MTMAs, respectively.

Figure 15B:
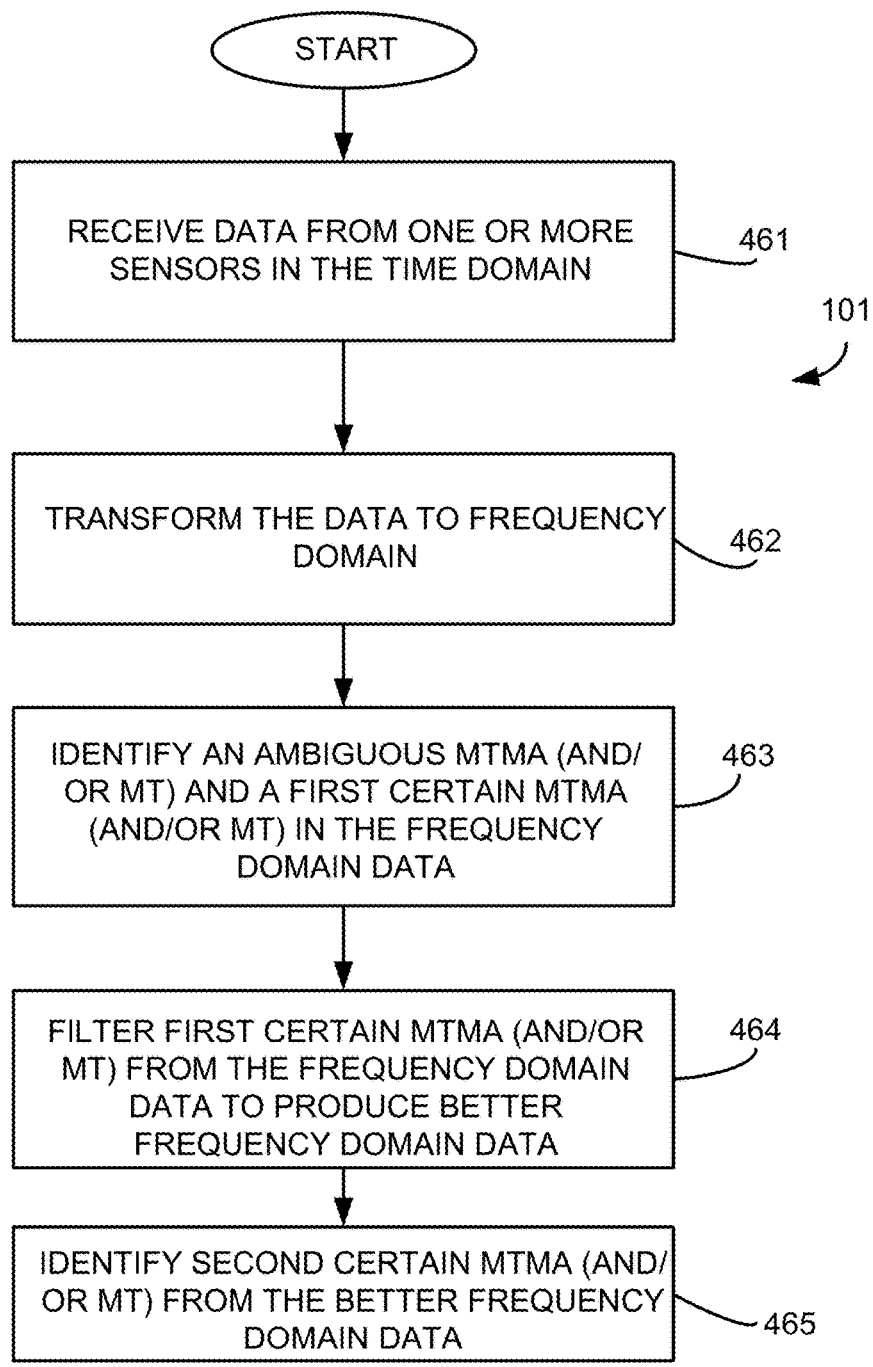

FIG. 15B is a flowchart of an example of a second set of embodiments of the MTMAI system of FIG. 2D that employs filtering via one or more filters in order to more accurately identify an MT and/or MTMA that is among a plurality of MTs and/or MTMAs, respectively.

Figure 15C:
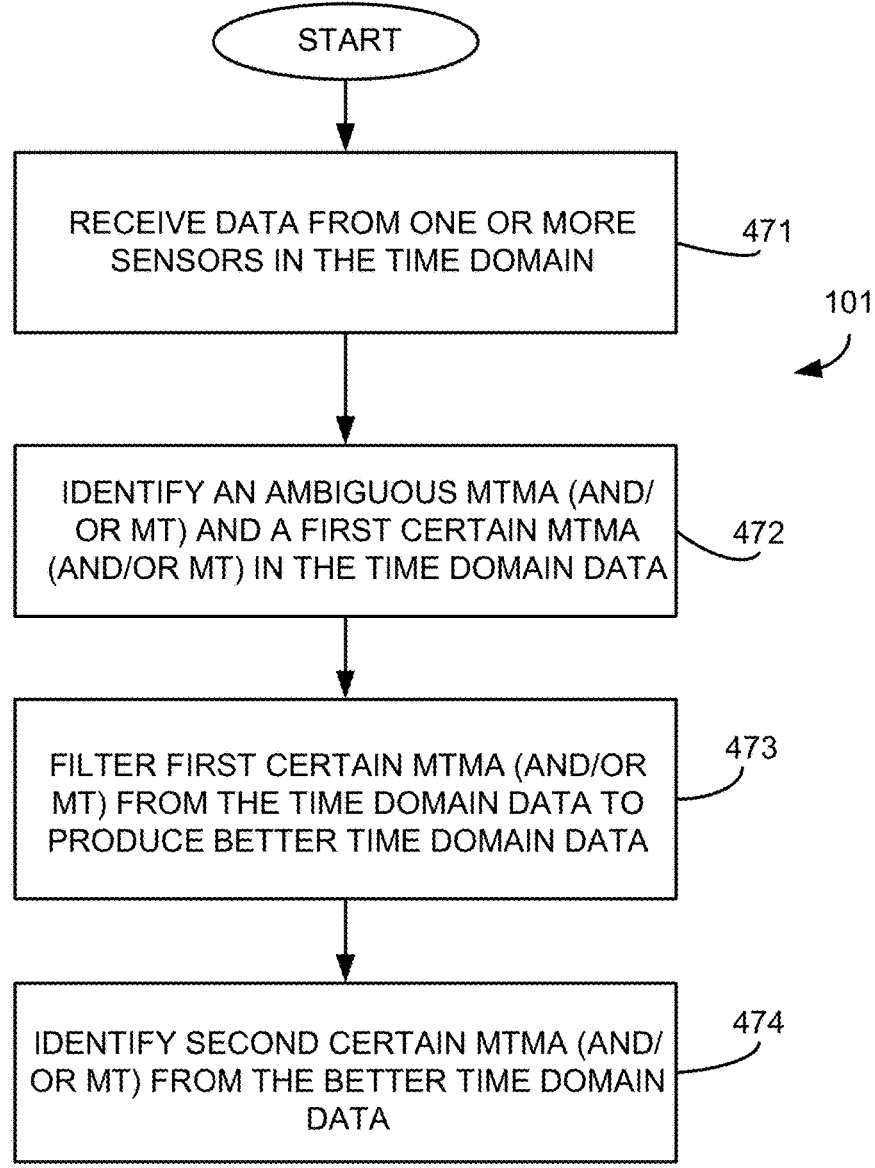

FIG. 15C is a flowchart of an example of a third set of embodiments of the MTMAI system of FIG. 2D that employs filtering via one or more filters in order to more accurately identify an MT and/or MTMA that is among a plurality of MTs and/or MTMAs, respectively.

Figure 16:
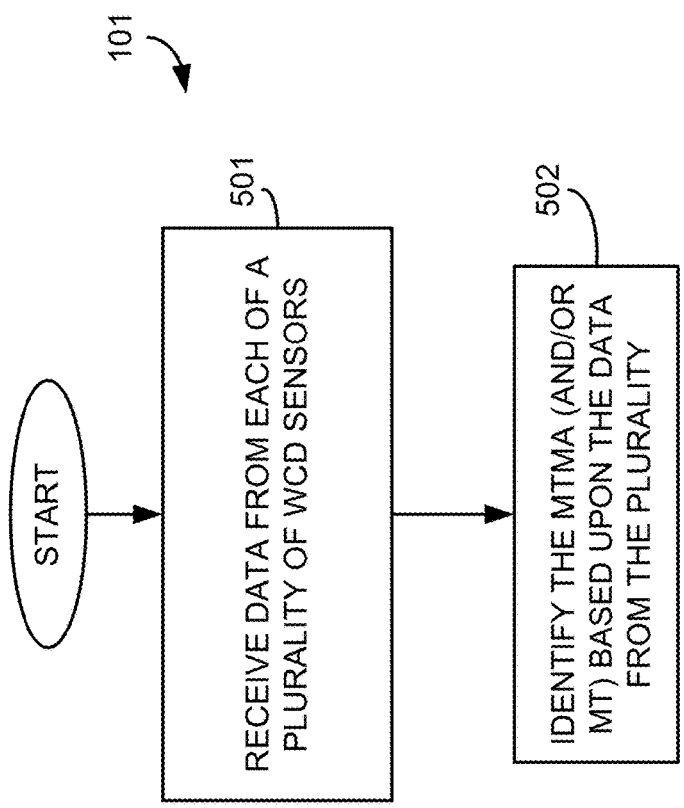

FIG. 16 is a flowchart of an example of a set of embodiments of the MTMAI system of FIG. 2D that uses data from a plurality of sensors in order to more accurately determine the MT and/or MTMA.

Figure 17:
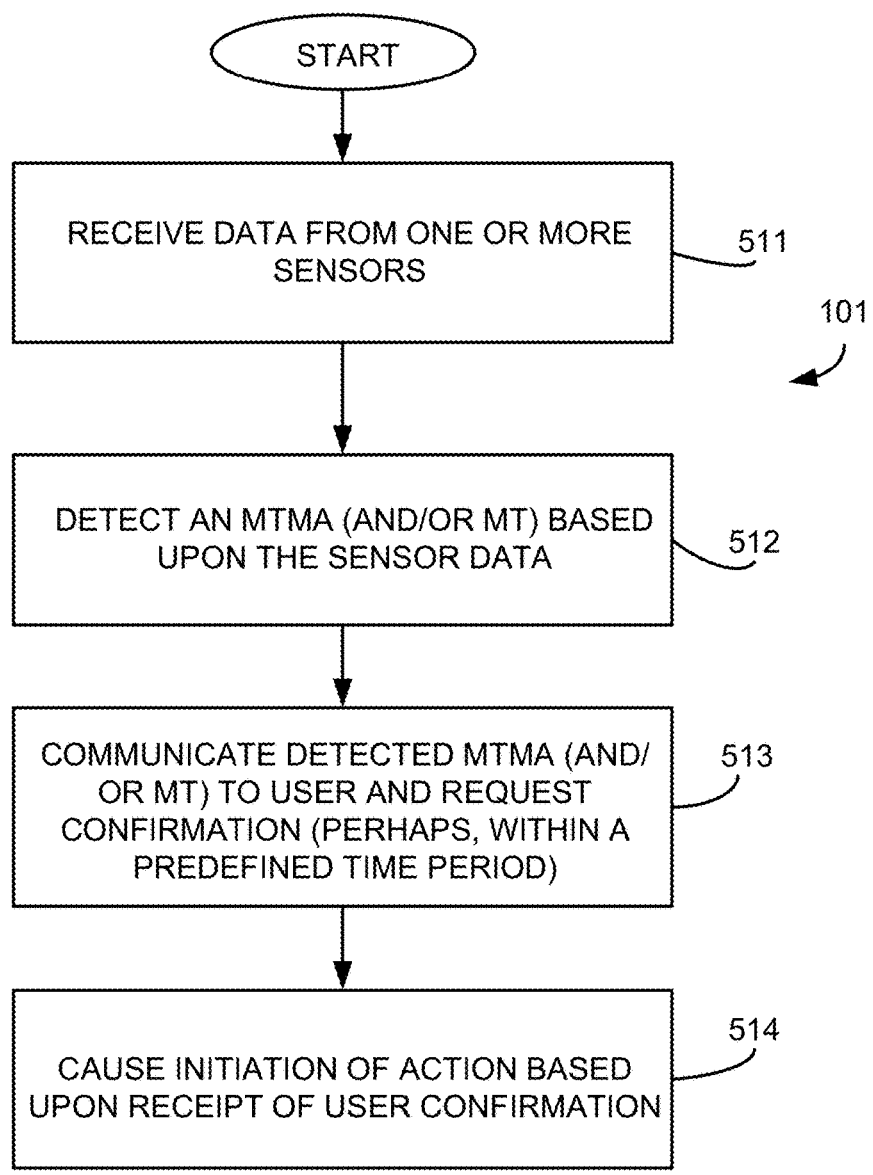

FIG. 17 is a flowchart of an example of a set of embodiments of the MTMAI system of FIG. 2D that employ a request for confirmation from the WCD user.

Figure 18A:
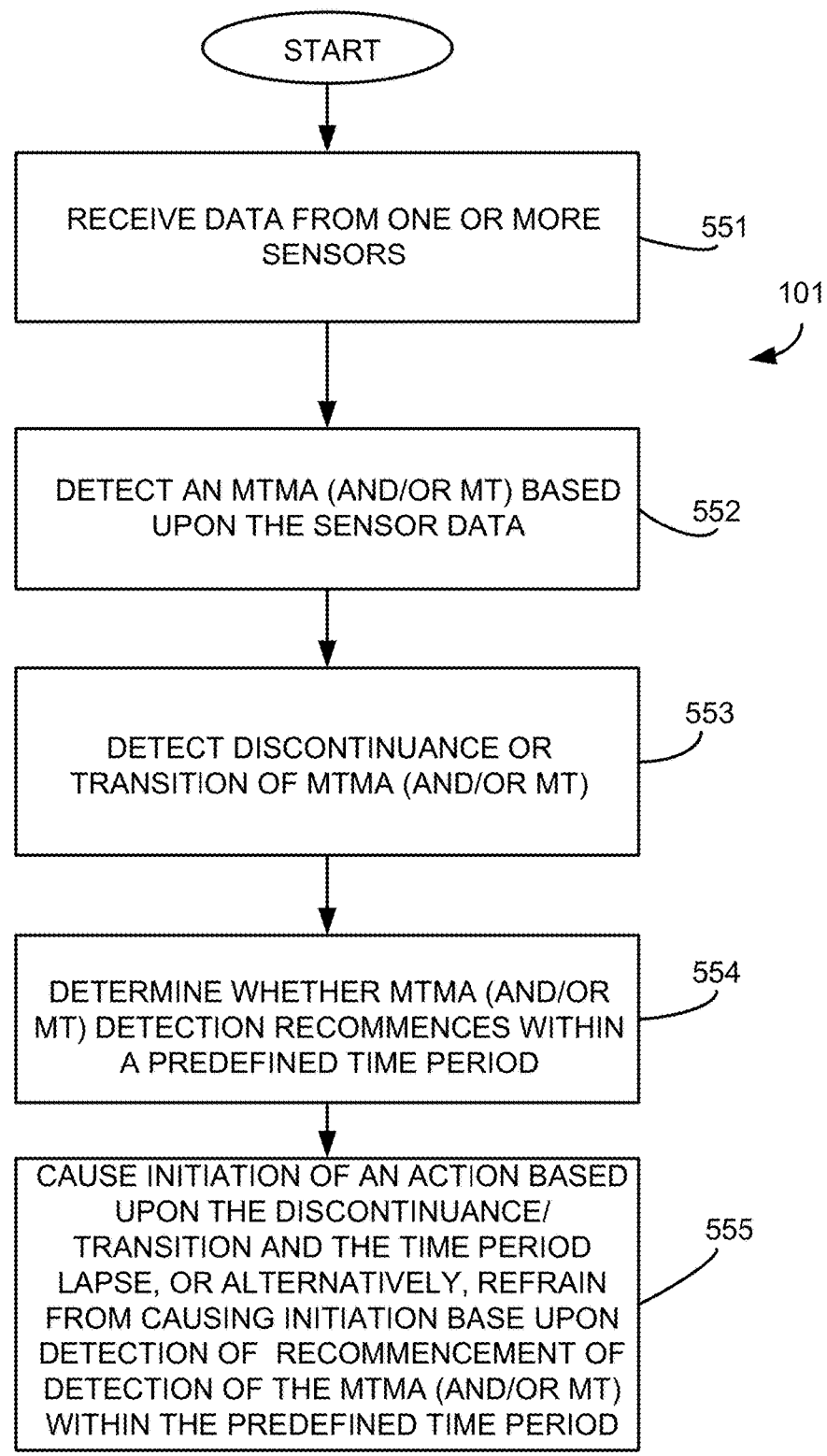

FIG. 18A is a flowchart of an example of a first set of embodiments of the MTMAI system of FIG. 2D that employs exceptions.

Figure 18B:
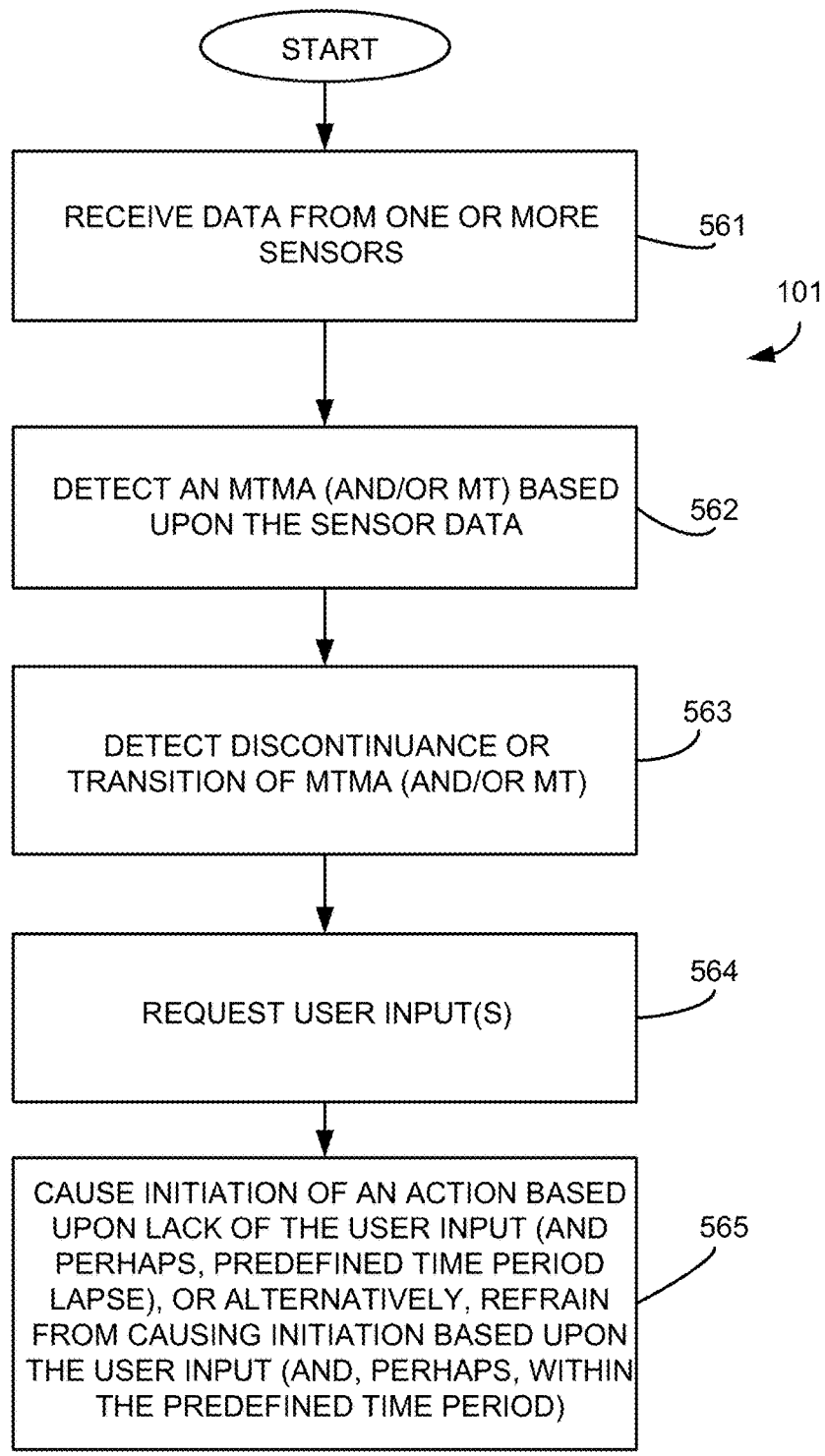

FIG. 18B is a flowchart of an example of a second set of embodiments of the MTMAI system of FIG. 2D that employs exceptions.

Figure 18C:
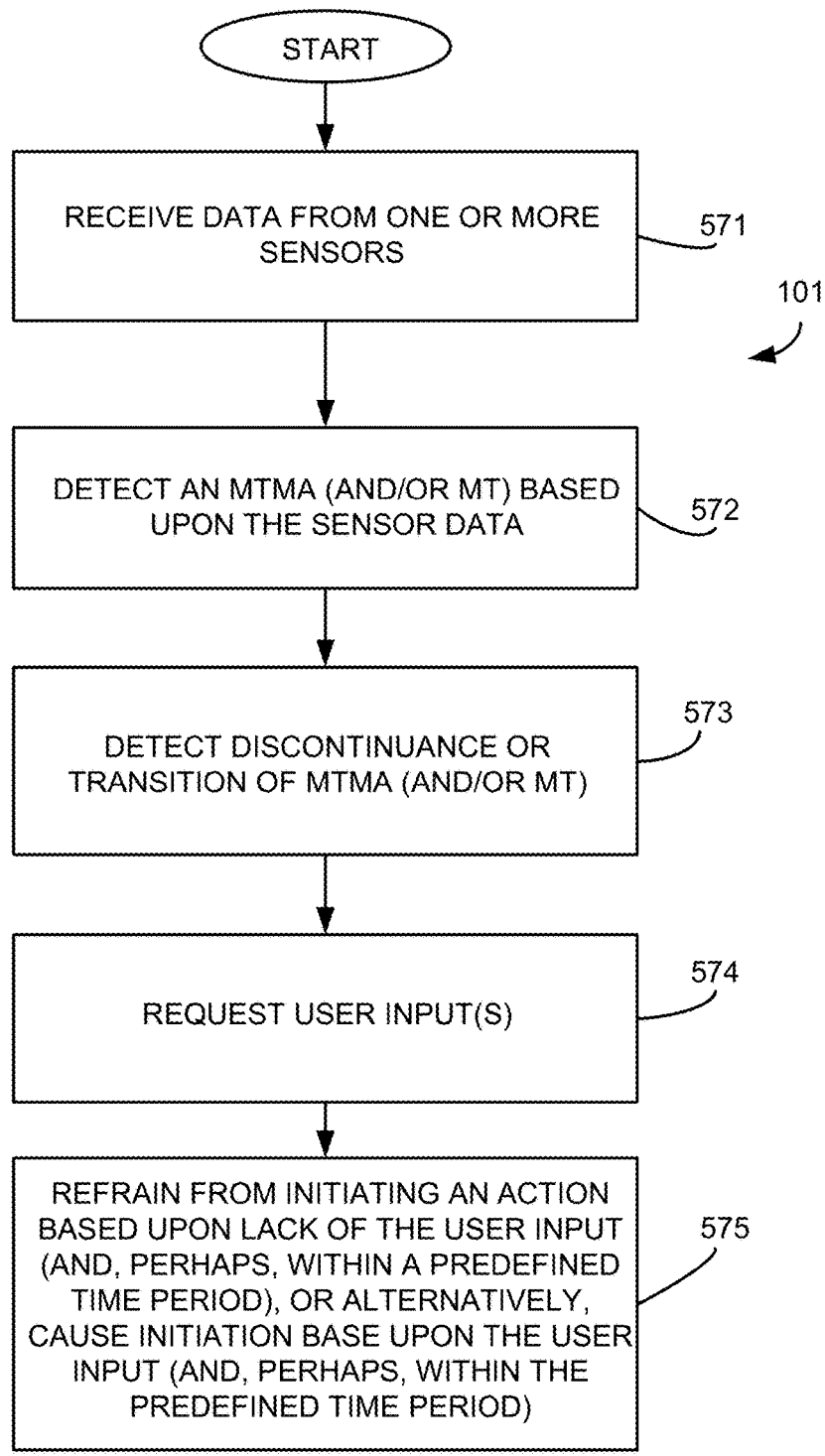

FIG. 18C is a flowchart of an example of a third set of embodiments of the MTMAI system of FIG. 2D that employs exceptions.

Figure 18D:
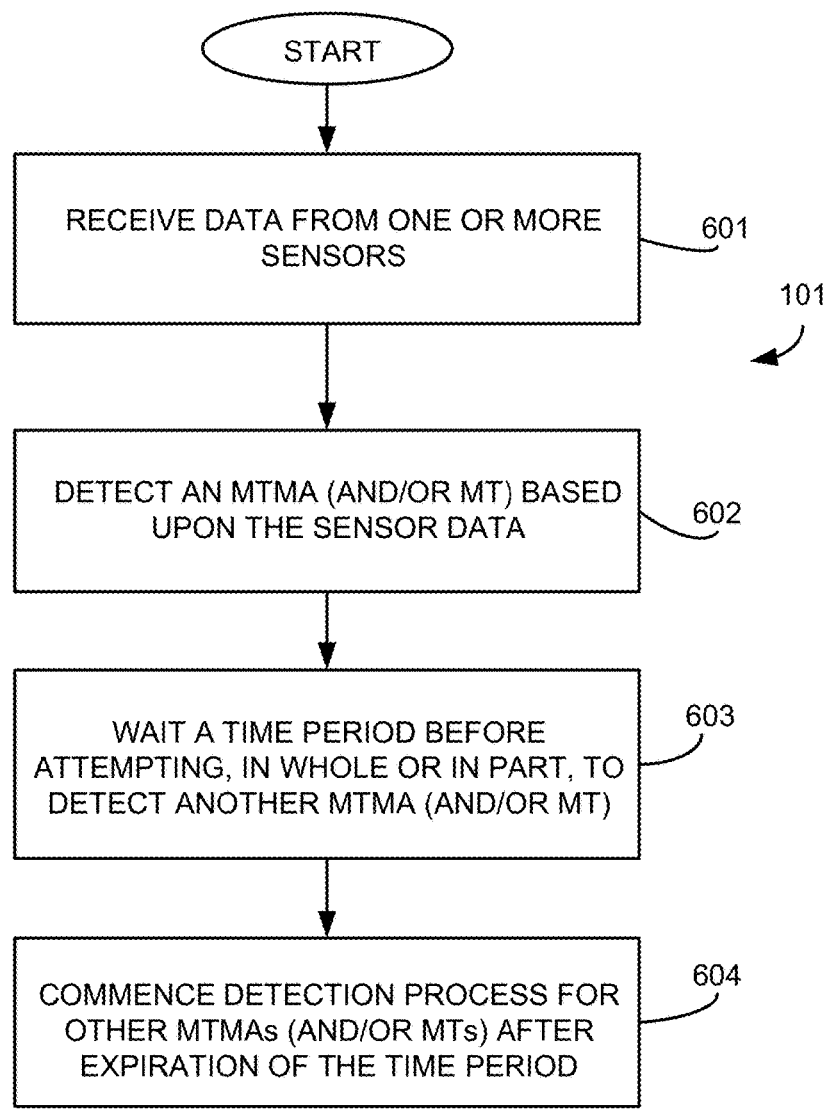

FIG. 18D is a flowchart of an example of a fourth set of embodiments of the MTMAI system of FIG. 2D that employs exceptions.

Figures 19A, 19B:
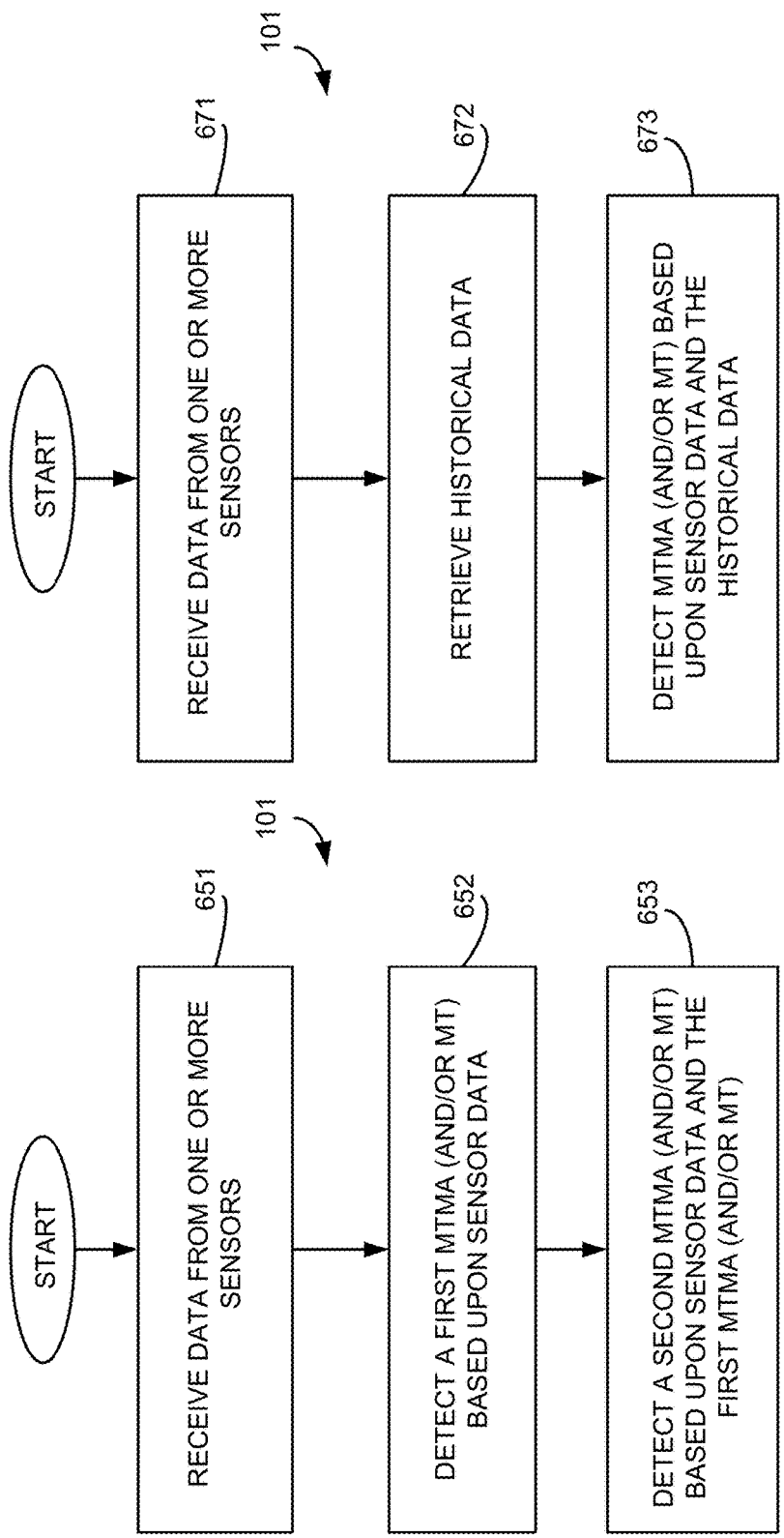

FIG. 19A is a flowchart of an example of a first set of embodiments of the MTMAI system of FIG. 2D that employs an algorithm(s) that takes into consideration historical data when attempting to identify a new MTMA and/or MT.

FIG. 19B is a flowchart of an example of a second set of embodiments of the MTMAI system of FIG. 2D that employs an algorithm(s) that takes into consideration historical data when attempting to identify a new MTMA and/or MT.

FIG. 19C is a flowchart of an example of a third set of embodiments of the MTMAI system of FIG. 2D that employs an algorithm(s) that takes into consideration historical data when attempting to identify a new MTMA and/or MT.

FIG. 19D is a flowchart of an example of a fourth set of embodiments of the MTMAI system of FIG. 2D that employs an algorithm(s) that takes into consideration historical data when attempting to identify a new MTMA and/or MT.

Figure 20B:
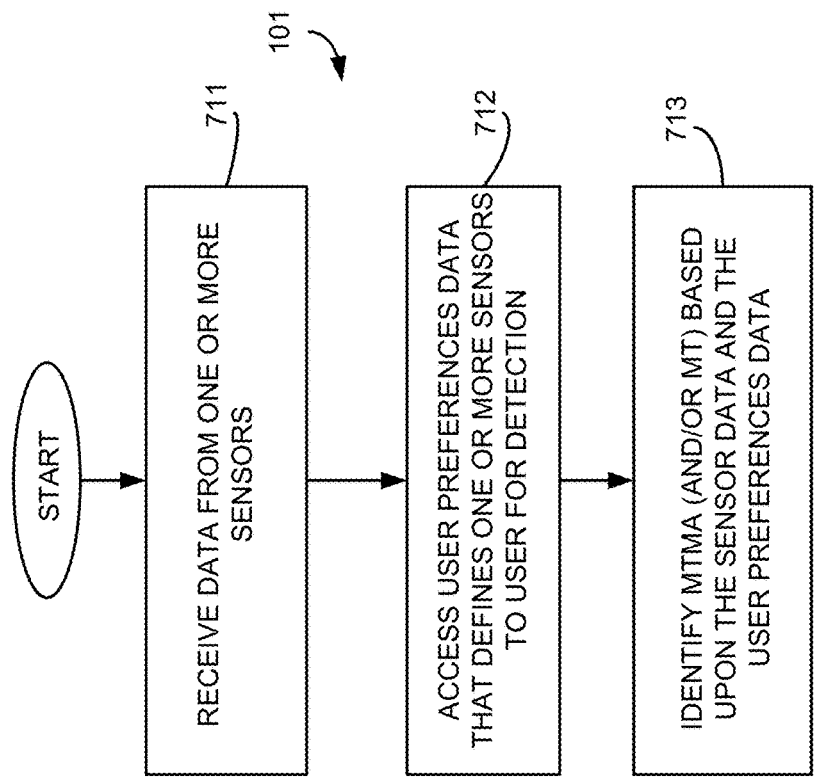
Figure 20A:
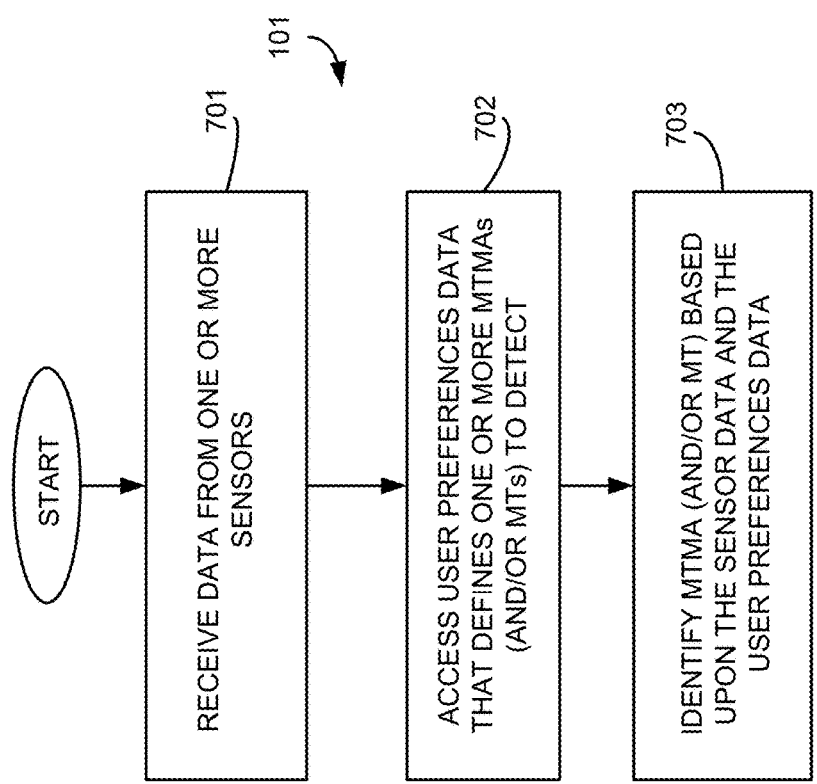

FIG. 20A is a flowchart of an example of a first set of embodiments of the MTMAI system of FIG. 2D that employs user preferences data.

FIG. 20B is a flowchart of an example of a second set of embodiments of the MTMAI system of FIG. 2D that employs user preferences data.

Figure 21A:
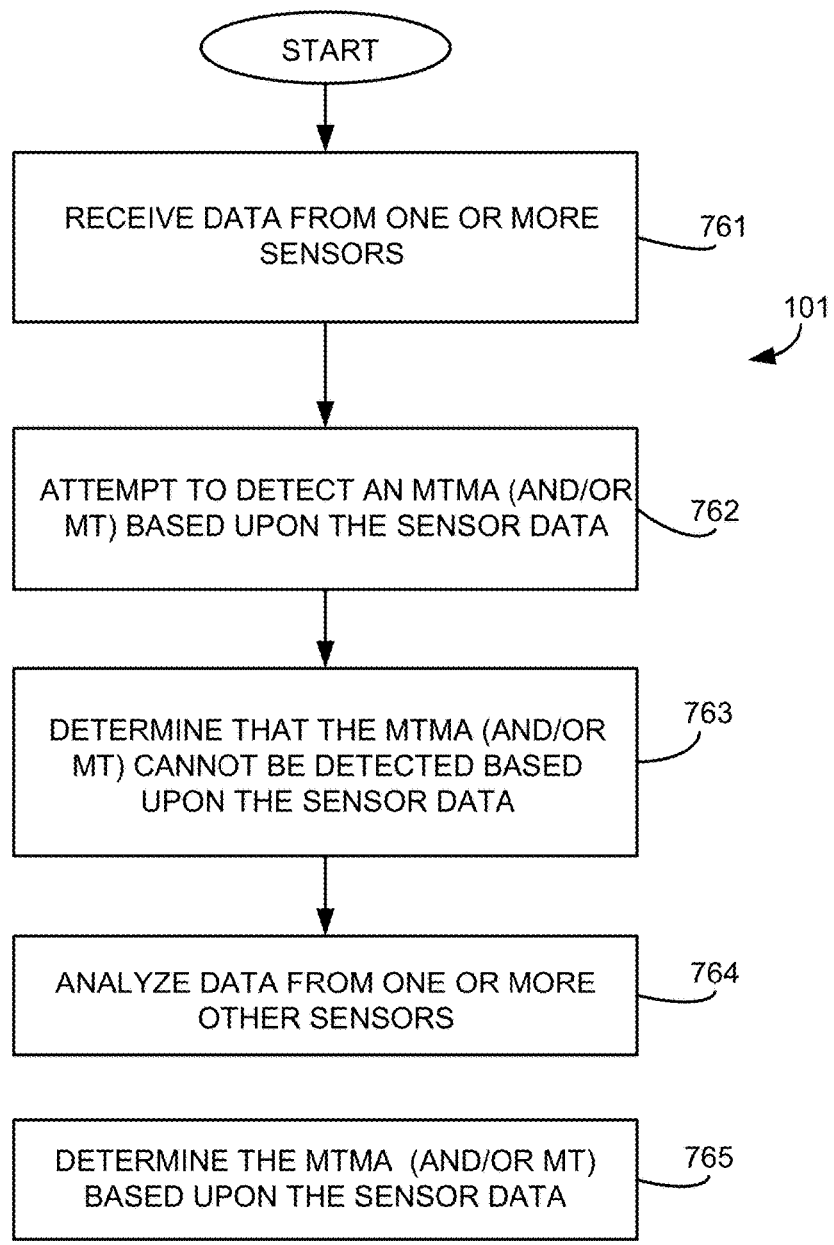

FIG. 21A is a flowchart of an example of a first set of embodiments of the MTMAI system of FIG. 2D that employs a sensor data selection algorithm in order to assist with identifying an MTMA and/or MT.

Figure 21B:
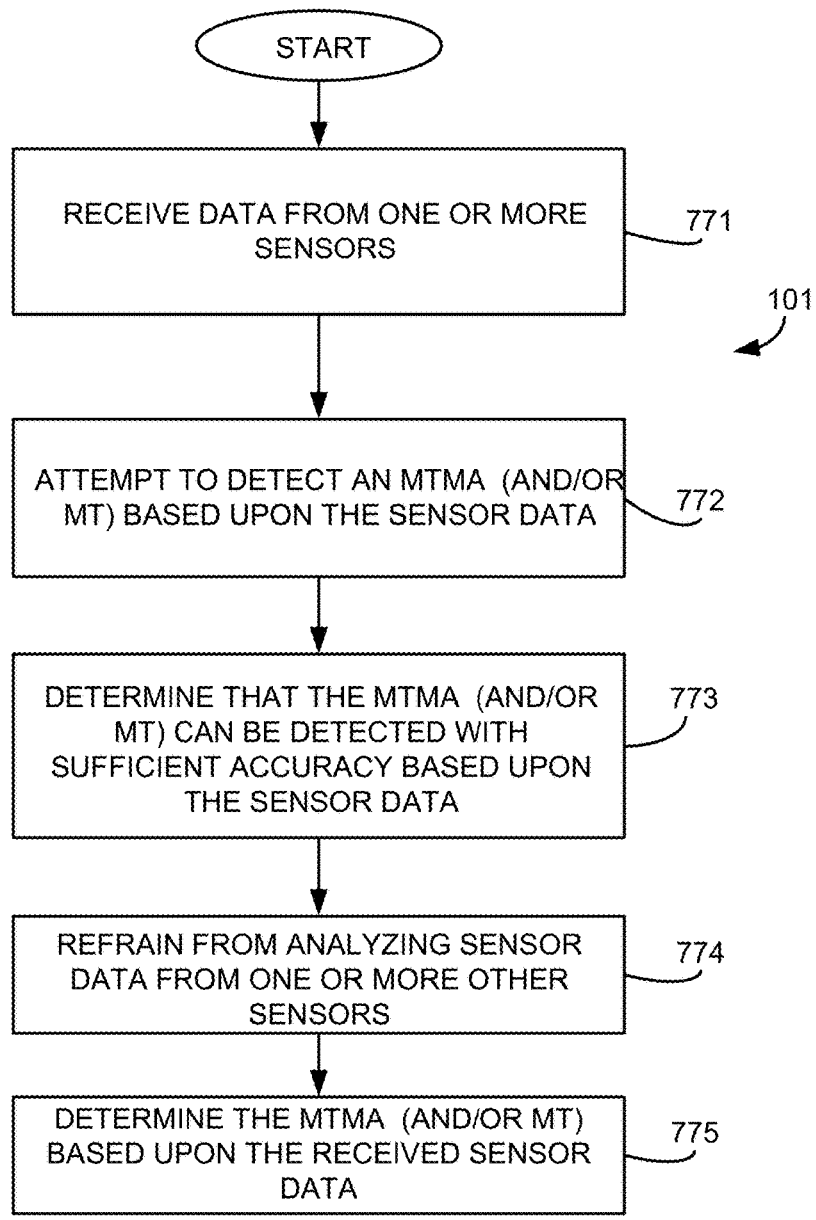

FIG. 21B is a flowchart of an example of a second set of embodiments of the MTMAI system of FIG. 2D that employs a sensor data selection algorithm in order to assist with identifying an MTMA and/or MT.

FIG. 21C is a flowchart of an example of a third set of embodiments of the MTMAI system of FIG. 2D that employs a sensor data selection algorithm in order to assist with identifying an MTMA and/or MT.

FIG. 21D is a flowchart of an example of a fourth set of embodiments of the MTMAI system of FIG. 2D that employs a sensor data selection algorithm in order to assist with identifying an MTMA and/or MT.

Figure 22A:
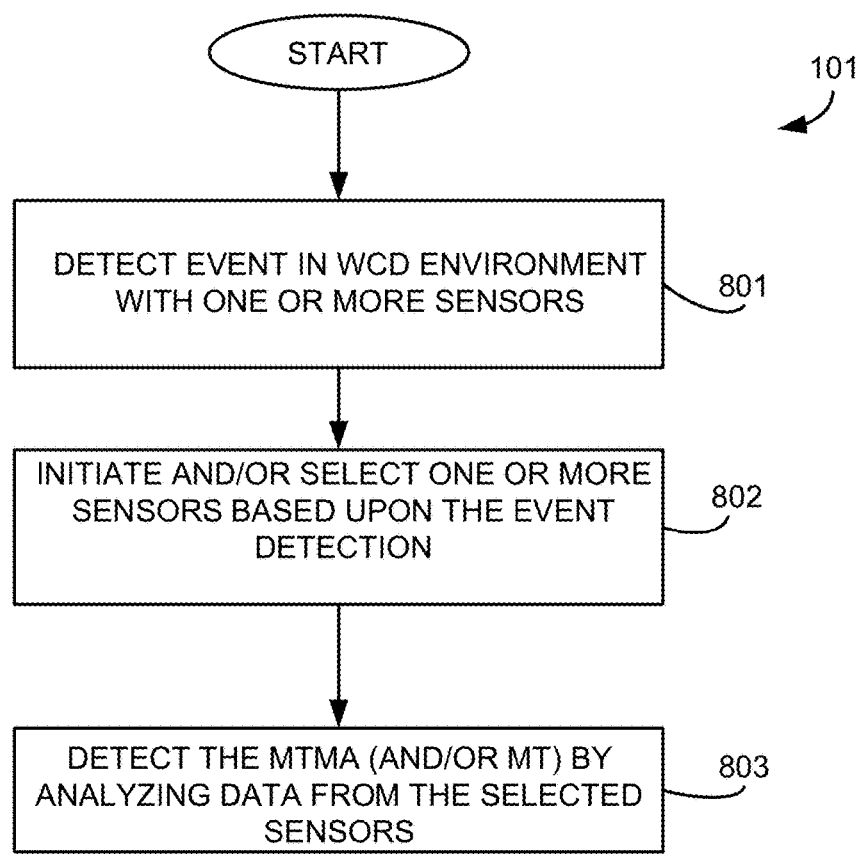

FIG. 22A is a flowchart of an example of a first set of embodiments of the MTMAI system of FIG. 2D that employs an environmental event detection algorithm in order to assist with identifying an MTMA and/or MT.

Figure 22B:
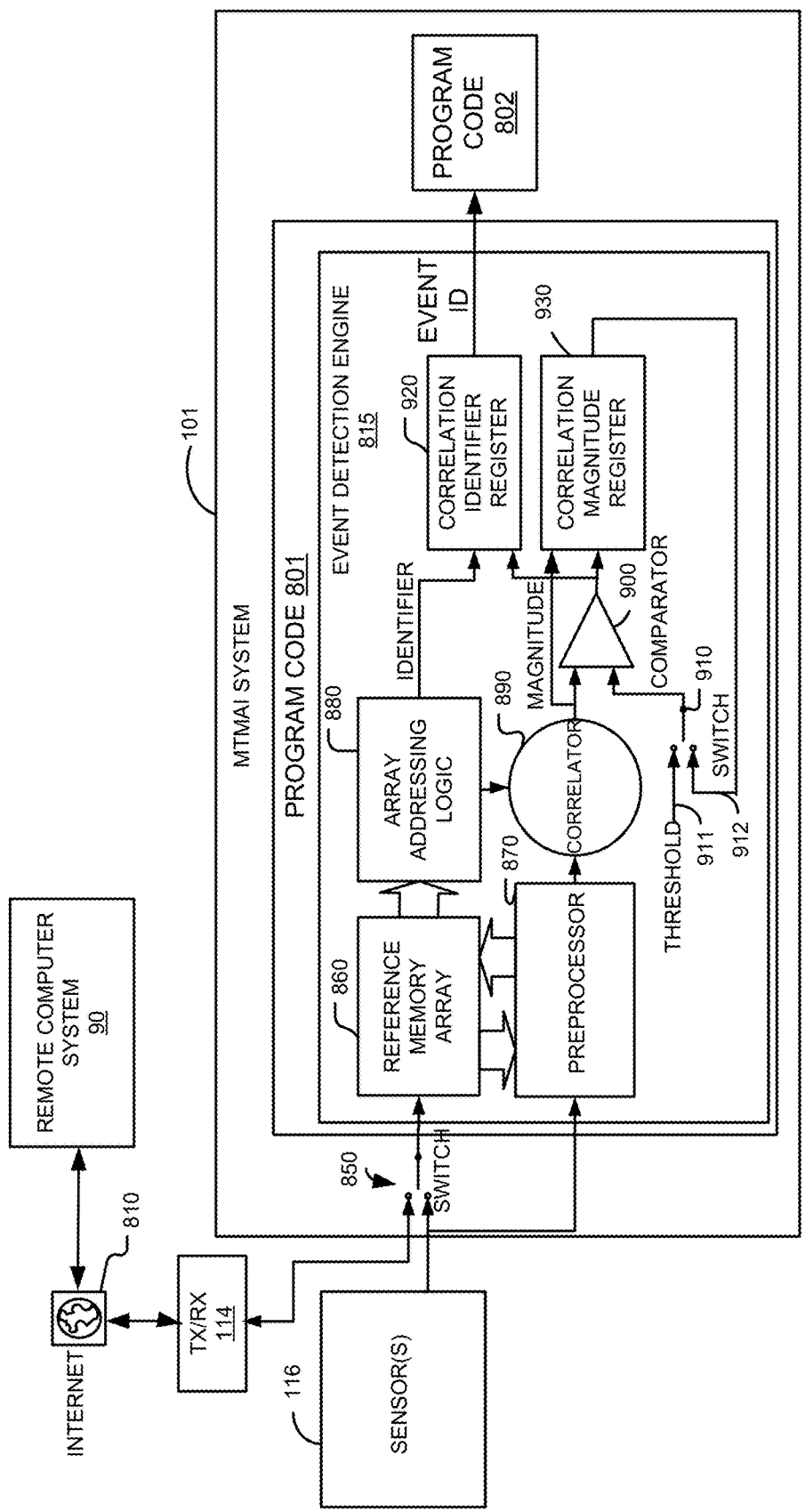

FIG. 22B is a block diagram of an example of an event detection engine that can be used in the MTMAI system of FIG. 22A to detect an event in the WCD environment.

Figures 22C, 22D:
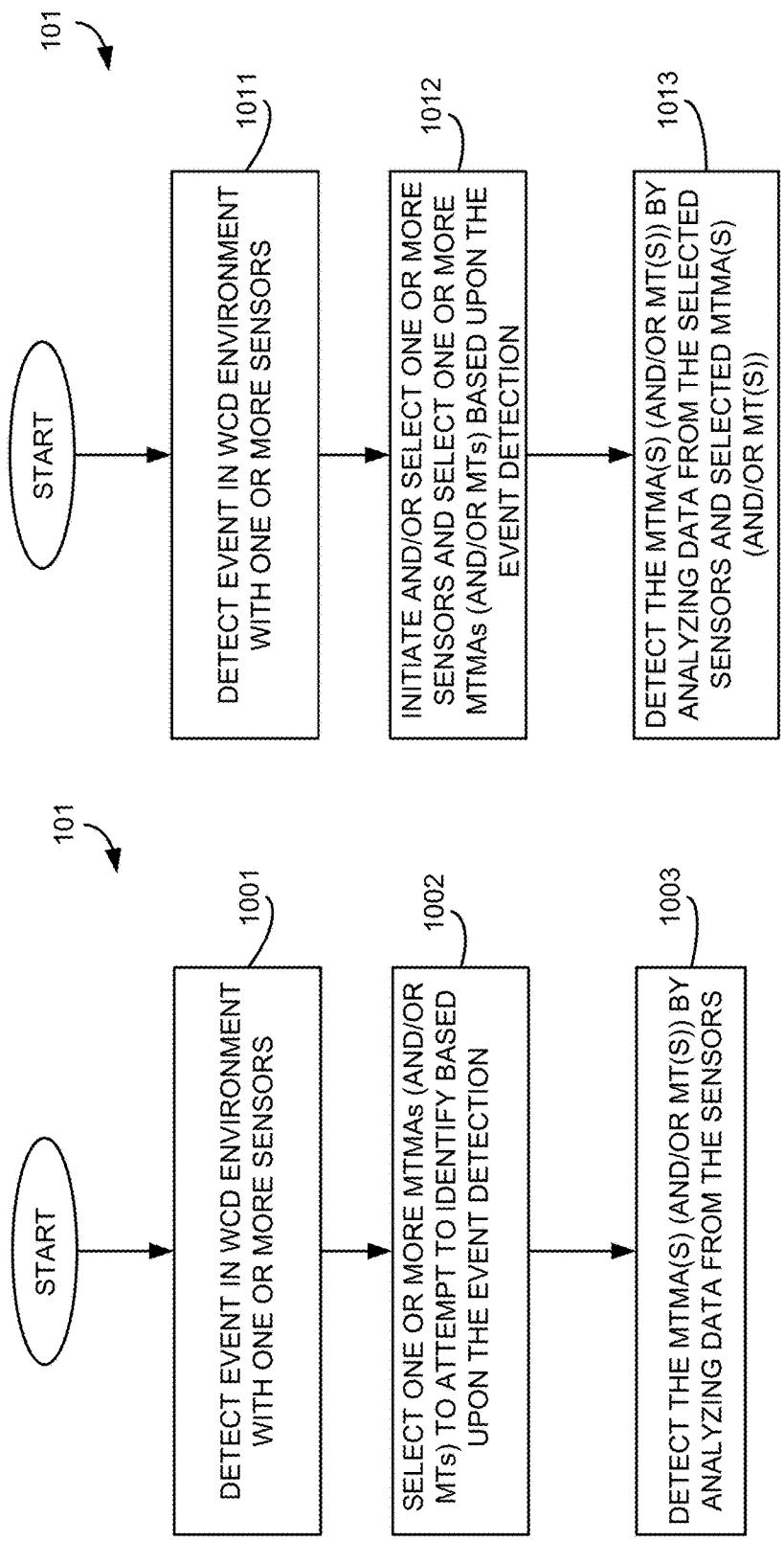

FIG. 22C is a flowchart of an example of a second set of embodiments of the MTMAI system of FIG. 2D that employs an environmental event detection algorithm in order to assist with identifying an MTMA and/or MT.

FIG. 22D is a flowchart of an example of a third set of embodiments of the MTMAI system of FIG. 2D that employs an environmental event detection algorithm in order to assist with identifying an MTMA and/or MT.

Figure 22E:
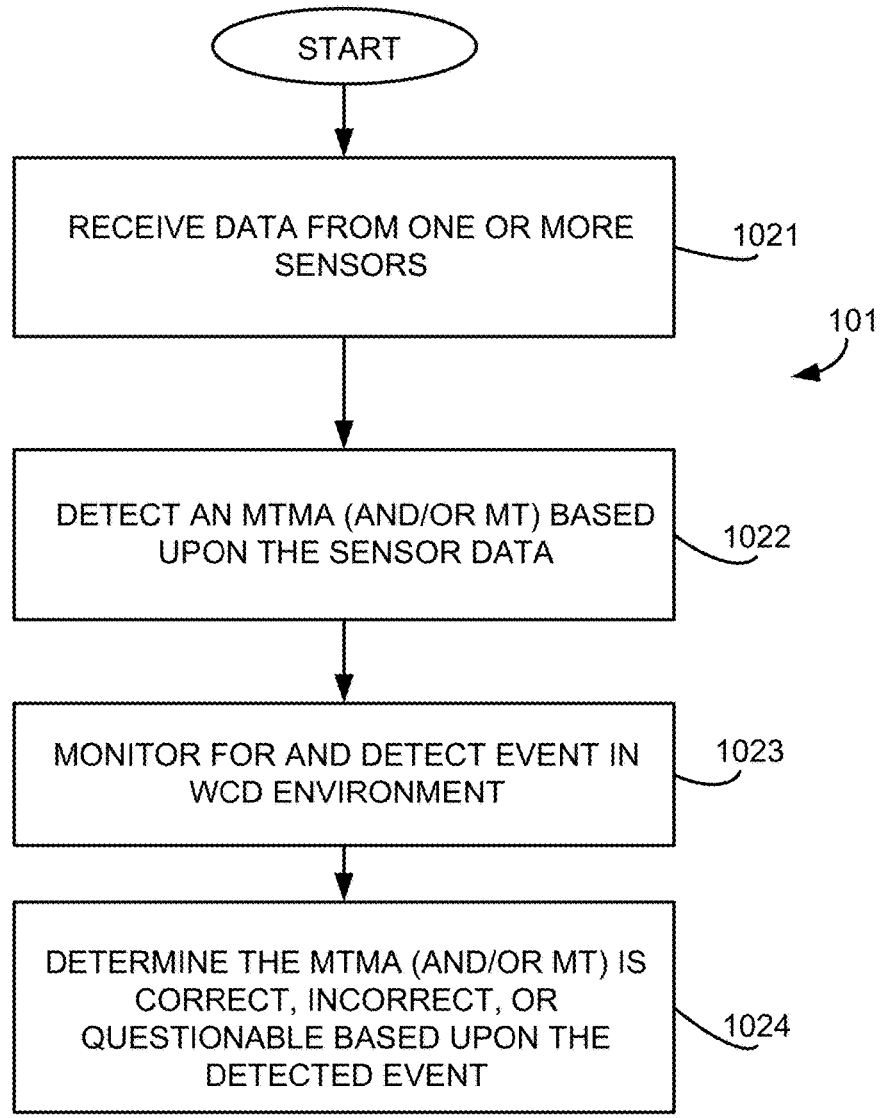

FIG. 22E is a flowchart of an example of a fourth set of embodiments of the MTMAI system of FIG. 2D that employs an environmental event detection algorithm in order to assist with identifying an MTMA and/or MT.

Figure 22F:
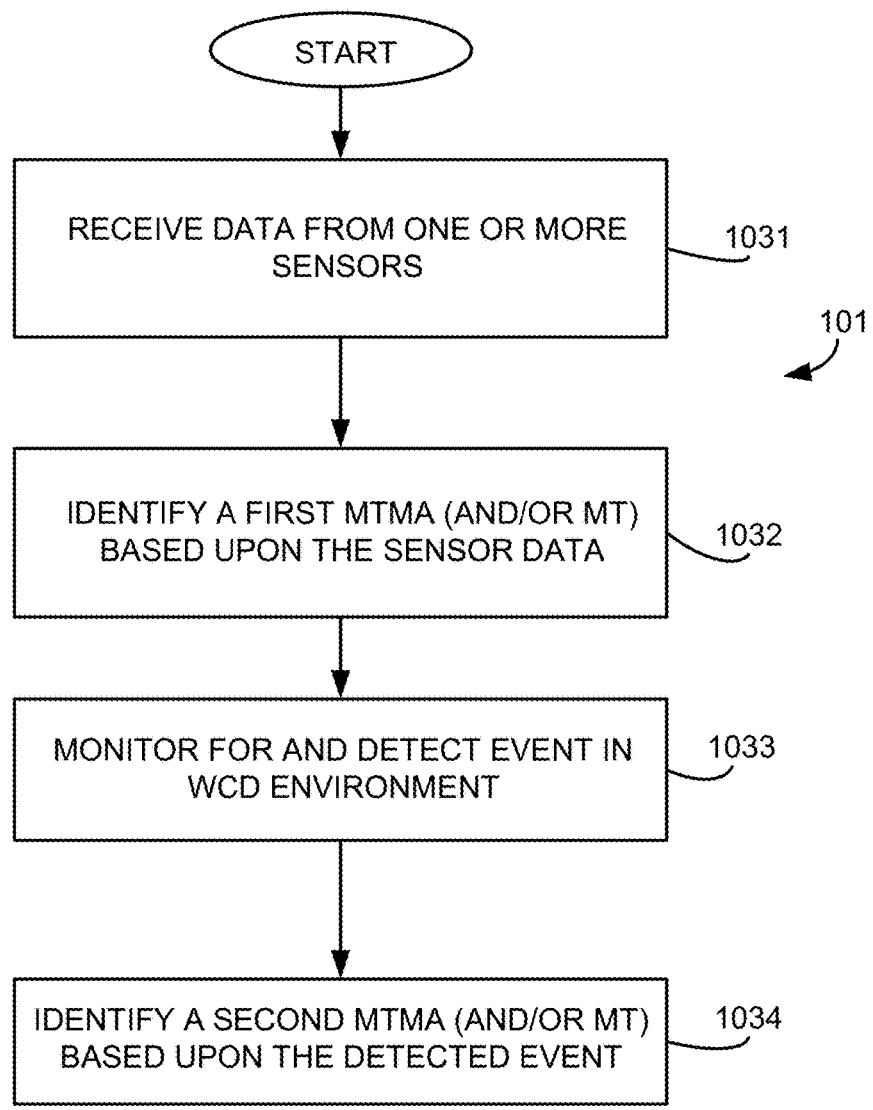

FIG. 22F is a flowchart of an example of a fifth set of embodiments of the MTMAI system of FIG. 2D that employs an environmental event detection algorithm in order to assist with identifying an MTMA and/or MT.

Figure 23A:
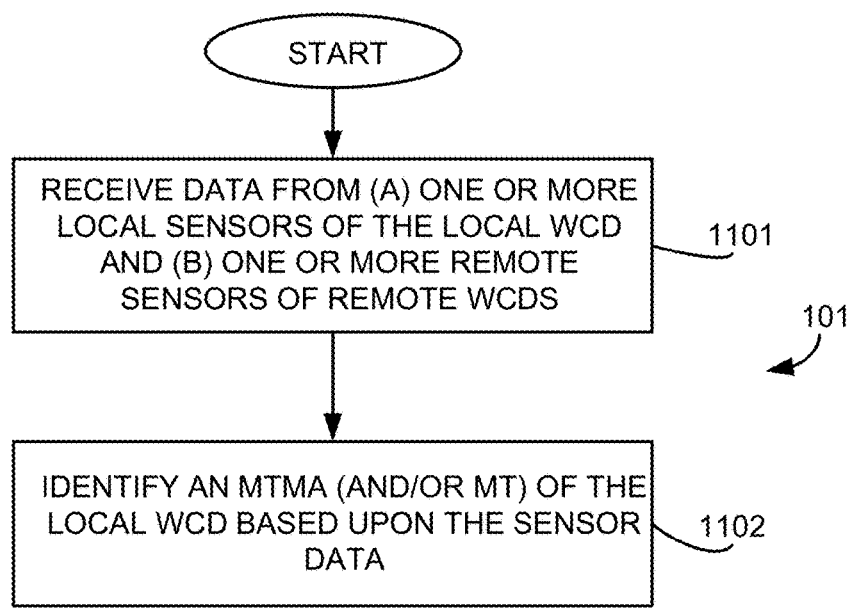

FIG. 23A is a flowchart of an example of a first set of embodiments of the MTMAI system of FIG. 2D that analyzes data associated with a plurality of WCDs in order to identify an MTMA and/or MT.

Figure 23B:
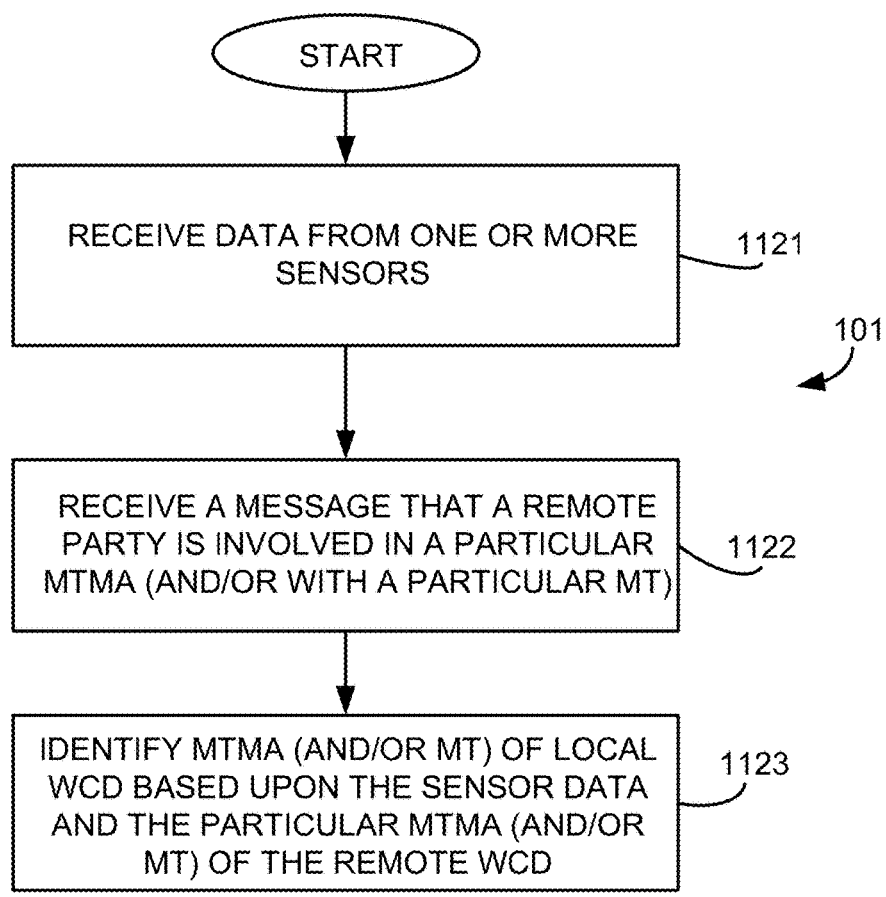

FIG. 23B is a flowchart of an example of a second set of embodiments of the MTMAI system of FIG. 2D that analyzes data associated with a plurality of WCDs in order to identify an MTMA and/or MT.

Figure 23C:
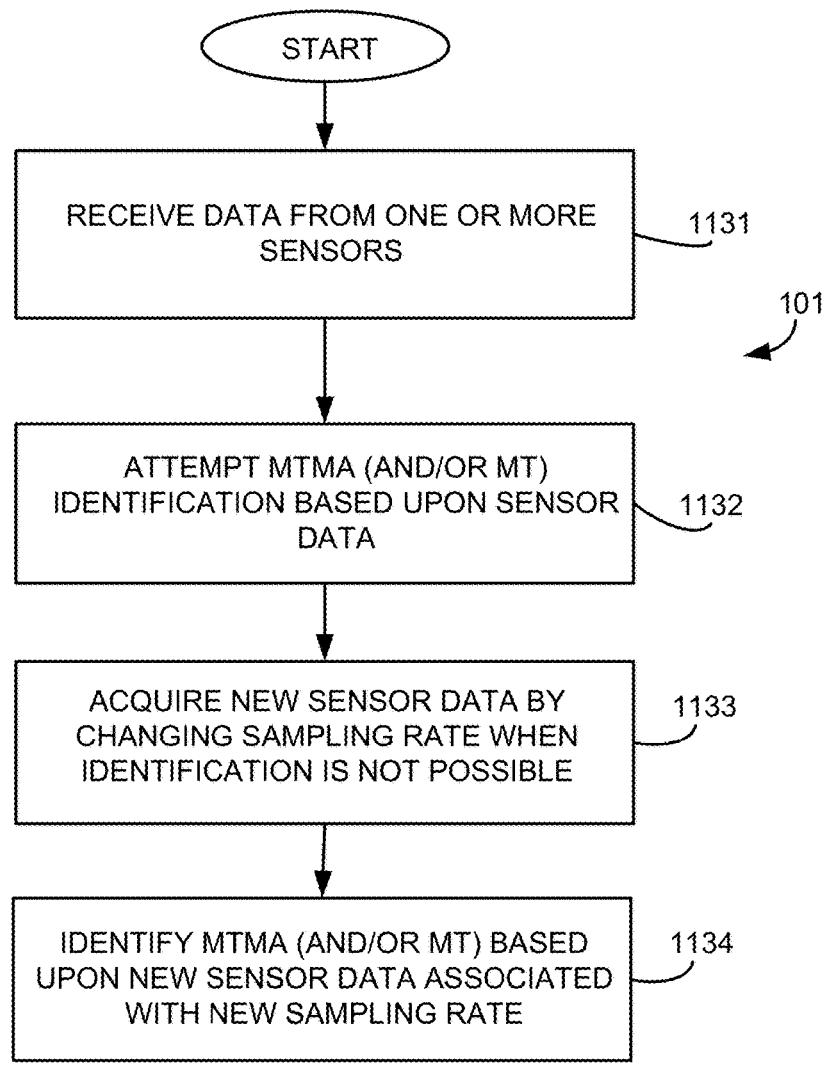

FIG. 23C is a flowchart of an example of a set of embodiments of the MTMAI system of FIG. 2D that employs a change in the sampling rate in order to enhance MTMA and/or MT detection.

Figure 24A:
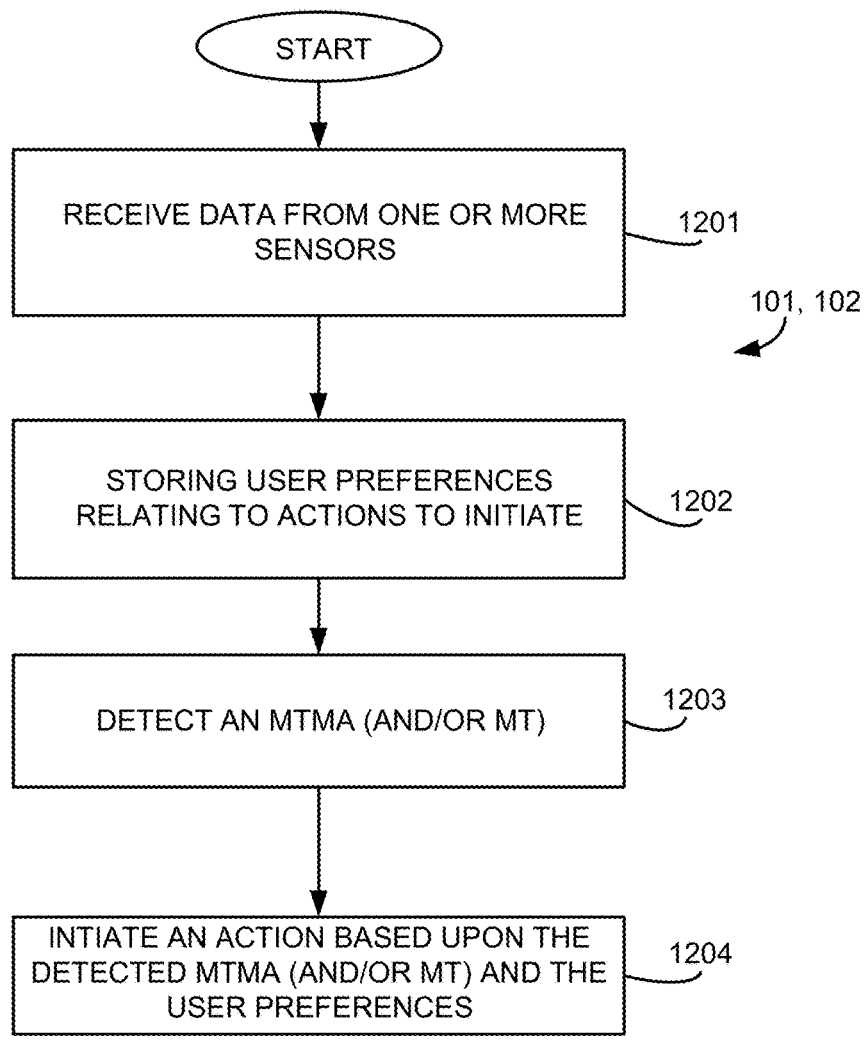

FIG. 24A is a flowchart of an example of a first set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24B:
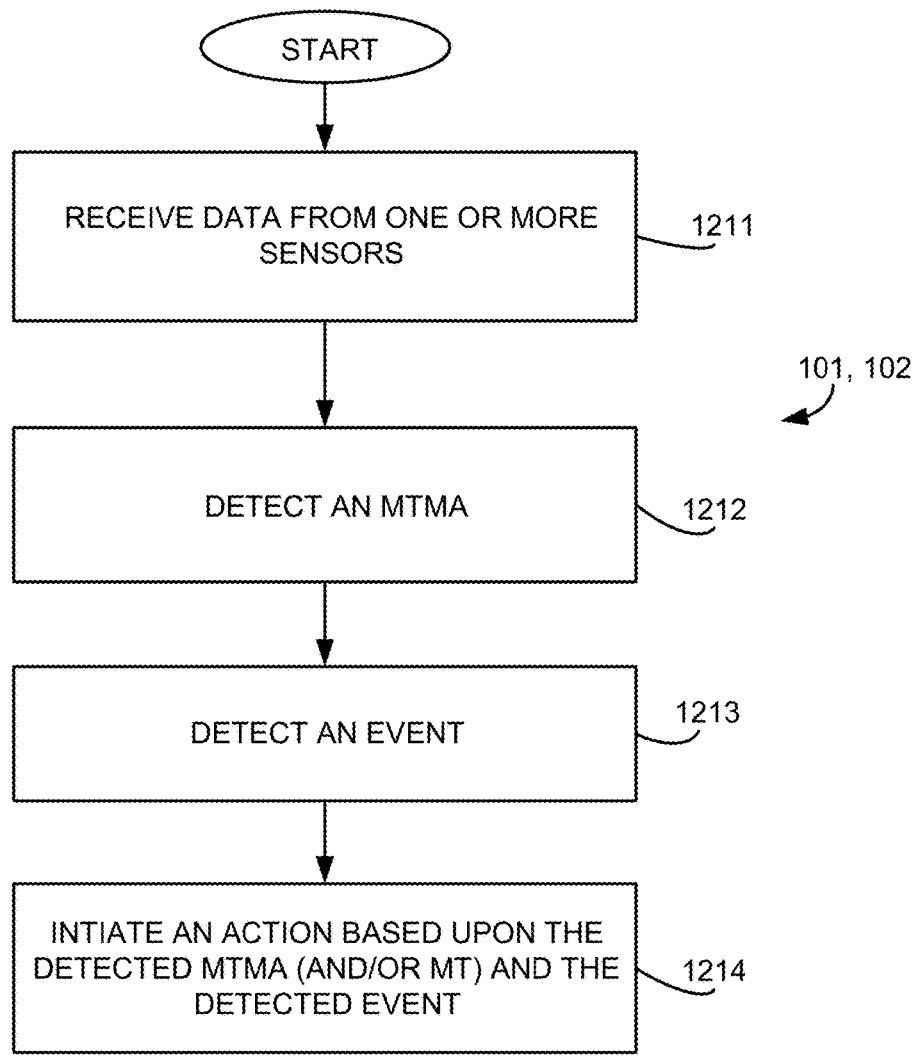

FIG. 24B is a flowchart of an example of a second set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24C:
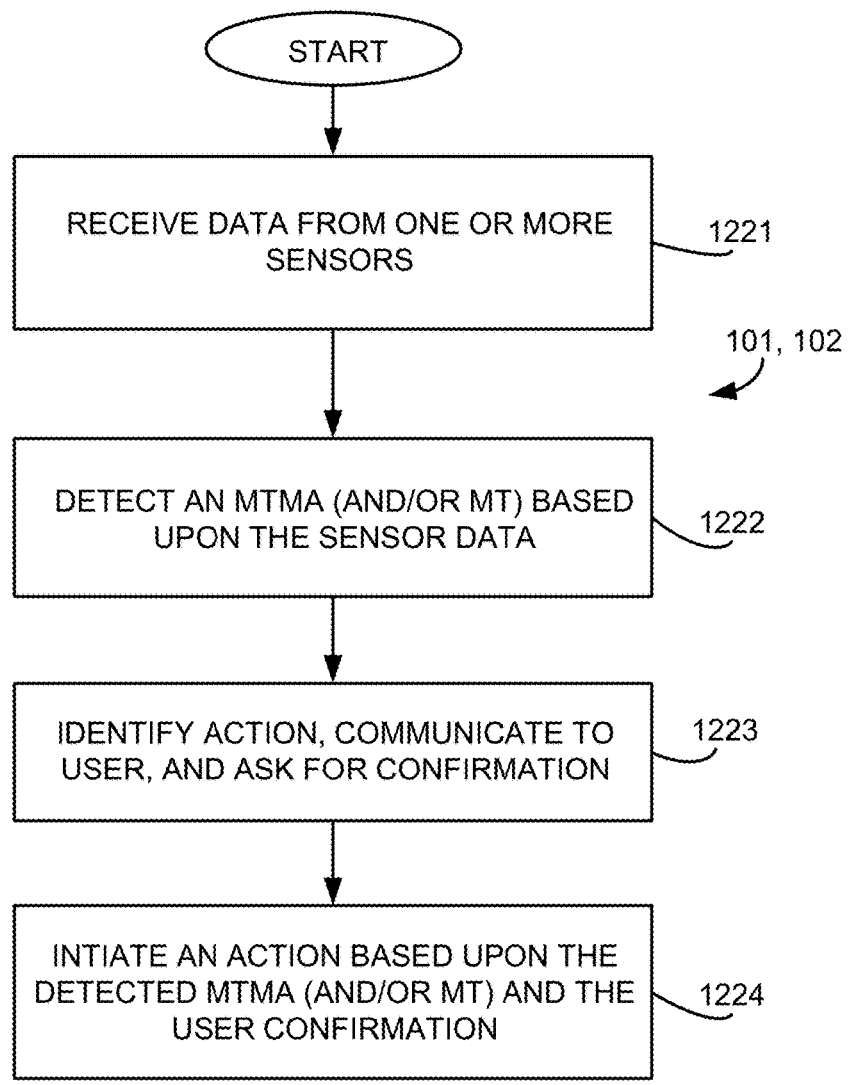

FIG. 24C is a flowchart of an example of a third set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24D:
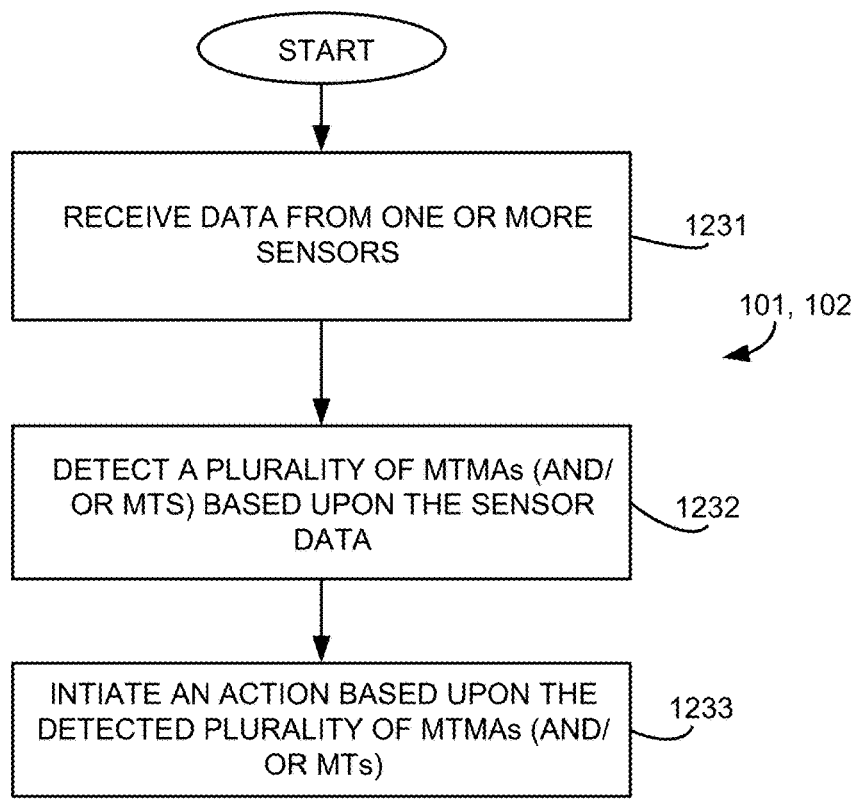

FIG. 24D is a flowchart of an example of a fourth set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24E:
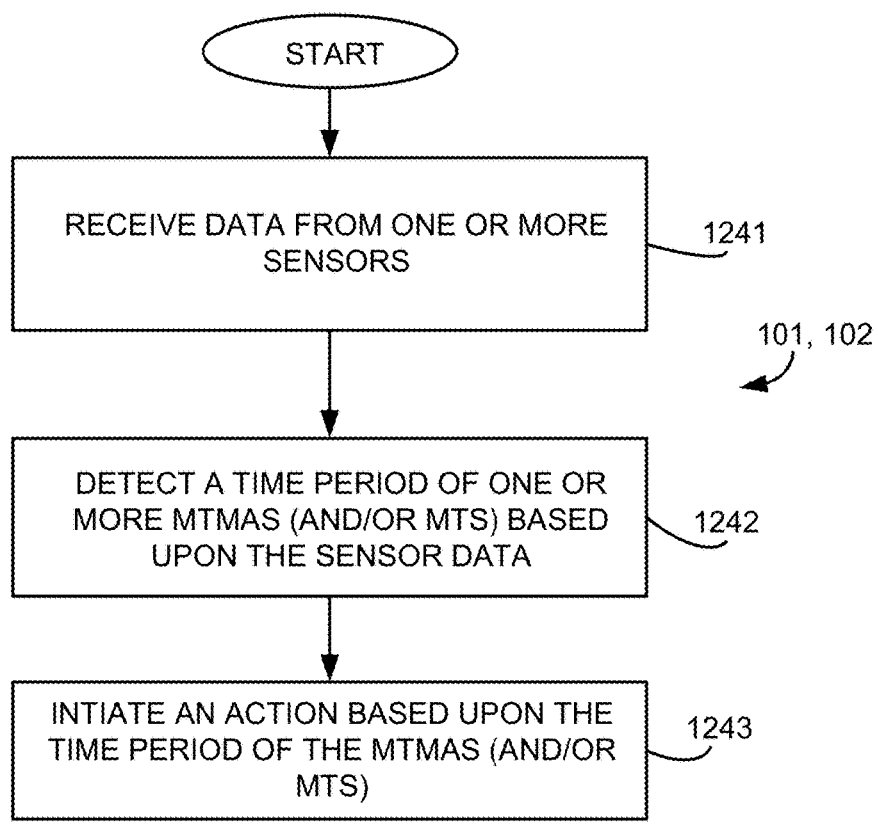

FIG. 24E is a flowchart of an example of a fifth set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24F:
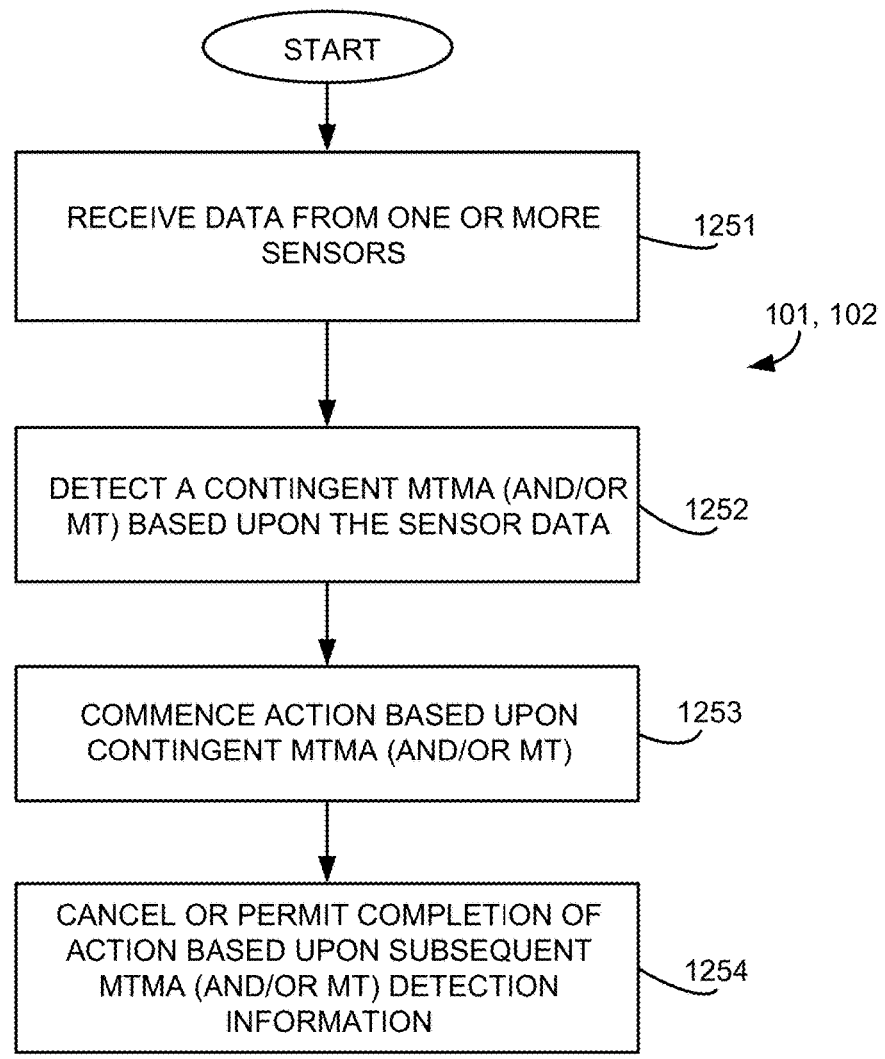

FIG. 24F is a flowchart of an example of a sixth set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24G:
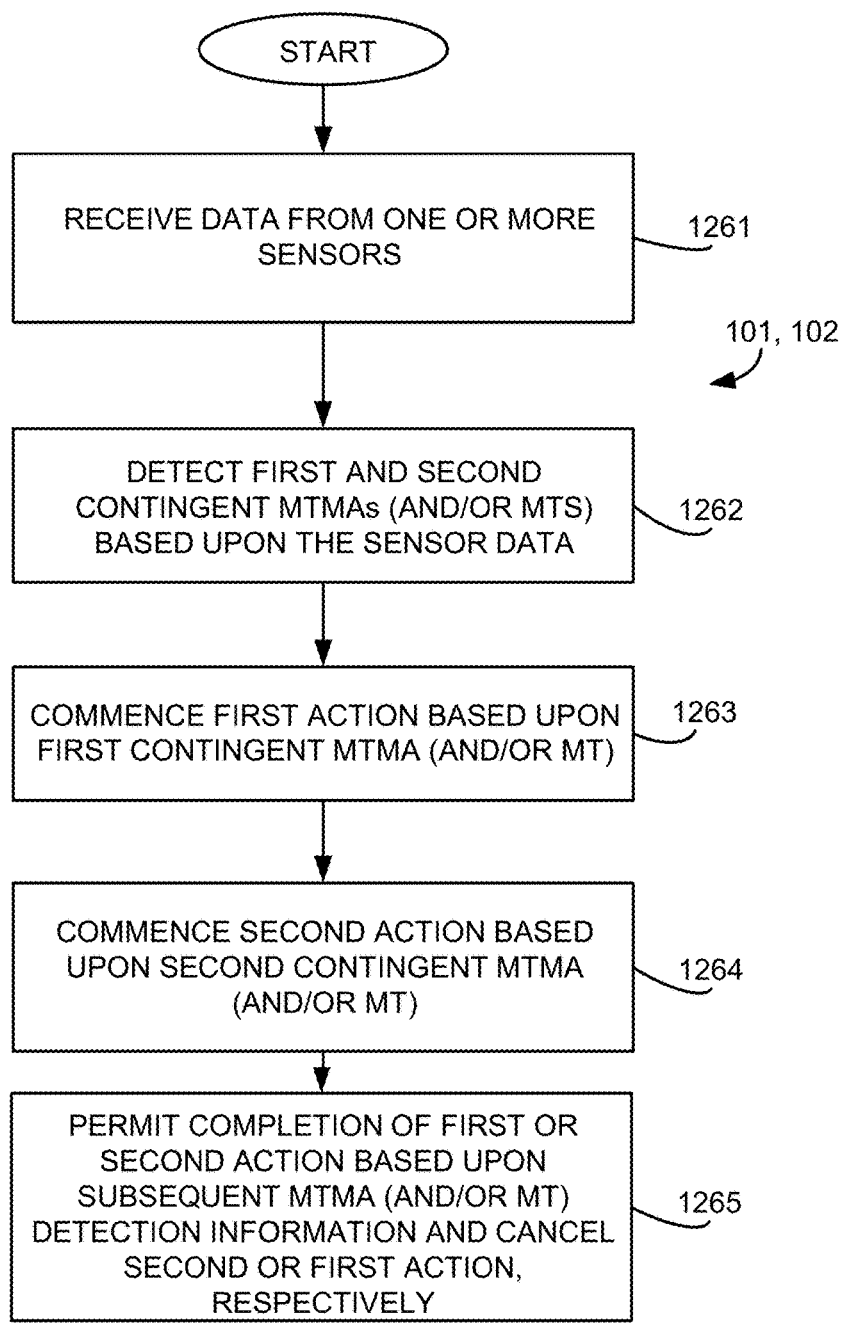

FIG. 24G is a flowchart of an example of a seventh set of embodiments that employ the MTMAI system of FIG. 2D, in whole or in part, and the AD system of FIG. 2D, in whole or in part, in order to detect an MTMA and/or MT and then initiate one or more intelligent activity based actions.

FIG. 24H is a flowchart of an example of an eighth set of embodiments that employ the MTMAI system of FIG. 2D, in whole or in part, and the AD system of FIG. 2D, in whole or in part, in order to detect an MTMA and/or MT and then initiate one or more intelligent activity based actions.

FIG. 24I is a flowchart of an example of a ninth set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24J:
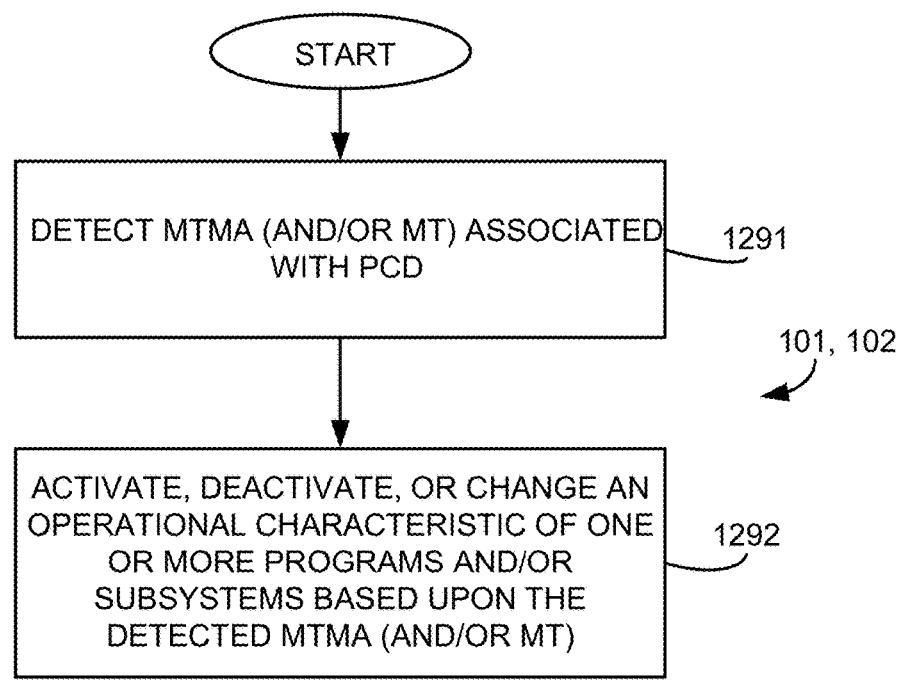

FIG. 24J is a flowchart of an example of a tenth set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24K:
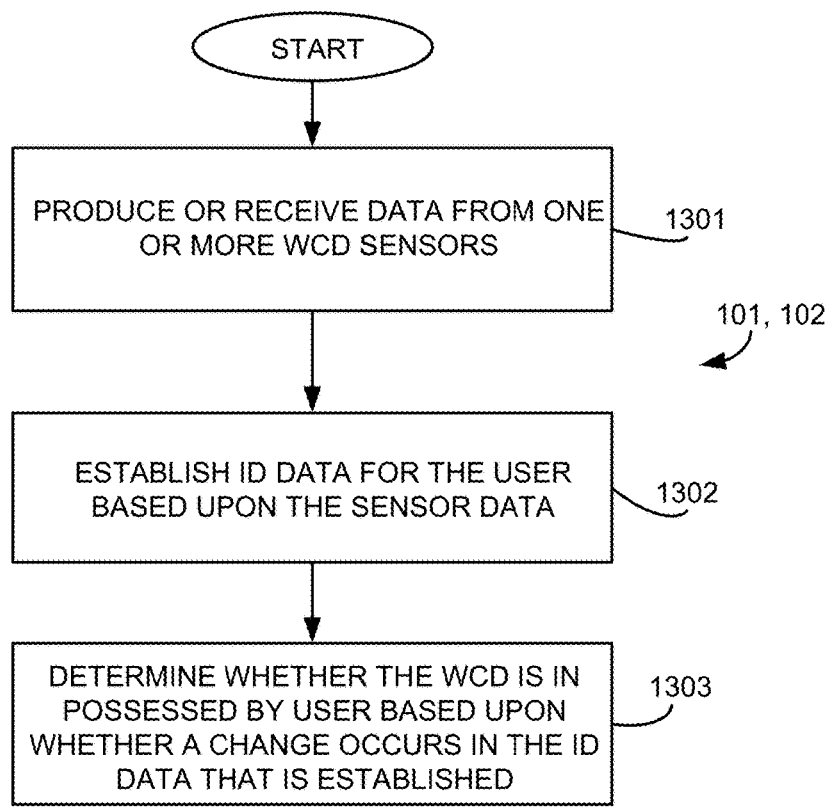

FIG. 24K is a flowchart of an example of an eleventh set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24L:
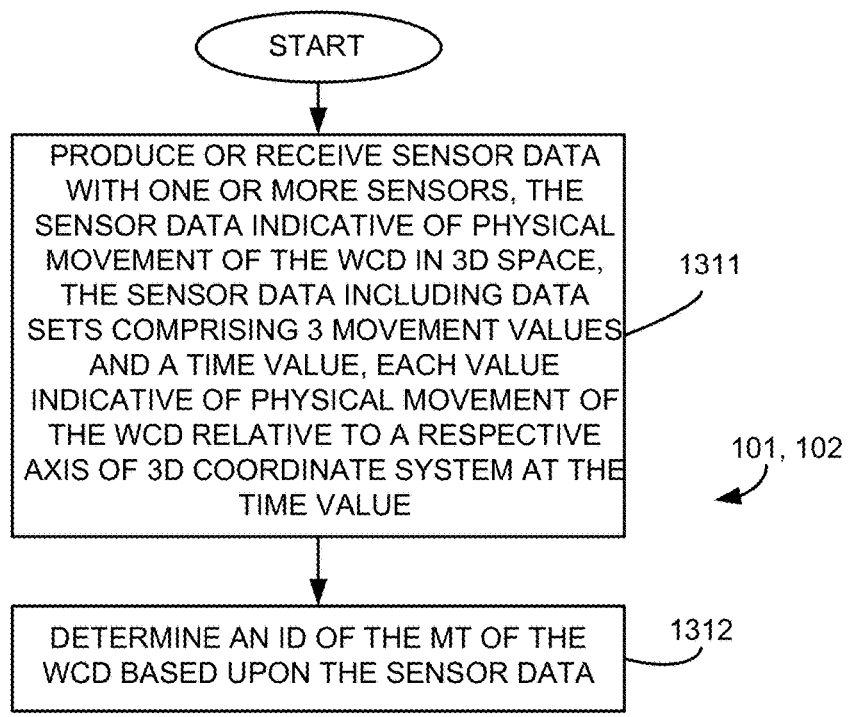

FIG. 24L is a flowchart of an example of a twelfth set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24M:
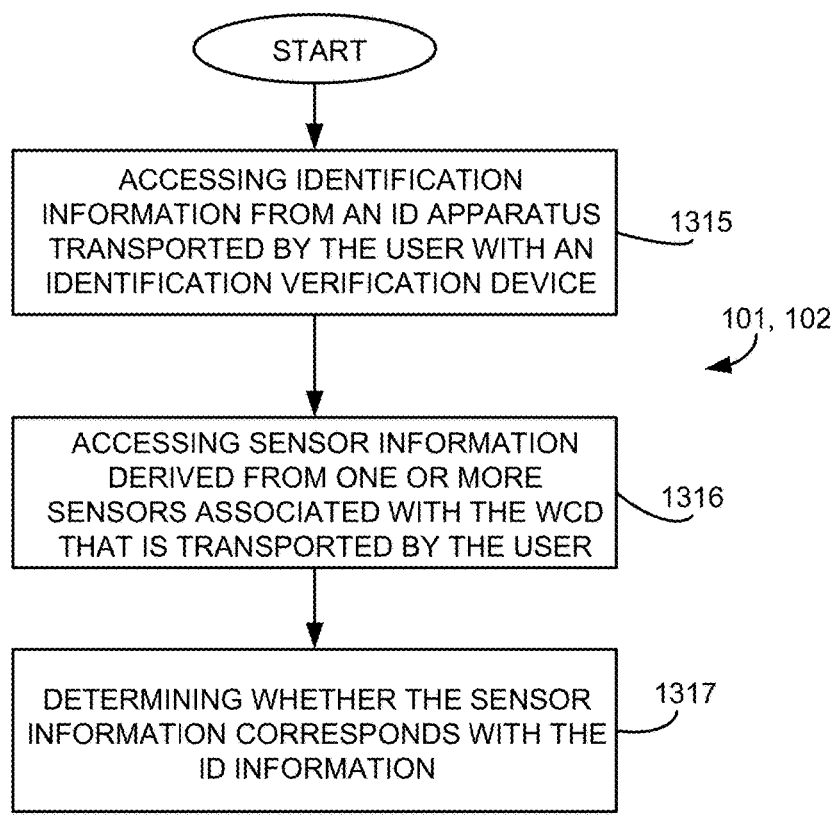
Figure 24N:
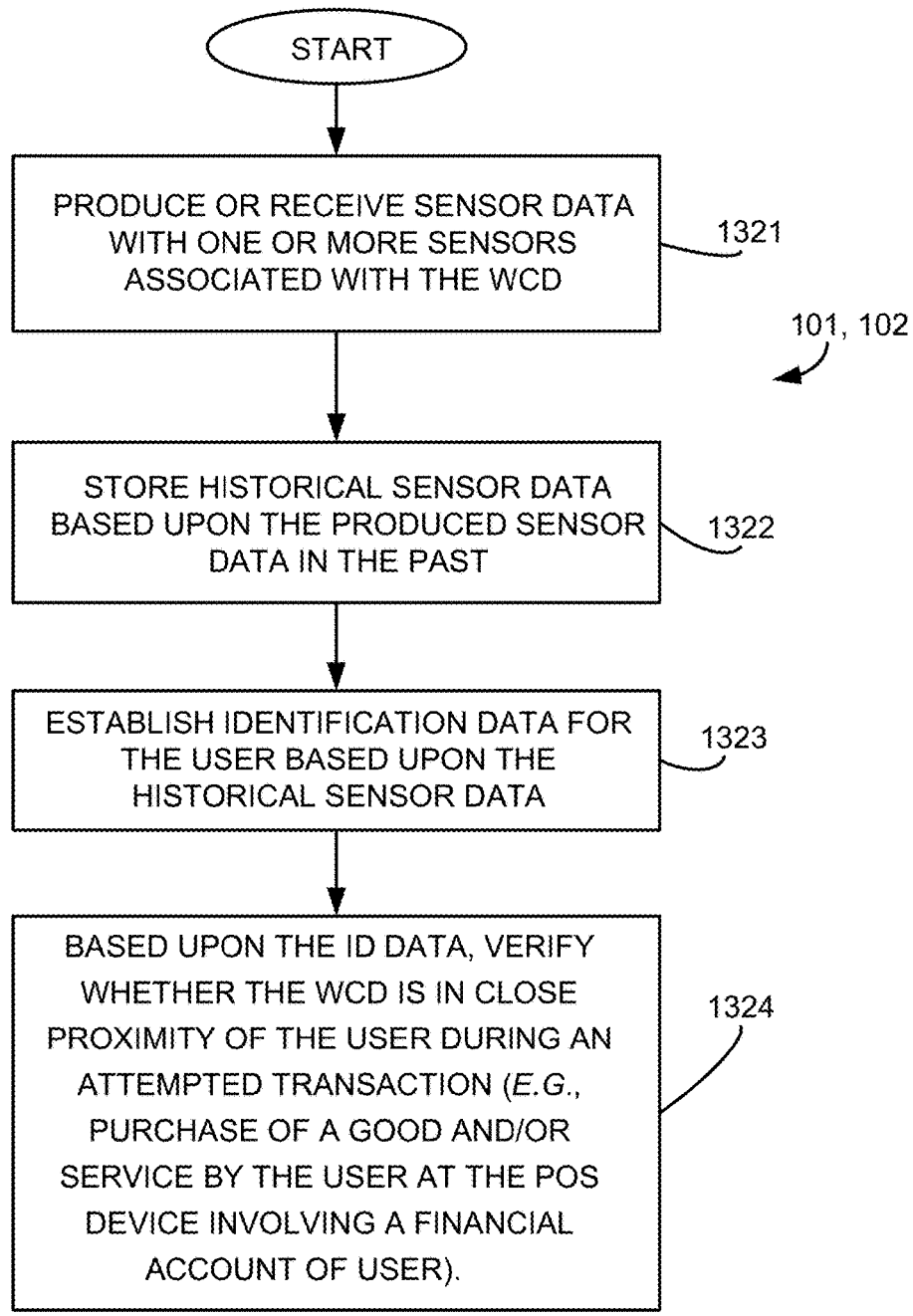
Figure 24O:
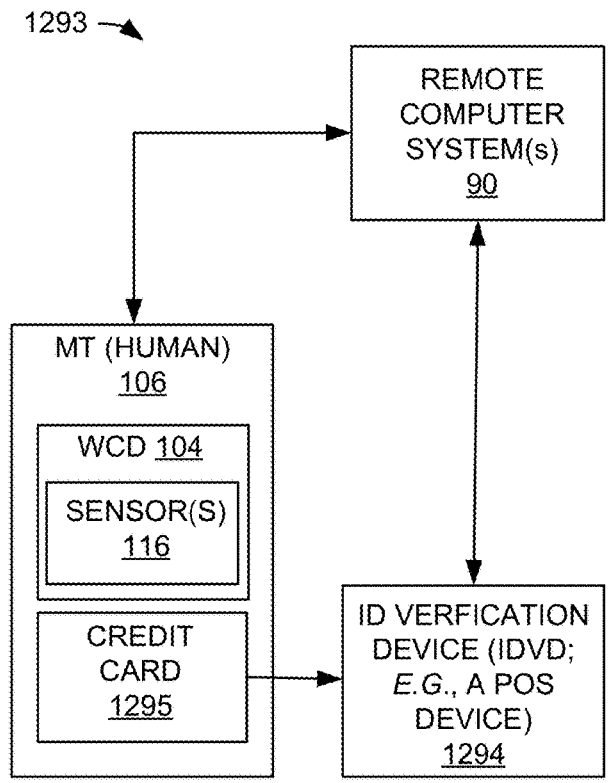

FIG. 24M and FIG. 24O are a flowchart and block diagram, respectively, of an example of a thirteenth set of embodiments that employ the MTMAI system of FIG. 2D, in whole or in part, and the AD system of FIG. 2D, in whole or in part, in order to detect an MTMA and/or MT and then initiate one or more intelligent activity based actions.

FIG. 24N and FIG. 24O are a flowchart and block diagram, respectively, of an example of a fourteenth set of embodiments that employ the MTMAI system of FIG. 2D, in whole or in part, and the AD system of FIG. 2D, in whole or in part, in order to detect an MTMA and/or MT and then initiate one or more intelligent activity based actions.

Figure 24P:
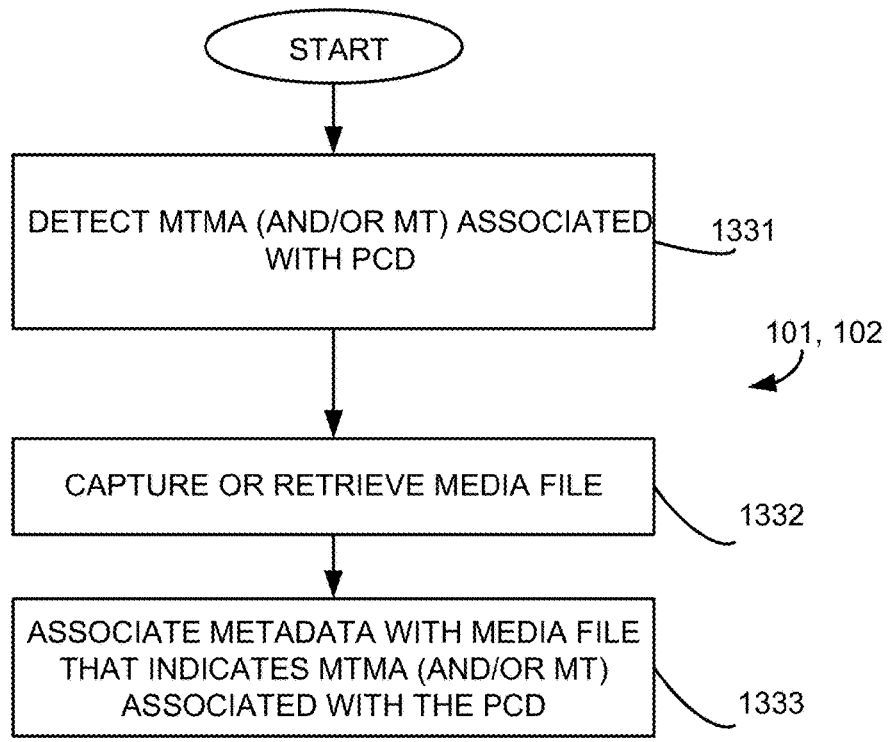
Figure 24Q:
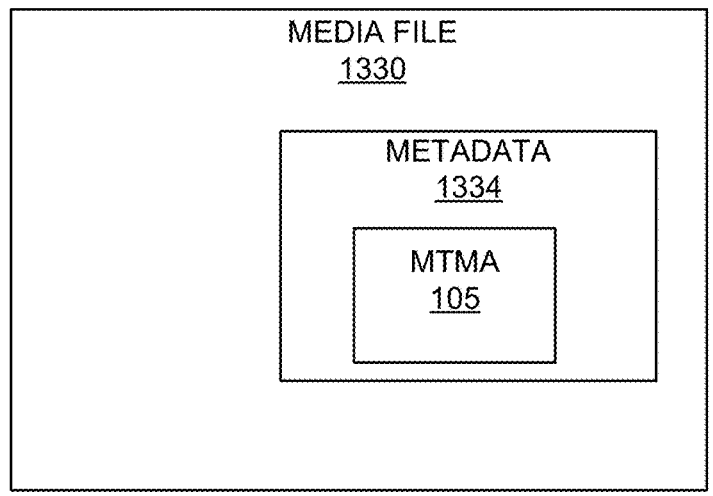

FIG. 24O, FIG. 20P, and FIG. 24Q are a flowchart and block diagram, respectively, of an example of a fifteenth set of embodiments that employ both the MTMAI system of FIG. 2D, in whole or in part, and the AD system of FIG. 2D, in whole or in part, in order to detect an MTMA and/or MT and associate this information, or a derivative thereof, with metadata of a media file.

DETAILED DESCRIPTION OF EMBODIMENTS

Table of Contents

A. MT/MTMA Identification/Action System
B. MTMAI System Overview
C. Overview of Mathematical Techniques For MTMAI System
   1. Fourier Transform
   . Normalization (Rotating) Method
     1. Determining Rotation Angle θ
     2. Code Description for rotating One Data Point
     3. First Alternative Method
     4. Second Alternative Method
E. Computer Based WCD With Software Based MTMAI System and AD System
F. Sensor Output Data Structures
G. MTMAI System
   1. First Set of Embodiments
   2. Second Set of Embodiments
   3. Third Set of Embodiments
   4. Fourth Set of Embodiments
     a. Rotation of the Axes
     b. Statistical Parameters
        i. Basic parameters
        ii. Advanced Parameters
        iii. Fourier Transform (FT)
     c. Architecture/Operation
        i. Analysis for Stationary (Stopped, Standing)
        ii. Analysis for Running (First Time)
        iii. Analysis for Driving (First Time)
        iv. Analysis for Running (Second Time)
        v. Identifying Most Probable MTMA with Comparative Analysis vi. Analysis for Walking (First Time)
   vii. Analysis for Running (Third Time)
   viii Analysis for Driving (Second Time)
   ix Analysis for Biking (First Time)
 5. Fifth Set of Embodiments
 6. Sixth Set of Embodiments
 7. Seventh Set of Embodiments
 8. Eighth Set of Embodiments
H. Embodiments of MTMAI Systems That Employ Correlation
 1. First Mode
 2. Second Mode
 3. Third Mode
 4. Fourth Mode
I. Embodiments of MTMAI Systems that Utilize Filtering
 1. First Set of Embodiments
 2. Second Set of Embodiments
 3. Third Set of Embodiments
J. Embodiments of MTMAI Systems that Utilize Multiple Sensor Data
K. Embodiments of MTMAI Systems that Employ Requests for User Confirmation
L. Embodiments of MTMAI Systems that Employ Exceptions
 1. First Set of Embodiments
 2. Second Set of Embodiments
 3. Third Set of Embodiments
 4. Fourth Set of Embodiments
M. Embodiments of MTMAI Systems that Employ Historical Data Algorithms
 1. First Set of Embodiments
 2. Second Set of Embodiments
 3. Third Set of Embodiments
 4. Fourth Set of Embodiments
N. Embodiments of MTMAI Systems that Employ User Preferences
 1. First Set of Embodiments
 2. Second Set of Embodiments
O. Embodiments of MTMAI Systems that Employ Sensor Data Selection
 1. First Set of Embodiments
 2. Second Set of Embodiments
 3. Third Set of Embodiments
 4. Fourth Set of Embodiments
P. Embodiments of MTMAI Systems that Employ Environmental Event Detection
 1. First Set of Embodiments
  a. Event Detection Logic
   i. First Mode
   ii. Second Mode
   iii. Third Mode
   iv. Fourth Mode
  b. Sensor Selection Logic
  c. MTMA/MT Identification Logic
 2. Second Set of Embodiments
 3. Third Set of Embodiments
 4. Fourth Set of Embodiments
 5. Fifth Set of Embodiments
Q. Embodiments of MTMAI Systems that Employ Data From Multiple WCDs
 1. First Set of Embodiments
 2. Second Set of Embodiments
R. Embodiments of MTMAI Systems that Employ Sampling Rate Changes to Enhance MTMA Detection
S. Embodiments of Action Determination (AD) Systems
T. Embodiments Employing MTMAI System and AD System
 1. First Set of Embodiments
 2. Second Set of Embodiments
 3. Third Set of Embodiments
 4. Fourth Set of Embodiments
 5. Fifth Set of Embodiments
 6. Sixth Set of Embodiments
 7. Seventh Set of Embodiments
 8. Eighth Set of Embodiments
 9. Ninth Set of Embodiments
 10. Tenth Set of Embodiments
 11. Eleventh Set of Embodiments
 12. Twelfth Set of Embodiments
 13. Thirteenth Set of Embodiments
 14. Fourteenth Set of Embodiments
 15. Fifteenth Set of Embodiments
U. Variations, Modifications, and Other Possible Applications
V. Appendix

BODY OF DESCRIPTION

A. MT/MTMA Identification/Action System

The present disclosure provides systems, methods, and apparatus for accurately detecting an identification (ID) of a mobile thing (MT) and/or detecting a mobile thing motion activity (MTMA) associated with the MT, such as a person, by analyzing data produced directly or indirectly by one or more sensors associated with a wireless communication device (WCD) transported (e.g., carried, moved, etc.) by the MT, so as to enable or initiate a further one or more intelligent ID-based and/or activity-based actions, for example, but not limited to, generation of a report, creation and communication of a message to another communication device, actuation of a local WCD function, verification of a credit card action, etc. The MTMAs can include, for example but not limited to, standing/stationary, walking, running, driving, skiing, sleeping, snoring, hiking, skateboarding, sky diving, bicycling, unicycling, golfing, falling down, swimming, riding a ski lift, a motor vehicle, a motorcycle, an airplane, a train, or a water vessel, accelerating or decelerating in a motor vehicle, motorcycle, train, airplane, or water vessel, vibrating, propagating through a medium, rotating, riding in a wheelchair, looking or not looking or looking at an angle at a WCD display, assuming a position relative to the WCD, etc. The MT can be a person or other vehicle capable of mobility and of transporting the WCD. The WCD can be any device that is transportable by the MT that can wirelessly communicate accelerometer information, identified MTMA information, and/or action determination (AD) information in order to enable implementation of an intelligent action based upon the identified MT and/or MTMA. Nonlimiting examples of a WCD include a wireless telephone, a wireless smartphone, a digital camera, a portable computer, watch, or eyeglasses with wireless communication capabilities, a wireless game controller, etc.

The ID of the MT 106 can be any indicia that delineates the MT 106 separately from others. The ID can enable anonymous or specific profiling, if desired. An ID for an MT 106 in the form of a motor vehicle may be, for example but not limited to, a type of vehicle, a license plate number, a vehicle ID number (VIN), any characteristic or condition of the motor vehicle, whether the motor vehicle is being used for business or pleasure (so mileage can be tracked for tax purposes), etc. An ID for an MT 106 in the form of a bicycle may be, for example but not limited to, a type of bicycle, whether the bicycle is for the road or dirt, etc. An ID for an MT 106 in the form of a person may be, for example but not limited to, the specific name of the person, a characteristic of the person such as gender, age, or race of the person, a social security number, a bank account number, a credit card number, a pseudo name, such as "User 1" or "Anonymous 1," a fingerprint data, a code name, a stress level of a person, a skill level of a person, etc.

Figure 1:
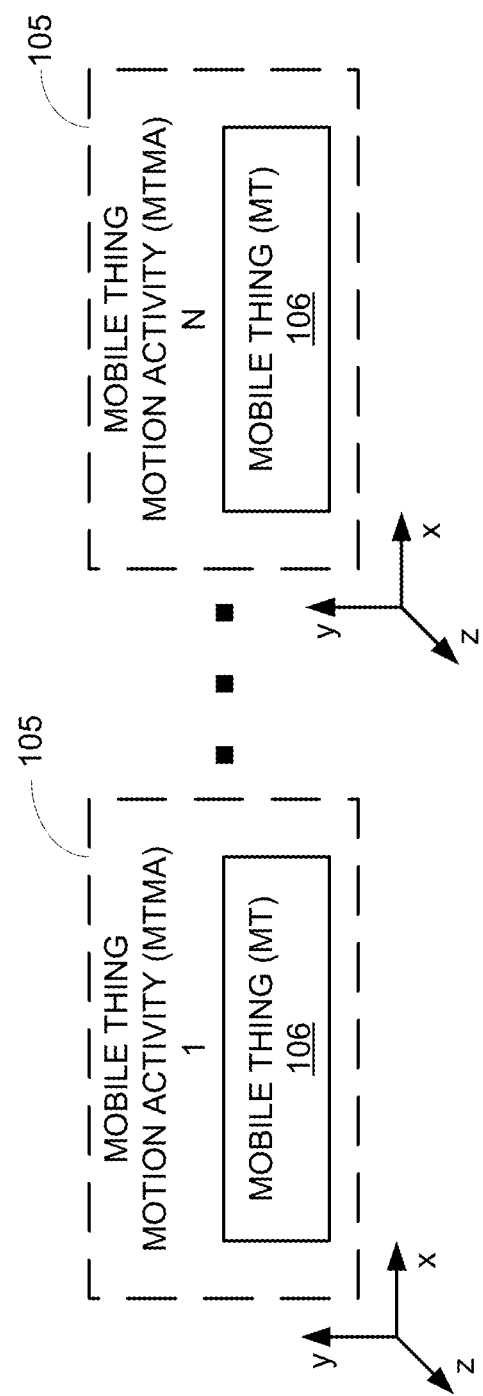
FIG. 1 is a block diagram illustrating that a mobile thing (MT) can be involved in a plurality of mobile thing motion activities (MTMAs) 1 to N.

FIG. 1 is a block diagram illustrating that the MT 106 can be involved in one or more, many times a plurality of MTMAs 105, denoted 1 to N, where N is any number. In order to practice the proposed intelligent messaging, the ID of the MT 106 is identified and/or the MTMA 105 in which the MT 106 is engaged in is identified.

FIGS. 2C, 2B, and 2C show block diagrams illustrating exemplary first, second, and third sets of embodiments 100a, 100b, 100c of an MT/MTMA identification/action system, respectively.

With reference to FIG. 2A, in the first set of embodiments 100a, (a) an MT and MTMA identification (MTMAI) system 101 that identifies the MT 106 and/or the MTMA 105 from the sensor data 96 and (b) an action determination (AD) system 102 that determines an intelligent action to initiate based upon the detected MT ID and/or the detected MTMA 105 are both remotely situated from the WCD 104 of the MT 106, for example, in one or more remote computer systems (RCSs) 90, as shown. The MTMAI system 101 and the AD system 102 may reside in the same or different systems/apparatus, situated locally or remotely. The WCD 104, the MTMAI system 101, and the AD system 102 can be communicatively coupled via any suitable communication scheme. Furthermore, the MTMAI system 101 and the AD system 102 of FIGS. 2A, 2B, and 2C can be implemented in computer software, hardware circuitry, or a combination thereof. As an example, each of the MTMAI system 101 and the AD system 102 could be implemented separately in one or more computer systems. In this embodiment, the WCD 104 can be designed to communicate accelerometer data 120 (FIG. 3), preprocessed accelerometer data, and/or a derivative of either of the foregoing to the MTMAI system 101 in order to enable the MTMAI system 101 to identify the MT 106 and/or the MTMA 105. In this embodiment, the MTMAI system 101 can be designed to communicate an MT identity, an MTMA identity, preprocessed MT identity information, preprocessed MTMA identity information, and/or a derivative of any of the foregoing to the AD system 102 in order to enable the AD system 102 to take an action or to make a decision regarding an action.

With reference to FIG. 2B, in the second set of embodiments 100b, (a) the MTMAI system 101 that identifies the MT 106 and/or the MTMA 105 from the sensor data 96 situated in the WCD 104 and (b) the AD system 102 that determines an action to initiate based upon the MTMA 105 is remotely situated from the WCD 104 of the MT 106, for example, in one or more RCSs 90, as shown. The WCD 104 with the MTMAI system 101 can be communicatively coupled to the AD system 102 via any suitable communication scheme. In this embodiment, the MTMAI system 101 can be designed to communicate an MT identity, an MTMA identity, preprocessed MT identity information, preprocessed MTMA identity information, and/or a derivative of any of the foregoing to the AD system 102 in order to enable the AS system 102 to take an action or to make a decision regarding an action.

With reference to FIG. 2C, in the third set of embodiments 100c, both the MTMAI system 101 that identifies the MT 106 and/or the MTMA 105 from the sensor data 96 and the AD system 102 that determines an action to initiate based upon the ID of the MT and/or the MTMA 105 are locally situated in the WCD 104 of the MT 106. The WCD 104 may communicate with one or more RCSs 90 in order to provoke action, solicit information, etc.

B. MTMAI System Overview

In one specific embodiment, which is an example among other possible embodiments, the MTMAI system 101 can be designed to identify the following five MTMAs 105: (1) standing, (2) walking, (3) running, (4) biking, and (5) riding.

The MTMA 105 is identified by the MTMAI system 101 by analyzing sensor data 96 from one or more sensors 116 associated with the WCD 104.

The WCD 104 may be positioned anywhere on the body, such as in any pocket, in hand, or otherwise transported or attached. It may also be inside a bag, including but not limited to, a backpack, purse, or fanny pack. The WCD 104 can also be attached to an object moving with the body, such as attached to a bike during the MTMA 105, placed in a cup holder of a motor vehicle, or attached to a movement assistance device (walker, wheelchair, etc.).

C. Overview of Mathematical Techniques for MTMAI System

The following is a list of some of the methods used in calculations and includes some commentary on possible alternative ways to get a similar result.

The coordinates are rotated so that the downward direction is along the z-axis in an x-y-z orthogonal coordinate system.

When attempting to detect the MTMA 105, a first analysis is performed via average and standard deviation (SD). If the MT 106 is almost stationary, then the values are close to constant. In the case of running, the average is much lower and SD is high. The 'average/mean' and 'variance/SD' are most commonly used in previous research on human MT 106. The MTMAI system 101 currently uses average and SD of the vertical acceleration and net horizontal acceleration.

Note that the MTMAI system 101 could also use median (the middle point rather than average) instead of the mean, and it can use variance instead of SD (square of SD), or another measure of data diversity/variability. These two parameters may be used on the net magnitude vector or components individually.

The MTMAI system 101 also uses higher order moments about mean or zero (equivalent of root means square (RMS)). This helps to distinguish between certain biking and walking cases for the MTMA 105. Moreover, the MTMAI system 101 of at least one embodiment uses a 4th order moment of vertical force about zero and 3rd order moment of vertical force about mean.

The current implementation uses two of the higher order moments of the vertical acceleration component. Other higher order moments were studied, and can be utilized in some embodiments. It is likely that as the number of MTMAs 105 to be identified increases, the number of higher order moments used will increase as well.

The MTMAI system 101 also makes use of average square sum integral of the net acceleration from all three directions. Higher values indicate more volatile MTMA 105 such as running or walking. This is sometimes referred to as "signal vector magnitude." See Figo, et al., "Preprocessing Techniques for Context Recognition from Accelerometer Data," *Personal and Ubiquitous Computing*, 14(7): 645-662 (2010), which is incorporated herein by reference in its entirety.

1. Fourier Transform

The MTMAI system 101 makes use of the Fourier Transform in order to transform the data from time domain representation into frequency domain representation. Once the data is converted to a discrete function of frequency as opposed to time, it becomes straightforward to extract information about all the modes of vibrations, such as amplitudes, frequencies and phases, present in the motion. Thus, it becomes possible to identify aspects, such as engine vibrations of a car, heart beat vibrations of a person, frequency of steps during walking, running, or pedaling, etc. This information can theoretically be obtained without performing the Fourier Transform, for example, by simply counting the number of peaks in a time domain data sample or curve fitting the data to a sinusoidal function, but these processes are not as commonly used due to higher complexity and increased computation costs.

The use of Fourier Transform can also allow for filtering and removing noise from the data.

In many of the embodiments related to identifying the MTMA 105, the FT of the vertical direction proved to be more useful than the FT of the horizontal direction.

The first information that the MTMAI system 101 extracts from the FT is the amplitude and position of all the peaks. The maximum peak (its height being the amplitude) and its corresponding frequency are used to identify presence of a dominant oscillatory motion in the MTMA 105. Smaller peaks of comparable height indicate secondary modes of vibration in the MTMA 105.

The MTMAI system 101 also focuses on identifying a single peak versus multiple peaks of comparable height. Walking tends to have multiple frequencies, which show up as several peaks. The case of a single tall isolated peak typically indicates that the MTMA is more likely to be the biking motion activity.

The MTMAI system 101 also compares the average of the FT with the average amplitude at higher frequencies (whether the domain weight of the FT is concentrated at the very beginning or if there is MTMA 105 at higher frequencies as well). This comparison is what separates a significant portion of walking and running from biking and driving. The latter two tend to have higher frequencies, whereas walking and running give almost exclusively low frequencies.

The approach described above of comparing the overall average to the average of a subinterval, or comparing parameter values from one interval to those of another may be utilized in both time and frequency domains. The approach may be applied to averages, as well as SD or other computed values used to describe a data as set or subset.

Another important feature of the motion is the total signal strength or the integral square sum. In the present embodiment the total signal strength calculated in the vertical direction proved useful in identifying MTMA 105. Note that by Parseval's theorem, this calculation can be done in either the frequency or the time domain and both will give a similar result (within machine rounding errors).

D. Normalization (Rotating) Method

In some embodiments, in order to perform accurate MT and/or MTMA identity analysis, the MTMAI system 101 is designed to perform a normalization process in the form of rotation method upon the sampled data. This normalization process is implemented by the algorithms 113 (FIG. 2D), which will be described in detail hereafter. The normalization process enables more accurate statistical analysis of the accelerometer data 120. The rotation method uses the standard matrix rotation. Example of a rotation about the x-axis by angle θ:

$$\begin{bmatrix} x_{rotated} \\ y_{rotated} \\ z_{rotated} \end{bmatrix} = \begin{bmatrix} 1 & 0 & 0 \\ 0 & \cos(\theta) & -\sin(\theta) \\ 0 & \sin(\theta) & \cos(\theta) \end{bmatrix} \begin{bmatrix} x \\ y \\ z \end{bmatrix}$$

The code performs two rotations: First about the x-axis (making the y coordinate to 0), then about the y-axis (making the x coordinate to 0).

1. Determining Rotation Angle

The angle of rotation is determined by finding effectively stationary points during the MTMA 105. The stationary points are the ones that have the net force of magnitude 1, that is, Earth gravity, so we know the direction of the force is straight down. A point is considered stationary if the magnitude is within δ=0.02 of 1.

$$|1-\sqrt{x^2+y^2+z^2}|<0.02$$

This stationary point is then used to identify the direction of gravity and to compute a rotation matrix, which will rotate the subsequent data points. When the next stationary point is found, a new rotation matrix is generated.

In the preferred embodiment, the matrix is updated on average 4 times per second with sampling frequency of 60 data structures, as shown in FIG. 3, per second.

2. Code Description for Rotating One Data Point

The function takes in a data point (x, y, z) and rotates it. First introduce the tolerance parameter δ or del in the code. This means that if $$|1-\sqrt{x^2+y^2+z^2}|<0.02$$

Equivalent of:

$$\delta L < x^2+y^2+z^2 < \delta U$$

then the data point satisfying this inequality is assumed to be a "stationary point" and is used to compute the rotation matrix.

float del=0.02;
float delU=(1+del)*(1+del);
float delL=(1-del)*(1-del);
float rsize;

Perform the rotation about the x-axis. This means the x-coordinate does not change, while the y-coordinate is rotated to 0 (or machine epsilon if the coordinate is computed from the rotation rather than being set to 0 manually).

Calculate the sin (sx) and cos (cx) of the angle θ=arctan y/z.

$$\sin\theta = \frac{y}{\sqrt{y^2+z^2}} \cos\theta = \frac{z}{\sqrt{y^2+z^2}}$$

$$rsize = x*x + y*y + z*z;$$

if ((rsize > delL) && (rsize < delU))

{

$$dA = 1/sqrt(y*y+z*z);$$

$$cx = z*dA;$$

$$sx = y*dA;$$

Use the values in the rotation matrix:

$$m = \begin{bmatrix} 1 & 0 & 0 \\ 0 & cx & -sx \\ 0 & sx & cx \end{bmatrix} \begin{bmatrix} x \\ y \\ z \end{bmatrix} = \begin{bmatrix} x \\ c_x y - s_x z \\ s_x y + c_x z \end{bmatrix}$$

$$z2 = sx*y + cx*z;$$

$$y = cx*y - sx*z;$$

Repeat this for rotation around the y-axis, but now the angle we are looking at is $2\pi$–arctan x/z=–arctan x/z (by symmetry), where z is the already once rotated value. So, $$\sin\theta = -\frac{x}{\sqrt{x^2+z^2}} \cos\theta = \frac{z}{\sqrt{x^2+z^2}}$$

$$m = \begin{bmatrix} cy & 0 & sy \\ 0 & 1 & -0 \\ -sy & 0 & cy \end{bmatrix} \begin{bmatrix} x \\ y \\ z \end{bmatrix} = \begin{bmatrix} c_yx + s_yz \\ y \\ -s_yx + c_yz \end{bmatrix}$$

$dA = 1/sqrt(x*x + z2*z2);$ // repeat the rotation about the
$y$ – axis $cy = z2 * dA;$ $sy = -x * dA;$ // note the negative $x2 = x*cy + sy*z2;$ $z = -sy*x + cy*z2;$ $x = x2;$ The update the total matrix rotation entries:

$$\begin{bmatrix} 1 & 0 & 0 \\ 0 & cx & -sx \\ 0 & sx & cx \end{bmatrix} \begin{bmatrix} cy & 0 & sy \\ 0 & 1 & 0 \\ -sy & 0 & cy \end{bmatrix} = \begin{bmatrix} cy & sxsy & sycx \\ 0 & cx & -sx \\ -sy & cysx & cycx \end{bmatrix}$$

$sxsy = sx*sy; cxcy = cx*cy;$ $cxsy = cx*sy; sxcy = sx*cy;$

If the rotation matrix was not updated, use the one from the previous data point (values for it are stored globally.)

$$\begin{bmatrix} cy & sxsy & sycx \\ 0 & cx & -sx \\ -sy & cysx & cycx \end{bmatrix} \begin{bmatrix} x \\ y \\ z \end{bmatrix} = \begin{bmatrix} c_yx + s_xs_yy + c_xs_yz \\ c_xy - s_xz \\ -s_yx + s_xc_yy + c_xc_yz \end{bmatrix}$$

else
{

$x2 = cy*x + sxsy*y + cxsy*z;$ $z2 = -sy*x + sxcy*y + cxcy*z;$ $y = cx*y - sx*z;$ $x = x2; z = z2;$

}

3. First Alternative Method

International Application No. PCT/IB2009/054086, filed Sep. 18, 2009, which is incorporated herein by reference, describes systems and methods for estimating the orientation of an accelerometer relative to a fixed reference frame. These systems and methods can be employed in the MTMAI system 101 in order to detect an MTMA 105 and/or ID for an MT 106 with only an accelerometer. Other embodiments include more sensors 116 that provide more sensor data 96 to supplement the accelerometer data in order to assist with MTMA detection.

4. Second Alternative Method

U.S. Pat. No. 8,622,901, which is incorporated herein by reference, describes systems and methods that access accelerometer data and data from biometric sensors associated with a WCD 104 in order to determine a stress level, or stress index, for the WCD user. These systems and methods can be employed in the MTMAI system 101 of the present disclosure to detect an MT ID in the form of a stress level. Then, after determination of the stress level, the AD system 102 can take an appropriate action.

E. Computer Based WCD and RCS with Software Based MTMAI System and AD System

FIG. 2D is a block diagram illustrating an example of a WCD 104 with a computer based architecture that employs the architecture of FIG. 2C. In this embodiment, the MTMAI system 101 and the AD system 102 are implemented in computer software within the WCD 104.

With reference to FIG. 2D, the WCD 104 includes at least a processor(s) 110, such as a microprocessor, a memory(ies) 112, a transmitter(s) and perhaps a receiver(s) (TX/RX(s)) 114, and a sensor(s) 116, for example but not limited to, an accelerometer, a gyroscope, a magnetometer, a pressure sensor, a GPS receiver, a microphone, an altimeter, a heat sensor, a humidity sensor, barometer, gas sensor, air quality sensor, chemical sensor, radiation sensor (dosimeter), light sensor, proximity sensor, etc. All of the foregoing are communicatively coupled via a local interface(s) 118. Note that the sensors 116 can be situated in the WCD 104 or can be remote from the WCD 104 and communicatively coupled to the WCD 104. Further note that, in some embodiments, the processor 110 may implement a neural network in order to accomplish the functionality described herein.

In terms of hardware, the memory 112 comprises all volatile and non-volatile memory elements, including but not limited to, RAM, ROM, etc. In terms of software, the memory 112 comprises at least the following software: an operating system (O/S) 111, the MTMAI system 101, and the AD system 102. The computer program code (instructions) associated with the software in memory 112 is executed by the processor 110 in order to perform the methodologies of the present disclosure.

The sensor data 96 is derived from the one or more sensors 116. This sensor data 96 can be actual sensor measurements or any derivative thereof.

The MTMAI system 101 and/or the AD system 102 (as well as the other computer software and software logic described in this document), which comprises an ordered listing of executable instructions for implementing logical functions, can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable medium" can be any means that can contain or store the program for use by or in connection with the instruction execution system, apparatus, or device. The non-transitory computer readable medium can be, for example but not limited to, an electronic, magnetic, optical, electromagnetic, infrared, or semiconductor system, apparatus, or device. More specific examples (a non-exhaustive list) of the non-transitory computer-readable medium would include the following: a portable computer diskette (magnetic), a random access memory (RAM) (electronic), a read-only memory (ROM) (electronic), an erasable programmable read-only memory (EPROM or Flash memory)

(electronic), an optical fiber (optical), and a portable compact disc read-only memory (CDROM) or DVD (optical).

The transmitter (TX) 114 may be part of a transceiver (TX/RX) that has both a transmitter and a receiver. In either case, the transmitter is connected to an antenna(s) for transmitting sensor information, MT information, MTMA information, and/or action determination information, depending upon the implementation.

The WCD 104 may be equipped with a user input device(s), a user output device, or a combination thereof, denoted by I/O device(s) 120. For example, the WCD 104 may be equipped with a keyboard (soft or hard), a display, etc.

The accelerometer 116 can be one that is designed to output data with respect to one, two, or three axes, depending upon the MTMAs 105 to be identified. In embodiments that use only an accelerometer 116 to detect MTMAs 105, it is preferred that the accelerometer 116 produce acceleration data with respect to three axes (arbitrarily identified by an x, y, z coordinate system).

Figure 2E:
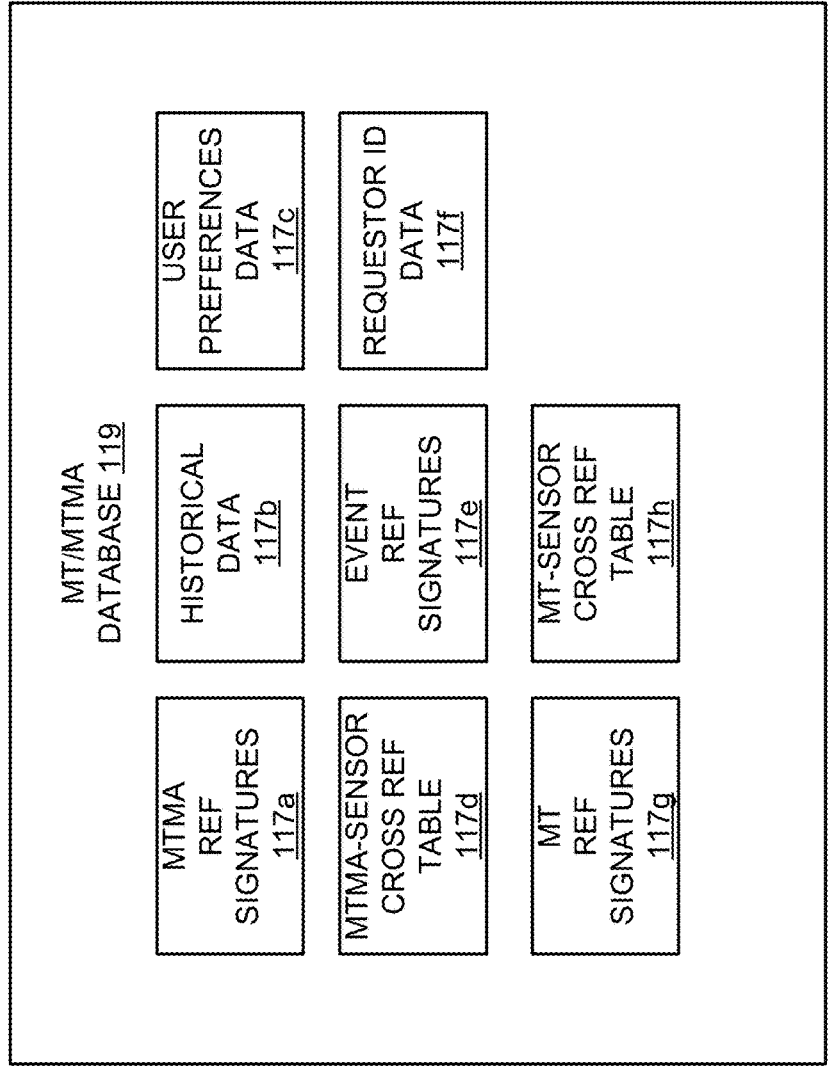
FIG. 2E is a block diagram illustrating an example of an MT/MTMA database that can be employed in the MTMAI system of FIG. 2D.
Figure 2F:
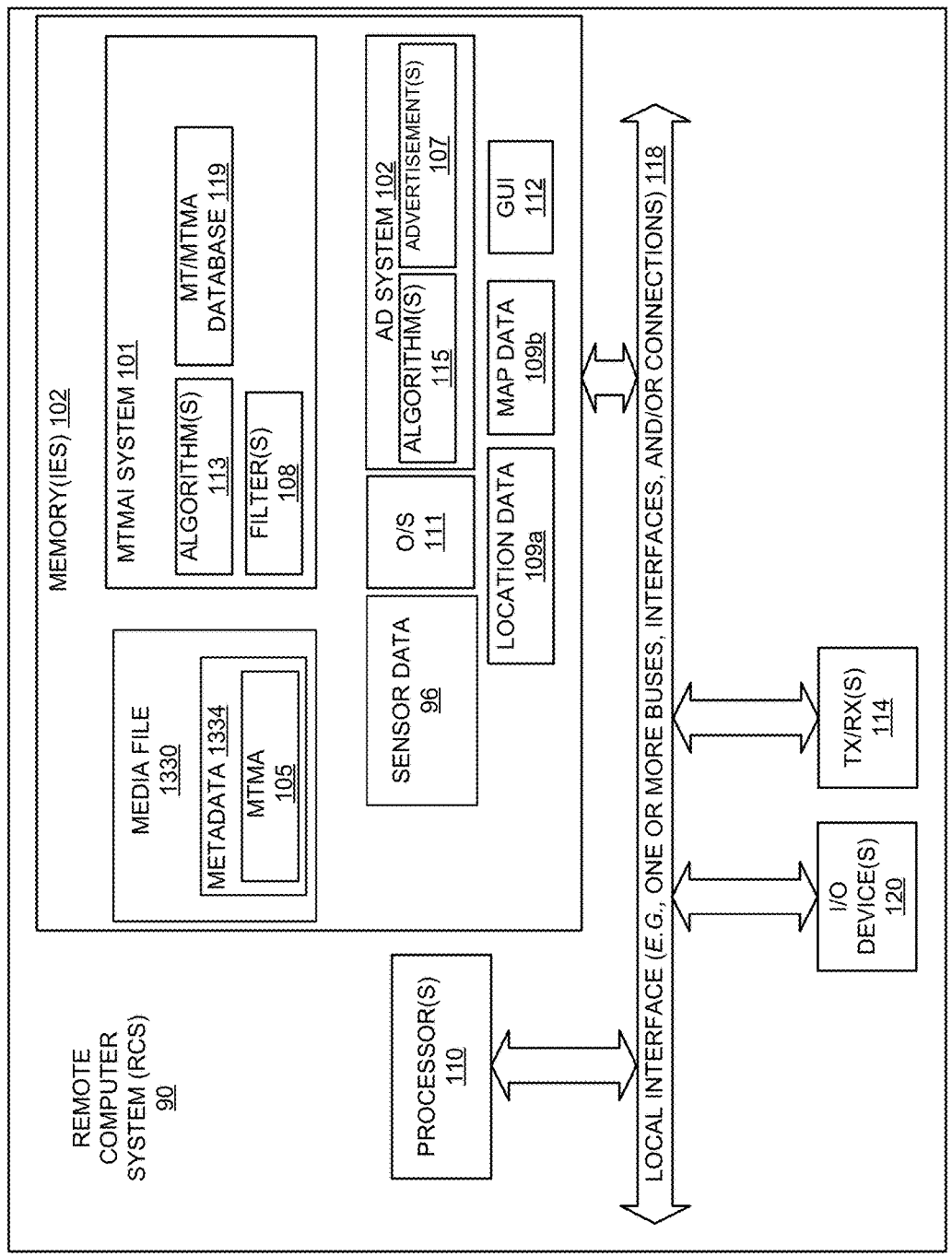
FIG. 2F is a block diagram illustrating an example of a remote computer system (RCS) employing the architecture of FIG. 2A, wherein the MTMAI system and the AD system are implemented in software within the RCS, which is in communication with the WCD in order to receive sensor data or a derivative thereof from the WCD.

FIG. 2E is a block diagram of an example of the MT/MTMA database 119 of FIG. 2D (as well as FIG. 2F discussed hereafter). As shown, the database 119 can include, among things, any of the following, as desired: MTMA reference signatures 117a, historical data 117b, user preferences data 117c, MTMA-sensor cross reference table 117d, event reference signatures 117e, requestor ID data 117f, MT reference signatures 117g, and MT-sensor cross reference table 117h. The MTMA reference signatures and the MT reference signatures are used to identify MTMAs 105 and MTs 106, respectively. Furthermore, these reference signatures can be captured locally or received from an RCS 90.

FIG. 2F is a block diagram illustrating an example of an RCS 90 employing the architecture of FIG. 2A, wherein the MTMAI system 101 and the AD system 102 are implemented in software within the RCS 90, which is in communication with the WCD 104 in order to receive sensor data 96 or a derivative thereof from the WCD 104.

Note that the RCS 90 can be associated with a motor vehicle so that sensor data 96 is communicated from a WCD 104 to the motor vehicle RCS 90. U.S. Pat. No. 8,635,091 describes a system and method for linking a WCD 104 in the form of a smartphone with a motor vehicle RCS 90. This system and method can be employed in the embodiments of this disclosure.

F. Sensor Output Data Structures

Examples of inertial sensors 116 that can be used in connection with the present disclosure include, for example, an accelerometer to measure linear acceleration and earth gravity vectors, a gyroscope to measure angular velocity, a magnetometer to measure earth's magnetic fields for heading determinations, or a combination thereof. These sensors 116 can be one, two, or three axis devices. The devices can be integrated together in the same device. For example, the model ADIS16400/ADIS16405 iSensor, which is commercially available microelectromechanical system (MEMS) from Analog Devices, Inc., U.S.A., has a triaxial gyroscope, a triaxial accelerometer, and a triaxial magnetometer. Simply put, to achieve better accuracy, information should be analyzed in connection with as many degrees of freedom (DOF) as possible.

Furthermore, a sensor 116 in the form of a pressure sensor that can measure air pressure can be used to directly determine altitude.

FIG. 3A is an example of an output data structure from the three-axis accelerometer 116 that can be employed as one of the sensors of FIG. 2D. The accelerometer 116 can be a commercially available MEMS device. As shown, the accelerometer output data 120 includes a time stamp value 120a, an acceleration value 120b along an x-axis, an acceleration value 120c along a y-axis, and an acceleration 120d along a z-axis. The aforementioned values are typically produced as an output from an analog-to-digital convertor (ADC). The x, y, and z axes are orthogonal. Acceleration g in connection with an axis is equal to the rate of change of velocity along the axis.

In some embodiments, it would be possible to determine the MTMA 105 with an accelerometer 116 alone that produces acceleration data along at least one axis. For example, if the only relevant MTMAs 105 are standing and moving, then identification could be accomplished with a single axis accelerometer 116. Furthermore, the data only needs to be analyzed in the time domain to make the identification.

FIG. 3B is an example of an output data structure from a three-axis gyroscope 116 that can be employed as one of the sensors of FIG. 2D. The gyroscope 116 can be a commercially available microelectromechanical system (MEMS) device. As shown, the gyroscope output data 121 includes a time stamp value 121a, an angular rate of change (velocity) value 121b about an x-axis, an angular rate of change value 121c about a y-axis, and an angular rate of change value 121d about a z-axis. The aforementioned values are typically produced as an output from an analog-to-digital convertor (ADC). The x, y, and z axes are orthogonal.

In some embodiments, it would be possible to determine the MTMA 105 with a gyroscope 116 alone that produces data about one axis. For example, if the only relevant MTMAs 105 are standing and moving, then identification could be accomplished with such a one-axis gyroscope 116. Furthermore, the data only need be analyzed in the time domain to make the identification.

FIG. 3C is an example of an output data structure from a three-axis magnetometer 116 that can be employed as one of the sensors 116 of FIG. 2D. The magnetometer 116 can be a commercially available microelectromechanical system (MEMS) device. As shown, the magnetometer output data 122 includes a time stamp value 122a, a magnetic field strength value 122b along an x-axis, a magnetic field strength value 122c along a y-axis, and a magnetic field strength value 122d along a z-axis. The aforementioned values are typically produced as an output from an analog-to-digital convertor (ADC). The x, y, and z axes are orthogonal.

In some embodiments, it would be possible to determine the MTMA 105 with a magnetometer 116 alone that produces data along one axis. For example, if the only relevant MTMAs are standing and moving, then identification could be accomplished with such a one-axis magnetometer 116. Furthermore, the data only need be analyzed in the time domain to make the identification.

G. MTMAI System

1. First Set of Embodiments

Figure 4A:
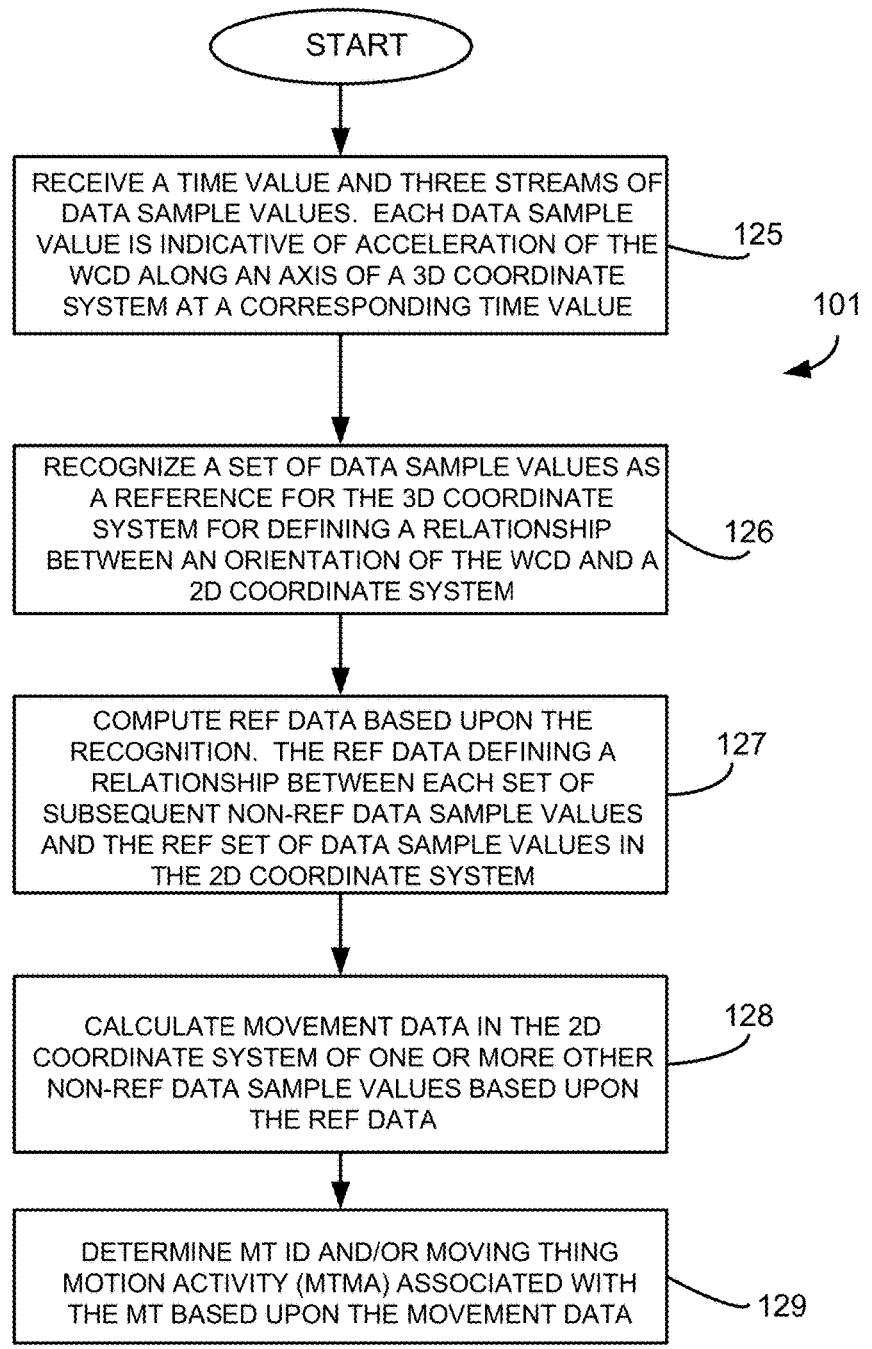
FIG. 4A is a flowchart of an example of a first set of embodiments of the MTMAI system of FIG. 2D.

FIG. 4A is a flowchart of an example of a first set of embodiments of the MTMAI system 101 of FIG. 2D. In these embodiments, as shown in FIG. 4A, the MTMAI system 101 includes at least the following program code (or logic): program code 125 that receives a time value 121

(FIG. 3) and three streams of data sample values 122, 123, 124 (FIG. 3) from an accelerometer 116 (FIG. 2D) of the WCD 104 that is transported by the MT 104, each data sample value 122, 123, 124 indicative of acceleration of the WCD 104 along an axis of a three dimensional (3D) coordinate system at a corresponding time value 121; program code 126 that recognizes a particular set (vector) of data sample values as a reference in the 3D coordinate system for defining a relationship between an orientation of the WCD 104 and a two dimensional (2D) coordinate system; program code 127 that computes reference data (e.g., a rotation matrix) based upon the recognition of the particular set, the reference data defining a relationship between each set of subsequent non-reference data sample values and the particular reference set of data sample values in the 2D coordinate system; program code 128 that calculates movement data in the 2D coordinate system of one or more other non-reference data sample values based upon the reference data; and program code 129 that determines the MTMA 105 and/or MT 106 associated with the MT 104 based upon analyzing the movement data.

In some embodiments, the program code 126 identifies the reference set 120 (FIG. 3) as the set 120 of data sample values that when treated as a 3D vector and mathematically combined to compute the magnitude, results in a resultant magnitude value that is indicative of a relationship to Earth gravity, e.g., the resultant magnitude value is equal to one within a predefined range of error (e.g., the range of 1+0.02 and 1−0.02). In essence, this set 120 of acceleration values is recognized as a vector pointing toward Earth gravity. Reference data (e.g., a rotation matrix) is computed based upon this Earth gravity vector in 3D space so that data sample values can be analyzed in 2D space. Said another way, a vector pointing toward Earth gravity is aligned with the z-axis. So, the two dimensions in space that are defined are the z-axis and the x-y plane for MTMA analysis and identification. As will be further discussed in this document, magnitudes of the data sample values are determined in the two dimensions of space and then statistical metrics are computed based upon the magnitudes, in the time and frequency domains.

Furthermore, in the preferred embodiment, the reference data is updated each time the particular reference set 120 of data samples 121, 122, 123, 124 is recognized. This could be performed less frequently, if desired, depending upon the implementation.

In the preferred embodiments, the reference data is a rotation matrix that rotates new data so that the data is normalized in the 2D space. However, in some embodiments, the reference data can be represented by vector information that is different than a rotation matrix.

In some embodiments, the program code 128 that generates the movement data may be designed to generate the movement data in the form of a vertical magnitude along the z axis and a horizontal magnitude in the x, y plane, both derived from a rotated vector, the rotated vector equal to the rotation matrix M multiplied by the vector associated with the other non-reference data sample values x,y,z. Furthermore, the program code 128 may be designed to transform the movement data to the frequency domain (FD) to produce FD data and to compute one or more FD statistical metrics from the FD data, so that the program code 129 can identify the MTMA 105 is based at least in part upon the FD statistical metrics.

In some embodiments, the MTMA 105 and/or the MT 106 may be identified from a set of known MTMAs 105 and/or set of known MTs 106, respectively. In these embodiments, the program code 129 can be designed to perform a comparative analysis of the set in order to help determine the MTMA 105 and/or MT 106. As an example, in connection with selecting an MTMA 105 from a set, the program code 129 may be designed to compute a score for each MTMA 105 of the known set and to compare the scores to accurately identify the MTMA 105. As another example, in connection with selecting an ID for an MT 106 from a set, the program code 129 may be designed to compute a score for each MT 106 of the known set and to compare the scores to accurately identify the MT 106.

2. Second Set of Embodiments

Figures 4B, 4C:
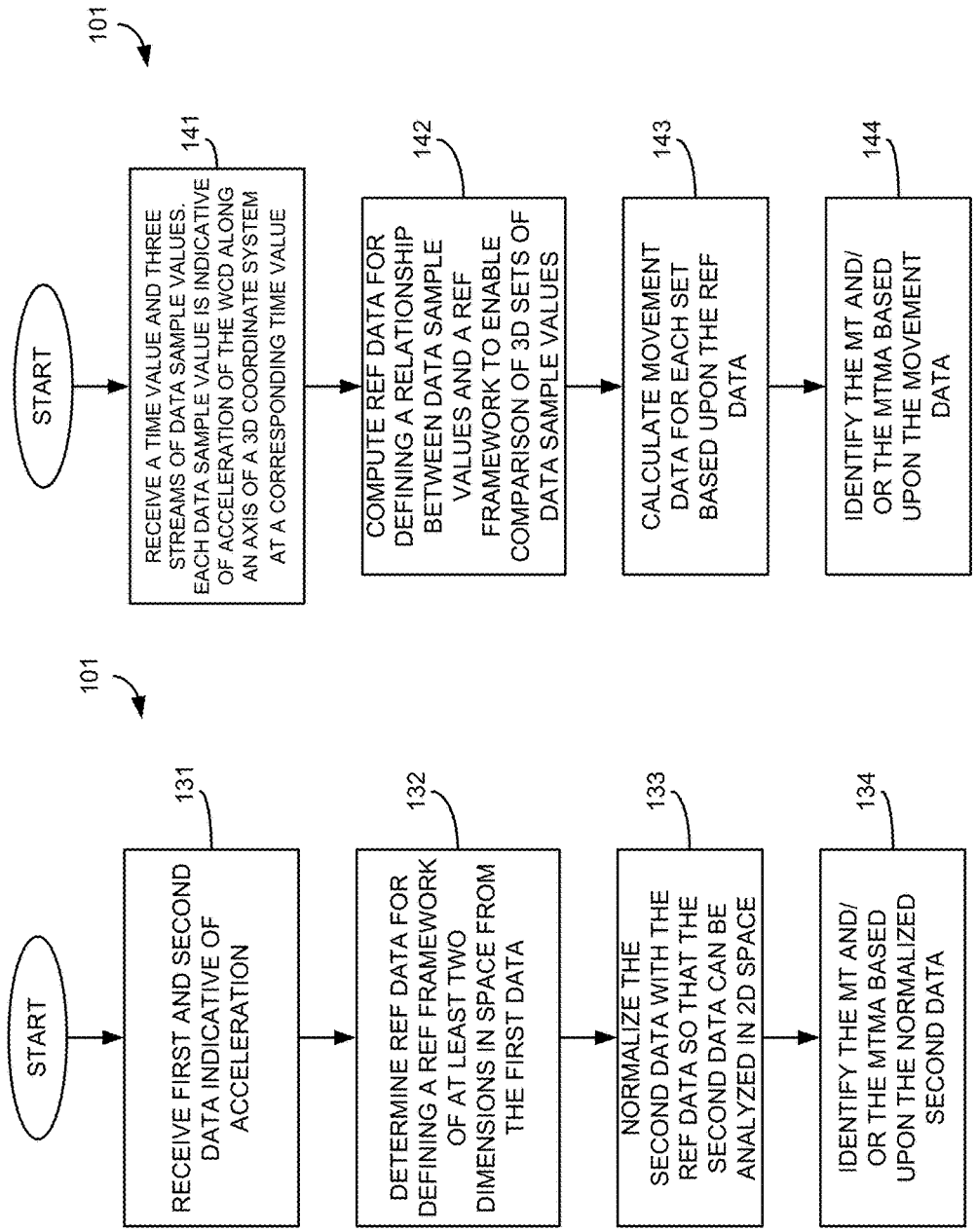
FIG. 4B is a flowchart of an example of a second set of embodiments of the MTMAI system of FIG. 2D.
FIG. 4C is a flowchart of an example of a third set of embodiments of the MTMAI system of FIG. 2D.

FIG. 4B is a flowchart of an example of a second set of embodiments of the MTMAI system 101 of FIG. 2D. In these embodiments, as shown in FIG. 4B, the MTMAI system 101 includes at least the following program code (or logic): program code 131 designed to receive first and second data indicative of acceleration of the WCD 104; program code 132 designed to determine reference data (e.g., a rotation matrix) for defining a reference framework in two dimensions (2D) of space from the first data; program code 133 designed to normalize (e.g., rotating) the second data with the reference data so that the second data can be analyzed in the 2D space; and program code 134 designed to identify the MTMA 105 and/or the MT 106 based upon the normalized second data. The second data may comprise a series of periodic sets 120 of data values.

In the preferred embodiment, the first data is the data structure 120 (FIG. 3) having a combined magnitude equal to one within a predefined range of error (i.e., the range of 1+0.02 and 1−0.02). Moreover, the reference data is preferably a rotation matrix that is frequently updated and that is used to normalize second data samples so that all samples are aligned with Earth gravity and can be more accurately analyzed in 2D space. However, as previously described, in some embodiments, the reference data can be represented by vector information that is different than a rotation matrix.

In some embodiments, including the preferred embodiment, the program code 133 and/or the program code 134 may be designed to calculate a vertical magnitude along the z-axis and a horizontal magnitude in the x-y plane in the time domain, and may be designed to statistically analyze these values to assist in identifying the most probable MTMA 105. The time domain values that can be analyzed, among others, are as follows: an average magnitude along the z-axis, an SD of the z-axis magnitude, an average magnitude in the x-y plane, and SD of the x-y plane magnitude.

In some embodiments, including the preferred embodiment, the program code 133 and/or the program code 134 may be designed to transform the normalized second data from time domain data to frequency domain data using FT, and may be designed to analyze the frequency domain data along with the time domain data in order to accurately identify the MTMA 105.

In some embodiments, the MTMA 105 and/or the MT 106 may be identified from a set of known MTMAs 105 and/or MTs 106, respectively. In these embodiments, the program code 134 can perform a comparative analysis in order to help determine the MTMA 105 and/or MT 106. As an example, the program code 133 and/or program code 134 may be designed to compute a score for each MTMA 105 and/or each MT 106 of the known set and to compare the scores to accurately identify the MTMA 105 and/or MT 106.

3. Third Set of Embodiments

FIG. 4C is a flowchart of an example of a third set of embodiments of the MTMAI system 101 of FIG. 2D. In these embodiments, as shown in FIG. 4C, the MTMAI system 101 includes at least the following program code (or logic): program code 141 designed to receive a time value and three streams of data sample values from the accelerometer 116 of the WCD 104 that is transported by the MT 106, each data sample value indicative of an acceleration of the WCD 104 along an axis of a three dimensional (3D) coordinate system at a corresponding time value; program code 142 designed to compute reference data, the reference data defining a relationship between data sample values and a reference framework to enable comparison of 3D sets 120 of data sample values; program code 143 designed to calculate movement data for each set 120 based upon the reference data; and program code 144 designed to determine the MTMA 105 and/or the MT 106 associated with the MT 106 based upon the movement data.

In some embodiments, the program code 142 identifies the reference set 120 (FIG. 3) as the set 120 of data sample values that when treated as a 3D vector and mathematically combined to compute the magnitude, results in a resultant magnitude value that is indicative of a relationship to Earth gravity, e.g., the resultant magnitude value is equal to one within a predefined range of error (e.g., the range of 1+0.02 and 1−0.02. However, as previously described, in some embodiments, the reference data can be represented by vector information that is different than a rotation matrix.

Furthermore, in the preferred embodiment, the reference data is updated by the program code 142 each time the particular reference set 120 of data samples 121, 122, 123, 124 is recognized. This could be performed less frequently, if desired, depending upon the implementation.

In some embodiments, the program code 143 that generates the movement data may be designed to generate the movement data in the form of a vertical magnitude along the z axis and a horizontal magnitude in the x, y plane, both derived from a rotated vector, the rotated vector equal to the rotation matrix M multiplied by the vector associated with the other non-reference data sample values (x,y,z). Furthermore, the program code 143 may be designed to transform the movement data to the frequency domain (FD) to produce FD data and to compute one or more FD statistical metrics from the FD data, so that the program code 144 can identify the MTMA 105 is based at least in part upon the FD statistical metrics.

In some embodiments, the MTMA 105 and/or the MT 106 may be identified from a set of known MTMAs 105 and/or known MTs 106, respectively. In these embodiments, the program code 143 and/or program code 144 can be designed to perform a comparative analysis in order to help determine the MTMA 105 and/or MT 106. As an example, the program code 143 and/or the program code 144 may be designed to compute a score for each MTMA 105 and/or each MT 106 of the known set and to compare the scores so that the program code 144 can accurately identify the MTMA 105 and/or MT 106, respectively.

4. Fourth Set of Embodiments

Figure 7:
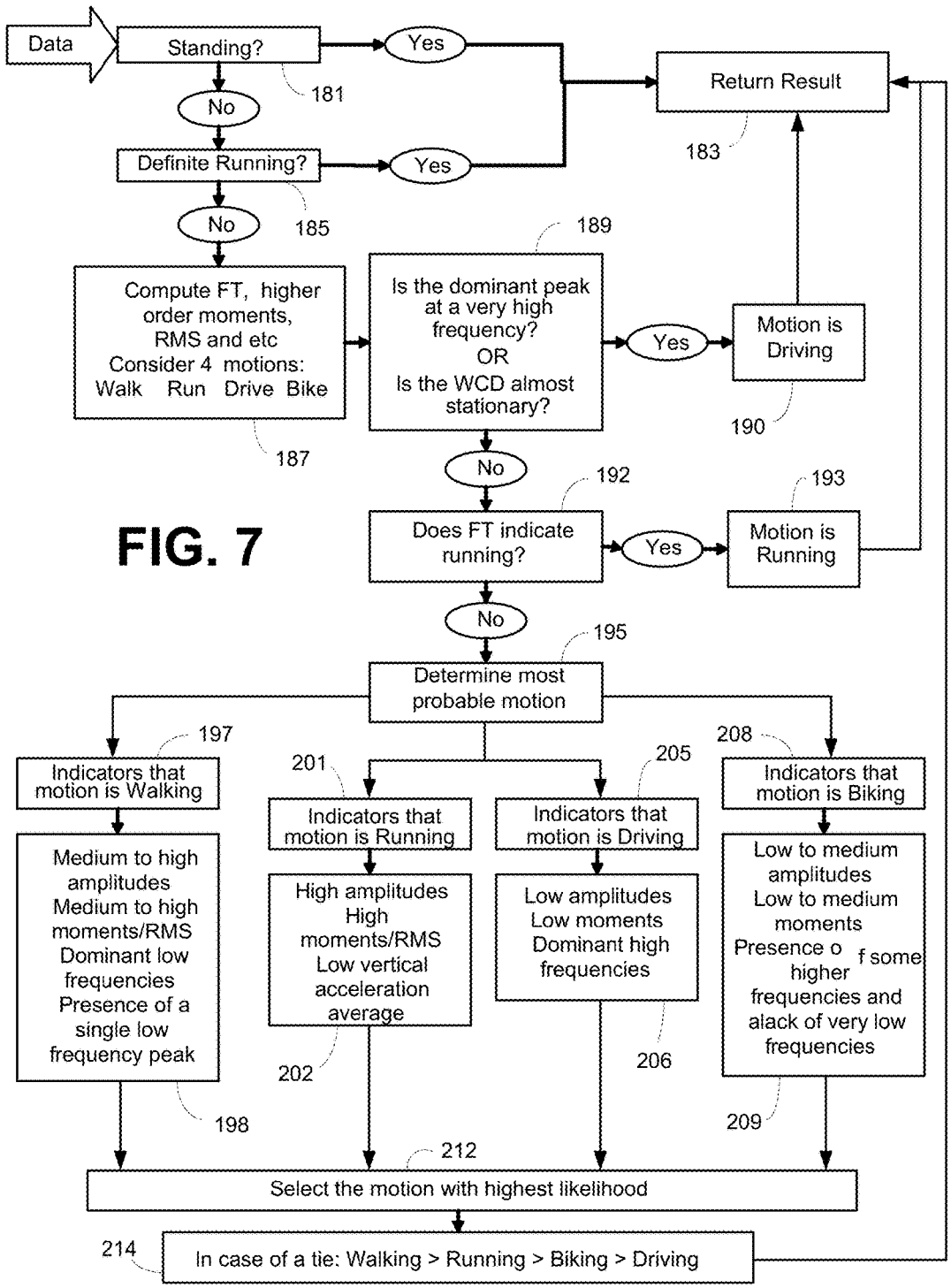
FIG. 7 is a flowchart showing an example of a fourth set of embodiments of the MTMAI system of FIG. 2D, wherein the MTMAI system is used to identify a most probable MTMA from a set of 5 MTMAs, including (1) standing, (2) walking, (3) running, (4) biking, and (5) driving (including travel in a motorized vehicle, such as, but not limited to, an automobile, public transit, etc.).

A fourth set of embodiments of the MTMAI system 101 will now be described with reference to FIGS. 5-7. A normalization process (rotation of coordinate system will be described with respect to FIG. 5. Some statistical parameters that are used in the analysis will be described in connection with FIG. 6. Furthermore, FIG. 7 is a flowchart showing an example of the third set of embodiments of the MTMAI system of FIG. 2D, wherein the MTMAI system is used to identify a most probable MTMA from a set of 5 MTMAs, including (1) standing, (2) walking, (3) running, (4) biking, and (5) driving.

Figure 5:
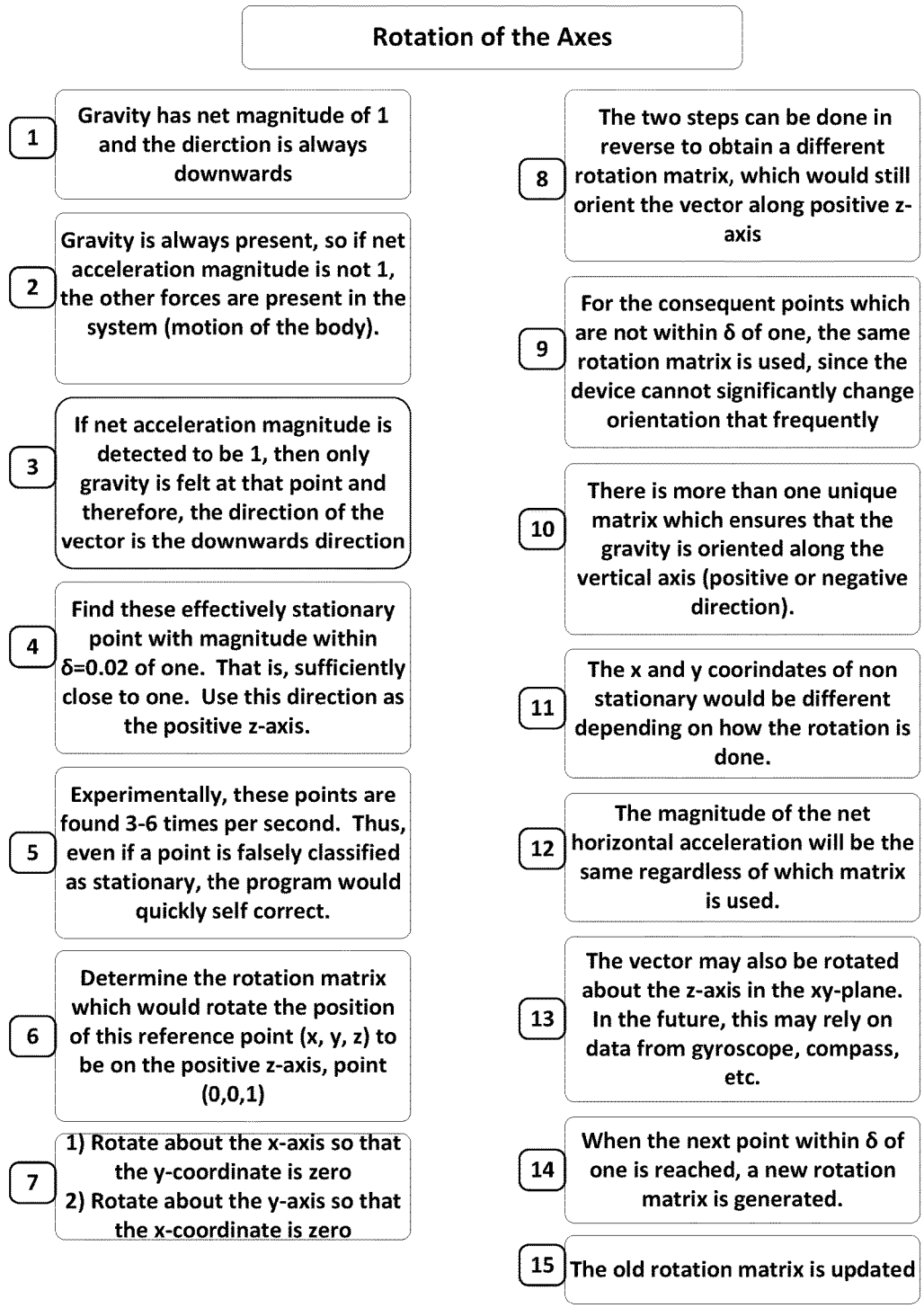
FIG. 5 is an example of a methodology that can be used by the MTMAI system of FIG. 2D to establish a reference framework in two dimensions of space (essentially a cylindrical coordinate system, wherein the reference framework enables normalization of sampled data so that sampled data can be intelligently compared).

Note that the statistical methods described hereafter and shown in connection with FIGS. 5 and 6 can also be used in connection with identifying the MT 106. The MT 106 creates a reference signature by virtue of its movement, and that reference signature can be stored and used as a reference for comparison to identify the MT 106.

a. Rotation of the Axes

FIG. 5 is an example of a methodology that can be used by the MTMAI system 101 to establish a reference framework in two dimensions of space (essentially a cylindrical coordinate system, wherein the reference framework enables normalization of sampled data so that sampled data can be intelligently compared. As shown in FIG. 5, the process for rotating the coordinate system with respect to gravity is as follows in the preferred embodiment:

1. Earth gravity has net magnitude of 1, and the direction is always downward.

2. Earth gravity is always present, so if the net acceleration magnitude is not 1, then the other forces are present in the system (motion of the body).

3. If the net acceleration magnitude is detected to be 1, then only gravity is felt at that point and, therefore, the direction of the vector is the downward direction.

4. These, effectively stationary, points can be found by selecting data points with magnitude sufficiently close to 1. For example, within δ=0.02 of one. Use this direction of this vector as the positive z-axis.

5. Experimentally, these points are found 3-6 times per second, in the preferred embodiment. Thus, even if a point is falsely classified as stationary, the MTMAI system 101 will quickly self-correct.

6. Compute the rotation matrix which will rotate the position of this reference point (x, y, z) to be on the positive z-axis, point (0,0,1).

7. This rotation matrix is determined in two steps: (1) Rotate about the x-axis so that the y-coordinate is zero; and (2) Rotate about the y-axis so that the x-coordinate is zero.

8. The two steps can be done in reverse to obtain a different rotation matrix, which would still orient the vector along positive z-axis.

9. For the subsequent points which are not within δ of one, the same rotation matrix is used, since the WCD 104 cannot significantly change orientation that frequently.

10. There is more than one unique matrix which ensures that the gravity is oriented along the vertical axis (positive or negative direction).

11. The x and y coordinates of non-stationary points would be different depending on how the rotation is performed.

12. The magnitude of the net horizontal acceleration will be the same regardless of which matrix that is used.

13. The vector may also be rotated about the z-axis in the xy-plane.

In some embodiments, this may rely on data from gyroscope, compass, etc.

14. When the next point within δ of one is reached, a new rotation matrix is generated.

15. The old rotation matrix is updated

An example of a vector used to determine gravity is as follows:

$$V_{start}=(0.3, 0.8, 0.52)$$

Since $\sqrt{0.3^2+0.8^2+0.52^2}=\sqrt{1.0004}\approx 1.0002$ is within 0.02 of 1, then the vector is rotated to be oriented along the positive vertical axis:

$$V_{rot}=(0,0,1.0002)$$

And a matrix M is created so that:

$$V_{rot}=M\ V_{start}$$

After rotation, the other two coordinates x, y are 0 (or on the order of machine epsilon, depending on how the rotation is implemented). Current C++ code merely sets them to be zero, but with a MATLAB implementation, which actually does the matrix multiplication, the x, y coordinate are on the order of 1e-16 due to internal rounding errors.

This matrix M is then used to rotate the subsequent data points until a new matrix is found. It is also possible for the number of the subsequent points using this matrix M to be as little as zero if there are two consecutive stationary points, but typically, approximately 10-20 points are rotated before the matrix is updated.

b. Statistical Parameters

FIG. 6 is a description of statistical parameters in the time domain and the frequency domain that can be utilized by the MTMAI system of FIG. 2D to identify a most probable MTMA.

i. Basic Parameters

With reference to FIG. 6, the basic parameters that are used by the MTMAI system 101 in the time domain are as follows:

1. Average, mean, and/or median of the data set. These are a measure of where the data is centered.

2. SD and/or variance. These are a measure of how wide the data is distributed.

3. The foregoing parameters can be calculated from the whole interval or a partial interval. For example, an average of the first half of data points or an average of only one (or more) components can be computed and used in the analysis.

4. The MTMAI system 101 can also calculate average/variance of sets of points selected from the data, such as the average of peak values. Also, the MTMAI system 101 can average several data intervals over a prolonged period of time.

5. Averaging and variance alone can obtain a certain degree of accuracy, requiring very little computation time and in some cases are sufficient.

6. It is possible to apply these basic methods without rotating the data.

7. After a certain accuracy is obtained with average and variance alone, it is very difficult to improve it without resorting to more sophisticated methods.

ii. Advanced Parameters

With reference to FIG. 6, the advanced parameters that are used by the MTMAI system 101 in the time domain are as follows:

1. Higher order moments, calculated about mean, zero, and/or other value. An example of a higher order moment, say $4^{th}$ order moment about its mean, is proportional to:

$$\sum_{i=1}^{n}(v_i-\mu)^4$$

Where n is the number of data points, $v_1$ to $v_n$ are the data values and $\mu$ is the mean.

2. Root mean square (RMS; also can be used as an alternative to SD) or generalized mean.

3. Signal magnitude area, that is, the area encompassed by the magnitude of the signal.

iii. Fourier Transform (FT)

With reference to FIG. 6, the parameters that are analyzed by the MTMAI system 101 in the frequency domain are as follows:

1. The MTMAI system 101 identifies the peaks, which give the amplitude and frequency of all the oscillatory motions present in the data.

2. The human motion activity, such as walking or running, tends to have lower frequencies and motion activity with a transport (car, bike, etc.) has higher frequencies. Thus, the above techniques (averaging, computing RMS, etc.) are applied in higher and lower frequency regions to compare their strength.

c. Architecture/Operation

FIG. 7 is a flowchart showing an example of the architecture and operation of the third set of embodiments of the MTMAI system of FIG. 2D, wherein the MTMAI system is used to identify a most probable MTMA from a set of 5 MTMAs, including (1) standing, (2) walking, (3) running, (4) biking, and (5) driving. This set of embodiments is essentially an even more specific version of the first set of embodiments (FIG. 4A).

i. Analysis for Stationary (Stopped, Standing)

Figure 8:
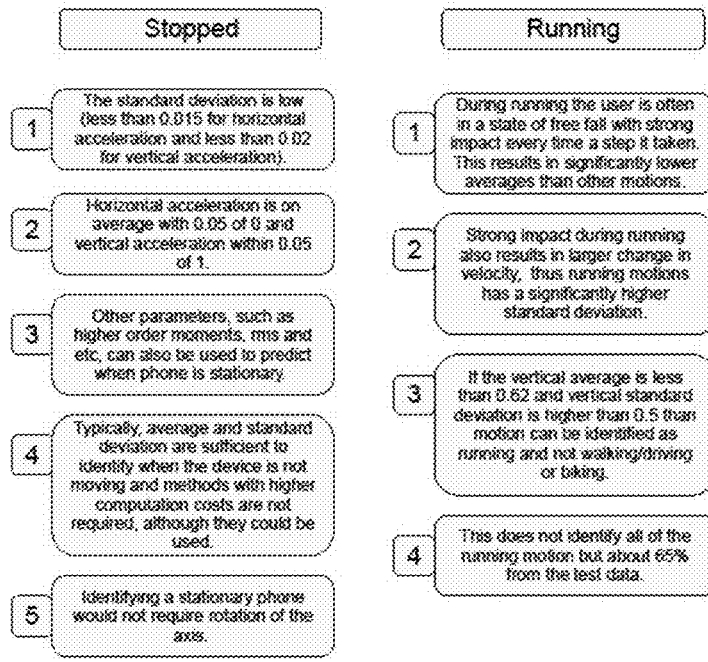
FIG. 8 is a description of parameters/methodology in the time domain, which relies on basic parameters only (see FIG. 6), that can be used by the MTMAI system of FIG. 2D to quickly identify whether the MTMA is stopped or is running (as these MTMAs are more sometimes easily identified than the others) in the exemplary methodology of FIG. 7.

With reference to FIG. 7, as shown at block 181, a determination is made by the logic as to whether the WCD 104 is stationary (stopped, standing). FIG. 8 illustrates the process that is utilized to make this determination, as follows:

1. The SD is sufficiently low (one possible threshold used is less than 0.015 for horizontal acceleration and less than 0.02 for vertical acceleration).

2. Horizontal acceleration is on average sufficiently close to zero (for example, within 0.05 of 0) and vertical acceleration is on average sufficiently close to one (for example, within 0.05 of 1).

3. Other parameters, such as higher order moments, RMS, etc, can also be used to predict when WCD 104 is stationary.

4. Typically, average and SD are sufficient to identify when the WCD 104 is not moving and methods with higher computation costs are not required, although they could be used.

5. Identifying a stationary WCD 104 would not require rotation of the axis.

When a determination is made that the WCD 104 is stationary, then the MTMAI system 101 will return this as the result, as indicated by block 183 of FIG. 7. However, when a determination is made that the WCD 104 is not stationary, then the MTMAI system 101 will attempt to determine if the MT 106 associated with the WCD 104 is running, as shown at block 185.

ii. Analysis for Running (First Time)

As shown in FIG. 8, the analysis performed at block 185 is as follows:

1. During running, the user is often in a state of free fall with strong impact every time a step it taken. This results in significantly lower averages than other motion activities.

2. Strong impact during running also results in larger change in velocity. Thus, the running motion activity has a significantly higher SD.

3. One possible embodiment is the vertical average less than 0.62 and the vertical SD higher than 0.5, then the MTMA 105 can be identified as running and not walking/driving or biking.

4. This does not identify all of the running motion activities but about 65% of the test group data.

When a determination is made that the WCD 104 is running, then the MTMAI system 101 will return this as the result, as indicated by block 183 of FIG. 7. However, when a determination is made that it cannot be concluded with sufficient probability that the MT 106 associated with the WCD 104 is running, then the MTMAI system 101 will transform the horizontal and vertical magnitudes from the time domain to the frequency domain using the FT, as shown at block 187, so that all 4 motion activities can be considered.

iii. Analysis For Driving (First Time)

At this point, the MTMAI system 101 will attempt to determine if the MTMA 105 is driving with the analysis set forth in block 189 of FIG. 7. A first inquiry is made as to whether the dominant peak is at a very high frequency. If so, then the MTMAI system 101 concludes that the MTMA 105 is driving, as indicated at block 190 and the result or a variant thereof is communicated to the action determination system 102, as indicated by block 183. If not, then the MTMAI system 101 will make a second inquiry.

The second inquiry involves determining if the WCD 104 is almost stationary. This is accomplished by identifying low SD in both vertical and horizontal directions, identifying on average a sufficiently small horizontal acceleration and determining that FT shows no peaks or peaks with very low amplitude. If so, then the MTMAI system 101 concludes that the MTMA 105 is driving, as indicated at block 190, and the result or a variant thereof is communicated to the action determination system 102, as indicated by block 183.

iv. Analysis for Running (Second Time)

If not, then the logic of the MTMAI system 101 makes a determination as to whether the frequency domain magnitudes indicate running, as indicated by block 192. This is accomplished by identifying a low frequency peak with sufficiently high amplitude. If so, then the MTMAI system 101 concludes that the MTMA 105 is running, as indicated by block 193, and the result or a variant thereof is communicated to the action determination system 102, as indicated by block 183.

If not, then the logic of the MTMA system 101 will attempt to determine the MTMA 105 with comparative analysis, as is shown by block 195. Parameters that are considered for walking are indicated at blocks 197, 198. Parameters that are considered for running are indicated at blocks 201, 202. Parameters that are considered for driving are indicated at blocks 205, 206. Parameters that are considered for biking are indicated at blocks 208, 209. As indicated by block 212 in FIG. 7, the MTMA 105 with the highest likelihood is ultimately selected. If there is a tie in terms of scores or probabilities, then the following preference scheme is used in the preferred embodiment, as is shown at block 214: walking is selected over running, biking, and driving; running is selected over biking and driving; and biking is selected over driving. This hierarchy is based on the experimental test group for the five motions and may be different when the number of motions is increased. Finally, the result of the comparative analysis is reported by the MTMAI system 101 to the AD system 102, as indicated at block 183.

v. Identifying Most Probable MTMA with Comparative Analysis

Figure 9:
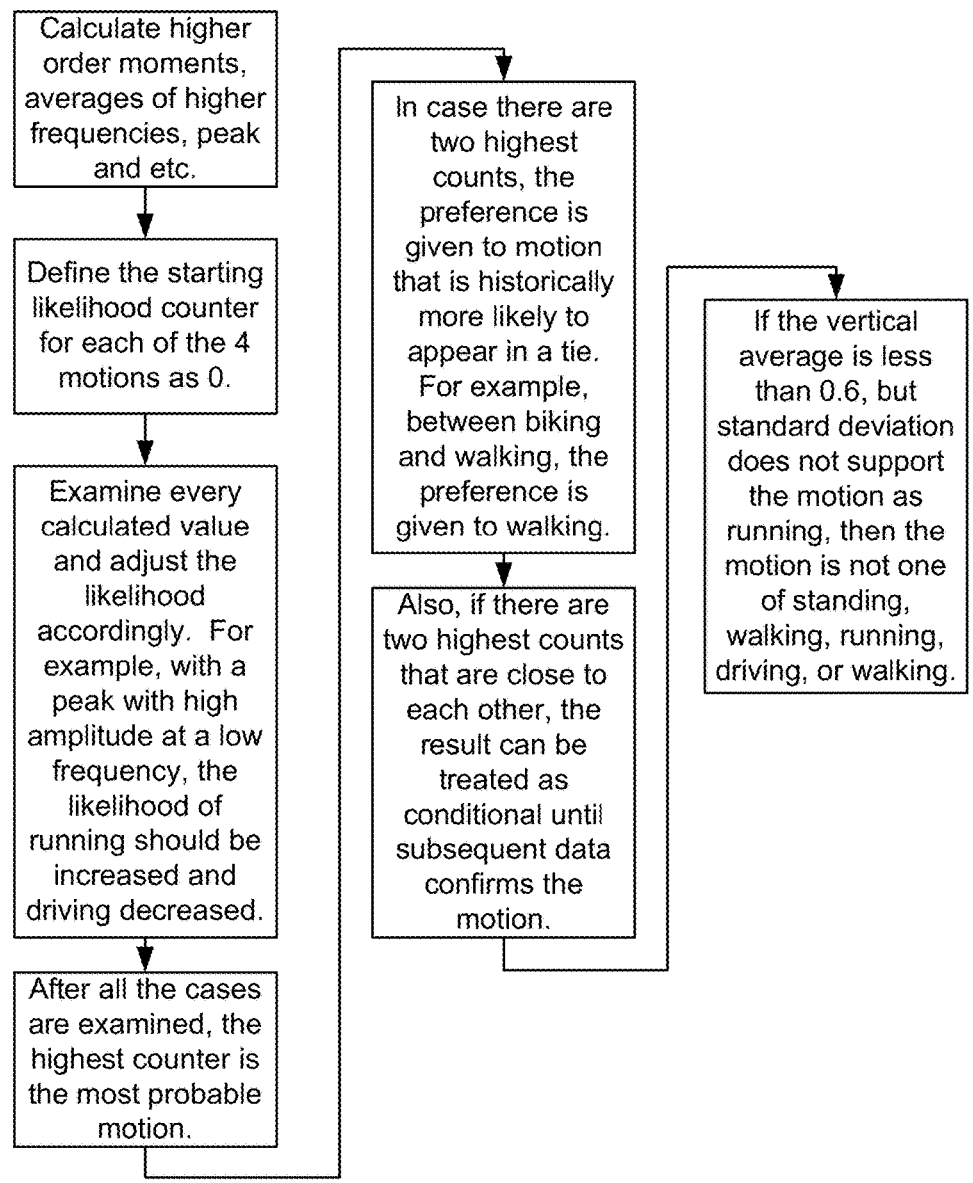
FIG. 9 is a description of parameters/methodology in the time domain and frequency domain that can be used by the MTMAI system of FIG. 2D to identify the most probable MTMA from the set of MTMAs in the exemplary methodology of FIG. 7.

FIG. 9 shows the methodology that the MTMAI system 101 utilizes for identifying a most probable MTMA 105 based upon a comparative analysis (comparing probabilities). Previously, the MTMAI system 101 attempted to identify cases of the WCD 104 being stationary based on average and SD. If the WCD 104 is involved in a motion activity, then the MTMAI system 101 checks if the MT 106 is running based on low average and high SD. If the vertical average is higher than 0.6, and the data was not identified as stationary, then the motion activity could be walking, running, driving, or biking. So, Fourier transforms of the acceleration components and several higher order moments were computed and the data will now be analyzed, as follows.

1. Calculate the previously mentioned values of higher order moments, averages of higher frequencies, FT, etc.

2. Define the starting likelihood counter for each of the 4 motion activities as 0.

3. Examine every calculated parameter and adjust the likelihood of each motion, accordingly. For example, if there is a peak with high amplitude at a low frequency the likelihood of running should be increased and of driving decreased.

4. After all the cases are examined, the highest counter indicates the most probable motion activity.

5. In a case where there are two or more highest counters, the preference is given to motion activity that is historically more likely to appear in a tie. For example, between biking and walking the preference is given to walking.

6. Also, if two highest counters are very close to each other, the result can be treated as conditional until later data confirms the motion activity.

7. If the vertical average is less than 0.6, but the SD does not support the motion activity as running, then the MTMA 105 is not one of standing, walking, running, driving or walking. This result may happen when the device is dropped, picked up, or the user made a sudden motion while in possession of device. Sudden movements as such may affect the average but since they are not repetitive, they will not significantly increase SD or significantly affect the FT. This case is rare and identified as none of the 5 motions.

The methodology employed in 195 computes the likelihood of each motion based on comparing each parameter value to a set of threshold values. For example, high standard deviation significantly increases the likelihood that MTMA is running, somewhat increases the likelihood that MTMA is walking, decreases the likelihood of biking and significantly decreases the likelihood of driving. Once all the parameters are compared, the result is four numbers, which may be positive or negative, indicating the likelihood of each motion, from which the MTMA is identified.

It is possible to compute a confidence value for the identified MTMA 105 based on how close the four likelihood counters are. One possible non-unique implementation of this is to calculate the differences between the counters and the value one below the lowest counter. Then compute the percentages (or scores) for each difference out of the total. For example, if the counters for walking, running, driving and biking are 4, 3, −2 and 7 respectively, then MTMA is identified as biking, and then the confidence percentage can be computed as follows:

Total difference: (4−(−3))+(3−(−3))+(−2−(−3))+(7−(−3))=7+6+1+10=24

Percentage Walking: 4/24=16.7%
Percentage Running: 1/24=12.5%
Percentage Driving: 1/24=4.2%
Percentage Biking: 10/24=41.7%

The percentage values can be used to determine confidence of the MTMA identification. If the certainty is insufficiently high, the result can be treated as conditional until the subsequent data confirms the MTMA.

The aforementioned cases of stopped (181), running (185, 192) and driving (189) could be identified from the MTMA comparative analysis as well. The purpose of examining the cases earlier is to save on computational cost and time. If the complexity of the algorithm is changed/adjusted to accommodate new types of motion, it is likely those cases will be subject to change.

vi. Analysis for Walking (First Time)

FIG. 10A illustrates the methodology and parameters in the time domain and frequency domain that can be used by the MTMAI system 101 to analyze whether the MTMA 105 is walking.

FIG. 10B is an example of time domain and frequency domain graphs, in connection with walking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Overall, walking can be characterized by dominant low frequency motion activities and low frequency peaks.

One nonlimiting example of the methodology is shown in FIG. 10A and is as follows:

1. If 3rd order moment of horizontal acceleration about zero is above a certain threshold, reduce walking likelihood by one.
2. If the average of FT is significantly higher than the average higher frequency, then increase the likelihood of walking.
3. If RMS of the net acceleration vector is sufficiently high, then increase likelihood of walking accordingly.
4. If 4th order moment about zero is too low, reduce the likelihood of walking and if the moment is sufficiently high, increase it.
5. If FT only shows motions with very low amplitude and there is very little motion, and low SD (a case resembling standing), then reduce likelihood of walking by two.
6. If RMS of the vertical acceleration is above a certain threshold, then reduce likelihood of walking accordingly.
7. If there are no peaks present in FT, reduce likelihood of walking.
8. If the highest peak is at a slightly higher frequency and has sufficiently low amplitude, reduce likelihood of walking.
9. If there is a prominent peak at low frequency, then increase the likelihood of walking.

vii. Analysis for Running (Third Time)

FIG. 11A illustrates the methodology and parameters in the time domain and frequency domain that can be used by the MTMAI system 101 to analyze running.

FIG. 11B is an example of time domain and frequency domain graphs, in connection with running, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One nonlimiting example of the methodology is shown in FIG. 11A and is as follows:

1. About 65% of running can be identified based on average and SD alone.
2. Running is still a possible motion activity if the average is high.
3. If there is presence of high amplitude at a low frequency and the average vertical acceleration is still less than one, then the motion is identified as running and analysis terminated (192).
4. If the average of FT is less than twice the average higher frequency, then reduce the likelihood of running. If it is greater than 2.5 times the higher frequency, then increase the likelihood slightly.
5. If the SDs (both vertical and horizontal) are significantly high, then increase the likelihood of running.
6. If the 4th order moment of the vertical acceleration about zero is above two, increase the likelihood by one.
7. If there is very little activity (low SD, lack of peaks in the Fourier transform) then running is almost certainly not the motion activity.
8. If the RMS of the vertical acceleration about zero is sufficiently high, increase the likelihood of running.

viii. Analysis for Driving (Second Time)

FIG. 12A is a description of methodology and parameters in the time domain and frequency domain that can be used by the MTMAI system 101 to analyze driving.

FIG. 12B is an example of time domain and frequency domain graphs, in connection with driving, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One nonlimiting example of the methodology is shown in FIG. 12A and is as follows:

1. If 3rd order moments of horizontal and vertical accelerations about zero are sufficiently high, then reduce driving likelihood.
2. If 3rd order moment of horizontal acceleration about its mean is above a certain threshold, reduce driving likelihood.
3. If the average of FT is less than twice the average higher frequency, then increase the likelihood of driving (amount of increase depends on how significant the difference is).
4. If the average of FT is significantly higher than the average of higher frequency, then reduce likelihood of driving.
5. If SD (for both vertical and horizontal accelerations) is significantly high, reduce the likelihood of driving.
6. If RMS of the net acceleration vector is large, then reduce likelihood of driving accordingly.

7. If 4th order moment about zero is small enough, increase the likelihood of driving and if the moment is large, reduce it.

8. If FT only shows motions with very low amplitude, and there is very little motion, low SD (a case resembling standing), then increase driving likelihood significantly.

9. If the highest amplitude present is at a very high frequency, then the motion activity should be driving and method can be terminated with results returned (189).

10. A singular peak tends to correspond to the motion activity of biking and in order to reduce the false biking identification during driving, if that singular has relatively low amplitude, then increase likelihood of driving as well.

11. If the highest peak has low amplitude or there are no peaks found, then increase likelihood of driving by 1.

12. Driving can be characterized by limited motion, presence (or dominance) of high frequencies.

ix. Analysis for Biking (First Time)

FIG. 13A is a description of parameters/methodology in the time domain and frequency domain that can be used by the MTMAI system of FIG. 2D to analyze biking.

FIG. 13B is an example of time domain and frequency domain graphs, in connection with biking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One nonlimiting example of the methodology is shown in FIG. 13A and is as follows:

1. If the average of FT is less than 2.5 times the average higher frequency, then increase the likelihood of biking (amount of increase depends on how significant the difference is).

2. If RMS of the net acceleration vector is above a certain threshold, then reduce likelihood of biking.

3. If the horizontal SD is significantly high, then reduce the likelihood of biking.

4. If the 4th order moment of vertical acceleration about zero is less than a certain threshold, increase the likelihood of biking.

5. If the RMS of the vertical acceleration is sufficiently small, increase the likelihood of biking, and if it is sufficiently high, reduce it.

6. If the peaks is of low to medium amplitude and is at a sufficiently high frequency, increase likelihood of biking.

7. If FT analysis yields a singular peak, much more dominant than the rest, increase likelihood of biking.

5. Fifth Set of Embodiments

FIG. 4D is a flowchart of an example of a fifth set of embodiments of the MTMAI system 101 of FIG. 2D. In these embodiments, as shown in FIG. 4D, the MTMAI system 101 includes at least the following program code (or logic): program code 151 designed to receive a plurality of data streams from a respective plurality of sensors 116 of a WCD 104 that is transported by an MT 106; program code 152 designed to normalize each data stream with respect to a reference; program code 153 designed to mathematically combine the normalized data streams; and program code 154 designed to identify an MT 106 and/or an MTMA 105 associated with the MT 106 based upon the combined normalized data streams.

In some embodiments, the program code 152 can be designed with code to create a rotation matrix to translate data relative to the reference and to achieve normalization by rotating incoming data with the rotation matrix. The reference can be Earth gravity, the direction North, etc.

In some embodiments, the sensors 116 can include both an accelerometer and a gyroscope. The accelerometer data can be mathematically combined with the gyroscope data, after normalization, in order to construct a better more accurate framework for identifying the MTMA 105. As an example of how the data can be combined, see "A Guide To Using (Accelerometer and Gyroscope Devices) In Embedded Applications," http://www.starline.com/imu_guide.html (Dec. 29, 2009), which is entirely incorporated herein by reference. Another example of a methodology for combining the data is described in Colton, "The Balance Filter," Chief Delphi white paper (Jun. 25, 2007), which is incorporated herein by reference in its entirety. Furthermore, an example of a commercially available MEMS device that has both a triaxial accelerometer and a triaxial gyroscope and that can be used in the WCD 104 is the model MPU-6000/605 Six-Axis MEMS MotionTracking Device, which is available from InvenSense, Inc, U.S.A.

In some embodiments, the sensors 116 may include a magnetometer(s), which can assist in determining the direction North. As mentioned, the direction North can be used as the reference for the rotation matrix.

In some embodiments, the sensors 116 include an accelerometer, a gyroscope, and a magnetometer. As an example, the WCD 104 may employ the model ADIS16400/ ADIS16405 iSensor, which is commercially available microelectromechanical system (MEMS) from Analog Devices, Inc., U.S.A. This device has a triaxial gyroscope, a triaxial accelerometer, and a triaxial magnetometer. An accurate rotation matrix based upon either Earth gravity or direction North can be computed and used to normalize data.

In some embodiments, the sensors 116 may include a pressure sensor, which can be used to extrapolate altitude based upon measured air pressure. An algorithm 113 (FIG. 2D) can be employed to tentatively identify an MTMA 105 based upon the other sensors 116 and then check the pressure sensor to determine if the tentatively identified MTMA 105 makes sense. For example, if it is determined that the MT 106 is flying, then the measured air pressure should correspond with a pressure at a high altitude.

In some embodiments, the sensors 116 may include a GPS receiver, which produces location data that can also be used to also help more accurately identify the MTMA 105. Instead of using the GPS receiver to determine location, the system can be designed to determine location through data exchanged with network access points and/or cellular towers, etc. In these embodiments, the WCD 104 has access to map data (stored locally or fetched remotely) so that the WCD map location can be determined based upon the GPS data and map data. An algorithm 113 (FIG. 2D) can be employed to identify an MTMA 105 based upon the other sensor data 96 (indicative of physical movement) along with the WCD map location. As an example, the MTMA 105 cannot be swimming if the MT 106 is located on a known roadway.

In some embodiments, the sensors 116 may include a microphone, which produces audio data that can be used to more accurately determine the MTMA 105. An algorithm 113 (FIG. 2D) can be employed to identify an MTMA 105 and/or MT 106 based upon the other sensor data 96 (indicative of physical movement) along with the microphone measured audio data. As an example, if the MT 105 is driving, then an analysis of the audio data could help determine that the MTMA 105 is driving. The sound of a motor vehicle that is driving can be detected with the correlation techniques, which are described later in this document. As another example, the audio data can be analyzed to identify an MT 106 in the form of a person.

Further note that, in some embodiments, the normalizing and combining steps may be performed concurrently by the same logic. In other words, the logic 152 and the logic 153 would be the same code segment.

6. Sixth Set of Embodiments

FIG. 4E is a flowchart of an example of a sixth set of embodiments of the MTMAI system 101 of FIG. 2D. In these embodiments, as shown in FIG. 4E, the MTMAI system 101 includes at least the following program code (or logic): program code 161 designed to receive a plurality of data streams from a respective plurality of sensors 116 of a WCD 104 that is transported by an MT 106, the data indicative of movement of the WCD 104; program code 162 designed to combine the data streams; program code 163 designed to normalize the combined data stream with respect to a reference; and program code 164 designed to identify an MT 106 and/or an MTMA 105 associated with the MT 106 based upon the normalized combined data streams.

The combining process and the normalization process that can be utilized was described in the previous section of this document as well as other sections, and those discussions are incorporated herein by reference.

Furthermore, the sensors 116 may include an accelerometer, a gyroscope, a magnetometer, a pressure sensor, a GPS receiver, a microphone, etc., as discussed in more detail in the previous section of this document.

Further note that, in some embodiments, the combining and normalizing steps may be performed concurrently by the same or substantially the same logic. In other words, the logic 152 and the logic 153 would be the same or substantially the same code.

7. Seventh Set of Embodiments

A seventh set of embodiments of the MTMAI system 101 of FIG. 2D will now be described. In these embodiments, the MT ID that is detected is the gender of a person. European Application No. EP20080014938, filed on Aug. 22, 2008, U.S. Pat. No. 5,953,701, and U.S. Application No. 2013/0268273, filed Jul. 27, 2012, which are incorporated herein by reference, describes systems and methods for determining the gender of a person from a speech sample. These systems and methods can be employed in the MTMAI system 101 of FIG. 2D in order to determine the gender from an audio sample captured by a microphone 116 associated with the WCD 104.

8. Eighth Set of Embodiments

An eighth set of embodiments of the MTMAI system 101 of FIG. 2D will now be described. In these embodiments, the MT ID that is detected is the age of a person. U.S. Pat. No. 7,881,933 B2 and U.S. Application No. 2013/0268273, filed Jul. 27, 2012, which are incorporated herein by reference, describes systems and methods for determining the age of a person from a speech sample. These systems and methods can be employed in the MTMAI system 101 of FIG. 2D in order to determine the gender from an audio sample captured by a microphone 116 associated with the WCD 104.

H. Embodiments of MTMAI Systems that Employ Correlation

In these possible embodiments, the MTMAI system 101 uses a mathematical correlation process to identify the MTMA 105 and/or the MT 106. As shown in FIG. 14A, the MTMAI system 101 has logic 301 designed to receive data from one or more sensors 116 of the WCD 104 that is transported by the MT 106; logic 302 designed to correlate the movement data with a reference signature; and logic 303 designed to identify the MT 106 and/or the MTMA 105 associated with the MT 106 based upon the correlation.

In some embodiments, the MTMAI system 101 may be designed with logic for storing identification information relating to a plurality of MTMAs 105 and/or MTs 106 and with logic for enabling the user to select which of the MTMAs 105 and/or MTs 106, respectively, will be detected.

With reference to FIG. 14B, the MTMAI system 101 is designed to include a detection engine 315, which detects MTMAs 105 or MTs 106 using mathematical correlation, as will be further described hereafter. FIG. 14B shows the one or more sensors 116, such as but not limited to, an accelerometer, a gyroscope, an audio microphone, etc., for receiving one or more MTMA reference signatures 117a (FIG. 2E) that are used to identify MTMAs 105, or receiving one or more MT reference signatures 117g (FIG. 2E). The detection engine 315 may also be designed to also access and receive reference signatures from an RCS 90 via the TX/RX 114 and the Internet 310.

The detection engine 315 stores the one or more MTMA or MT reference signatures 117a in memory 102 (FIG. 2E) that are used to identify MTMAs 105 and MTs 106, respectively, correlates sensed signal data with the reference signatures 117a and 117g, respectively, and detects occurrences of the MTMAs 105 and MTs 106, respectively. A nonlimiting example of such a detection engine 315 is described in U.S. Pat. No. 7,872,574, which is incorporated herein by reference in its entirety. The discussion hereafter will describe incorporation of the latter detection engine 315 in the architecture of the present disclosure.

The detection engine 315 is designed to be operated in several modes. The architecture and operation of the detection engine 215 will be apparent as each of these modes, as described in detail hereafter.

1. First Mode

In a first mode, the RCS 90 is connected to a reference memory array 360 by a switch 350. One or more reference signatures 117a are collected by the RCS 90 and loaded into the reference memory array 360.

Reference signatures, such as data indicative of MTMAs 105 or MTs 106 can be collected from the RCS 90. These can be stored locally on the WCD 104 and used for future comparisons, or these can be requested in real time when a sensed signature is being analyzed to identify an MTMA 105 or MT 106.

The preprocessor 370 extracts the reference signature data from the reference memory array 360 and reformats the data to facilitate rapid correlation. The frequency domain is a preferred format, but time domain correlation or a combination thereof can also be employed. The preprocessor 370 analyzes each signature by a sequence of Fourier transforms taken repeatedly over a period of time corresponding to the duration of the signature. The Fourier transform is preferably a two-dimensional vector, but a single measure of amplitude versus frequency is sufficient. In the preferred embodiment, among many possible embodiments, the detection engine 315 processes a 3-dimensional array of amplitude, frequency, and time. The transformed signature arrays are stored back into a reference memory array 360 for subsequent rapid correlation. Preferably, each reference signature array includes an identifier field associated with the signature. As an example, for an MTMA of running, "running" may be the name and a picture/image of a running man may be associated with the signature 117a. As another example, the identifier for an MT in the form of a person may be, for example but not limited to, the name of the person, a social security number, a bank account number, a credit card number, a pseudo name, such as "User 1" or "Anonymous 1," etc.

2. Second Mode

In a second mode of operation, detection engine 315 can acquire the reference signature data 117a directly from the local environment via a sensor(s) 116. The data sensed by the sensor 116 is selected by the user via the switch 350 and loaded directly into the reference memory array 360. Preferably, several seconds of signal are collected in this particular application. Then, the preprocessor 370 reformats the reference data for rapid correlation, for example, by Fourier transform.

3. Third Mode

In a third mode of operation, the detection engine 315 monitors the sensor data 96 continuously (at discrete successive short time intervals due to the computer-based architecture) for data that matches those stored in the reference memory array 360. To reduce computational burden, the preprocessor 370 is designed to monitor the sensor 116 for a preset threshold level of signal data before beginning the correlation process. When the signal data exceeds the preset threshold level, the preprocessor 370 begins executing a Fourier transform. After several seconds or a period equal to the period of the reference signatures, the transformed active sensed data is stored at the output of the preprocessor 370. Then, array addressing logic 380 begins selecting one reference signature at a time for correlation. Each reference signature 117a is correlated by a correlator 390 with the active sensed data to determine if the reference signature 117a matches the active sensed data.

A comparator 400 compares the magnitude of the output of the correlator 390 with a threshold to determine a match. When searching for a match, the correlator 390 is compared with a fixed threshold. In this case, the switch 410 selects a fixed threshold 411 for comparison. If the correlation magnitude exceeds the fixed threshold 411, then the comparator 400 has detected a match. The comparator 400 then activates the correlation identifier register 420 and the correlation magnitude register 430. The magnitude of the comparison result is stored in the correlation magnitude register 430, and the identity of the MTMA 105 or MT 106, whichever applicable, is stored in the correlation identifier register 420. The fixed threshold 411 can be predefined by a programmer or the user of the WCD 104.

After MTMA or MT detection by the detection engine 315, the process is stopped and the array addressing logic 380 is reset. A search for new active sensed data then resumes.

4. Fourth Mode

In a fourth mode of operation, the detection engine 315 searches for the best match for the sensed data. In this case, the correlation magnitude register 430 is first cleared. Then, the switch 410 selects the output 412 of the correlation magnitude register 430 as the threshold input to the comparator 400. The array addressing logic 380 then sequentially selects all stored references of a set for correlation. After each reference in the set is correlated, the comparator 400 compares the result with previous correlations stored in the correlation magnitude register 430. If the new correlation magnitude is higher, then the new correlation magnitude is loaded into the correlation magnitude register 430, and the respective identifier is loaded into the correlation identifier register 420.

In an alternative embodiment, the correlation process can be performed by an associative process, where the active reference is associated directly with the stored references in a parallel operation that is faster than the sequential operation. New device technologies may enable associative processing. For example, reference memory array 360 can utilize content addressable memory devices for associative processing. ASIC devices and devices, such as the Texas Instruments TNETX3151 Ethernet switch incorporate content addressable memory. U.S. Pat. No. 5,216,541, entitled "Optical Associative Identifier with Joint Transform Correlator," which is incorporated herein by reference, describes optical associative correlation that can be utilized.

This correlation process continues until all stored reference signatures 117a or 117g in the set under analysis have been correlated. When the correlation process is complete, the correlation identifier register 420 holds the best match of the identity of the source of the active signal. The AD system 102 reads this register 420 and then determines what action to take, if any. In addition, the identity of the MTMA 105 or MT 106 can also be displayed as a photo or text description in a display 120 or as a verbal announcement via a speaker 120. If the final correlation magnitude is lower than a predetermined threshold, then the active signature can be loaded into the reference memory array 360 as a new unknown source.

I. Embodiments of MTMAI Systems that Utilize Filtering

These embodiments of the MTMAI system 101 involve using filtering techniques in the time domain, frequency domain, or both, in order to make more accurate identifications of MTMAs 105 in connection with a plurality of MTMAs 105 occurring concurrently or a plurality of MTs 106 being sensed concurrently. The filters can be hardware, software, or a combination thereof, for example, but not limited to, analog and/or digital filters, finite impulse response (FIR) filters, infinite impulse response (IIR) filters, etc. FIG. 2D shows applicable filter(s) 108 situated in the MTMAI system 101.

1. First Set of Embodiments

FIG. 15A is a flowchart of an example of a first set of embodiments of the MTMAI system 101 of FIG. 2D that employs filtering via a filter(s) 108 in order to more accurately identify an MTMA 105 that is among a plurality of seemingly detected MTMAs 105, to more accurately identify an MT 106 that is among a plurality of seemingly detected MTs 106, or both. In these embodiments, as shown in FIG. 15A, the MTMAI system 101 includes at least the following program code (or logic): program code 451 designed to receive data from one or more sensors 116, the data indicative of movement of the WCD 104; program code 452 designed to transform the data to frequency domain data using FT, the frequency domain data representing amplitude information in the frequency domain; program code 453 designed to identify an ambiguous MTMA 105 (and/or MT 106) and a first certain MTMA 105 (and/or MT 106) in the frequency domain data; program code 454 designed to filter first certain MTMA data (and/or MT data) corresponding to the first certain MTMA 105 (and/or MT 106) from the time domain data, in whole or in part, to produce better time domain data for better analyzing the ambiguous MTMA 105 (and/or MT 106); program code 455 designed to transform the better time domain data to better frequency domain data; and program code 456 designed to identify a second certain MTMA 105 (and/or MT 106) from the better frequency domain data.

The ambiguous MTMA 105 (and/or MT 106) can be (a) an MTMA 105 (and/or MT 106) that has been narrowed down to two or more possible MTMAs 105 (and/or MTs 106) of a set under analysis, an MTMA 105 (and/or MT 106) that has been tentatively identified but with less certainty than desired (e.g., having a probability below a predefined threshold), an MTMA 105 (and/or MT 106) that has been brought into question based upon detection of an environmental event (the process of which is described elsewhere in this disclosure), etc.

The first and second certain MTMAs 105 (and/or MTs 106) can be based upon definitive or highly probable identifications.

2. Second Set of Embodiments

FIG. 15B is a flowchart of an example of a second set of embodiments of the MTMAI system 101 of FIG. 2D that employs filtering via one or more filters 108 (FIG. 2D) in order to more accurately identify an MTMA 105 that is among a plurality of seemingly detected MTMAs 105, to more accurately identify an MT 106 that is among a plurality of seemingly detected MTs 106, or both. In these embodiments, as shown in FIG. 15B, the MTMAI system 101 includes at least the following program code (or logic): program code 461 designed to receive data from one or more sensors 116, the data indicative of movement of the WCD 104; program code 462 designed to transform the data to frequency domain data using FT, the frequency domain data representing amplitude information in the frequency domain; program code 463 designed to identify an ambiguous MTMA 105 (and/or MT 106) and a first certain MTMA 105 (and/or MT 106) in the frequency domain data; program code 464 designed to filer first certain MTMA data (and/or MT data) corresponding to the first certain MTMA 105 (and/or MT 106) from the frequency domain data, in whole or in part, to produce better frequency domain data for better analyzing the ambiguous MTMA 105 (and/or MT 106); and program code 465 designed to identify a second certain MTMA 105 (and/or MT 106) from the better frequency domain data.

3. Third Set of Embodiments

FIG. 15C is a flowchart of an example of a third set of embodiments of the MTMAI system 101 of FIG. 2D that employs filtering via one or more filters 108 (FIG. 2D) in order to more accurately identify an MTMA 105 that is among a plurality of seemingly detected MTMAs 105, to more accurately identify an MT 106 that is among a plurality of seemingly detected MTs 106, or both. In these embodiments, as shown in FIG. 15C, the MTMAI system 101 includes at least the following program code (or logic): program code 471 designed to receive data from one or more sensors 116, the data indicative of movement of the WCD 104; program code 472 designed to identify an ambiguous MTMA 105 (and/or MT 106) and a first certain MTMA 105 (and/or MT 106) in the time domain data; program code 473 designed to filer first certain MTMA data (and/or MT data) corresponding to the first certain MTMA 105 (and/or MT 106) from the time domain data, in whole or in part, to produce better time domain data for better analyzing the ambiguous MTMA 105 (and/or MT 106); and program code 474 designed to identify a second certain MTMA 105 (and/or MT 106) from the better time domain data.

J. Embodiments of MTMAI Systems that Utilize Multiple Sensor Data

FIG. 16 is a flowchart of an example of a set of embodiments of the MTMAI system 101 of FIG. 2D that uses data from a plurality of sensors 116 in order to more accurately determine the MTMA 105, the MT 106, or both. In these embodiments, as shown in FIG. 16, the MTMAI system 101 includes at least the following program code (or logic): program code 501 designed to receive data 96 from each of a plurality of sensors 116 of a WCD 104 that is transported by an MT 106; and program code 502 designed to identify an MTMA 105 associated with the MT 106 based upon the data 96. The sensors may include an accelerometer, gyroscope, magnetometer, pressure sensor, GPS receiver, microphone, etc.

In some embodiments, the data from two or more of the sensors 116 is mathematically combined and then the MTMA 105 is identified based upon the combined data. Examples of processes for mathematically combining the data, at a point before, during, or after a normalization process, have been previously described.

In some embodiments, the data 96 from two or more sensors 116 is mathematically correlated, separately, using the detection engine 315. In such embodiments, the identification of the MTMA 105 and/or MT 106 may be based upon all correlation results (or a subset) supporting the same conclusion.

In some embodiments, the data 96 from two or more sensors 116 is mathematically correlated, together, using the detection engine 315. In such embodiments, the data corresponding to each sensor is allocated a part of the data signature. When the correlation process takes place in the correlator 390 (FIG. 14B), the correlation result is the composite of all sensor data 96. The identification of the MTMA 105 and/or MT 106 is based upon composite correlation results.

In some embodiments involving use of sensor data 96 from a plurality of sensors 116, program code 502 may be designed with an algorithm 113 that generates a confidence value and compares it to a predefined threshold in order to reach a conclusion whether or not an MTMA 105 or MT 106 has been detected. As an example, consider a scenario where (a) three sensors 116 are used in an attempt to detect an MTMA 105 or MT 106, (b) the sensor data 96 from each sensor 116 is given a mathematical weighting of one, and (c) the threshold for concluding that the MTMA 105 or MT 106 is identified is an affirmative conclusion from at least two. In this simple scenario, when the sensor data 96 from two or three sensors 116 indicates an ID, then the program code 502 concludes that it has identified the MTMA 105 or MT 106. Otherwise, with the sensor data 96 of only one sensor 116 indicating an ID, the program code 502 concludes that it has not yet identified the MTMA 105 or MT 106. In alternative embodiments, the sensor data 96 from different sensors 116 can be mathematically weighted differently, so that some sensor data 96 is given priority of other sensor data 96.

K. Embodiments of MTMAI Systems that Employ Requests for User Confirmation

In these embodiments, the MTMAI system 101 employs a user confirmation algorithm(s) 113 (essentially implemented by program code 513-514 set forth hereafter) that assists in better determining whether an MTMA 105 and/or MT 106 has been correctly identified, in order to make more accurate decisions about actions to take and/or to help prevent some false MTMA and/or MT detections.

As shown in FIG. 17, the MTMAI system 101 includes at least the following program code (or logic): program code 511 designed to receive data from one or more sensors 116; program code 512 designed to identify an MTMA 105 (and/or MT 106) based upon the data; program code 513 designed to communicate the identified MTMA 105 (and/or MT 106) to the user of the WCD 104 and to request confirmation from the user that the identified MTMA 105 (and/or MT 106) is correct; and program code 514 designed to cause initiation of an action when the identified MTMA 105 (and/or MT 106) has been confirmed, and designed to refrain from causing initiation of the action when the identified MTMA 105 (and/or MT 106) is not confirmed.

The confirmation can be passive. For example, the program code 513 may be designed to communicate a voice message over a WCD speaker 120, which states: "Walking. To confirm, take no action. If incorrect, press the pound key" or "You have stopped running. If incorrect, please press the star key." As another example, the program code 513 may be designed to communicate a voice message over the WCD speaker 120, which states: "Please confirm that you are user 1 by pressing the star key within 10 seconds." In embodiments where voice recognition software is employed in the WCD 104, the user can communicate responses with voice commands.

In some passive embodiments, the program code 514 can be designed to initiate an action based upon the combination of lack of the user input and lapse of a predefined time period, or in the alternative, to refrain from initiating the action if an appropriate user input(s) is in fact received during the predefined time period. A clock can be started upon detection of the MTMA 105 (and/or MT 106) in order to monitor this time period. In some of these embodiments, the algorithm 113 may be, for example: when the code 512 detects that the MTMA 105 is running, definitively conclude that running is the MTMA 105 when the user does not respond to the user input request within the predefined time period. As another example, the algorithm 113 may be: when the MTMA 105 is detected as running, do not conclude that the MTMA 105 is in fact running when the user responds to the user input request with an appropriate response within the predefined time period.

The confirmation can be active. For example, the program code 513 may be designed to communicate a voice message over a WCD speaker 120, which states: "Please confirm biking by pressing the pound key" or "You have stopped skiing. If correct, please press the star key." In embodiments where voice recognition software is employed in the WCD 104, the user can communicate responses with voice commands.

In some active embodiments, the program code 514 may be designed to refrain from initiating an action based upon the combination of lack of the user input and lapse of a predefined time period, and further designed to initiate the action if an appropriate user input(s) is in fact received during the predefined time period. A clock can be started upon detection of the MTMA 105 (and/or MT 106). In some of these embodiments, the algorithm 113 may be, for example: when the code 512 detects that the MTMA 105 is running, do not conclude that the MTMA 105 is in fact running until the user confirms with an appropriate user input during the predefined time period. As another example, the algorithm 113 may be: when the MTMA 105 is running as detected by the program code 512, do not conclude that running is the MTMA 105 until the user confirms this with an appropriate user input during the predefined time period.

In some embodiments, the program code 514 of the MTMAI system 101 may designed to also communicate the action to be taken to the user and a request for a user confirmation that the action is appropriate. In such embodiments, the user can decide whether or not the AD system 102 pursues the action.

The actions that can be taken are numerous and are described in other sections of this disclosure.

L. Embodiments of MTMAI Systems that Employ Exceptions

In these embodiments, the MTMAI system 101 employs an algorithm(s) 113 that assists in better determining whether an MTMA 105 (and/or MT 106) has been discontinued or whether the MTMA 105 (and/or MT 106) has transitioned to another MTMA 105 (and/or MT 106), in order to make more accurate decisions about actions to take and/or to help prevent some false MTMA detections (and/or MT detections).

1. First Set of Embodiments

FIG. 18A is a flowchart of an example of a first set of embodiments of the MTMAI system 101 that employs exceptions. These embodiments implement an algorithm 113 (essentially implemented by program code 553-555 set forth hereafter) that employs monitoring a time period before concluding discontinuance of an MTMA 105 (and/or MT 106) or that a transition has occurred from one MTMA 105 (and/or MT 106) to another. As shown in FIG. 18A, the MTMAI system 101 includes at least the following program code (or logic): program code 551 designed to receive data from one or more sensors 116; program code 552 designed to detect an MTMA 105 associated with the MT 106 transporting the WCD 104 (and/or to detect an ID for MT 106 itself), based upon the produced movement data from the one or more sensors 116; program code 553 designed to detect discontinuance (or disruption) of the MTMA 105 (and/or MT 106) or a transition of the MTMA 105 (and/or MT 106) to a different MTMA 105 (and/or MT 106); program code 554 designed to determine whether or not the detected MTMA 105 (and/or MT 106) recommences within a predefined time period; and program code 555 designed to initiate an action or cause the AD system 102 to initiate an action, based upon the discontinuance or transition and lapse of the predefined time period, or in the alternative, to refrain from initiating or causing initiation of the action, if it detects recommencement of the MTMA 105 (and/or MT 106) within the predefined time period.

As an example, the algorithm 113 may be as follows: when the MTMA 105 is running, do not conclude that running has ceased until it has ceased for 5 seconds. A similar methodology can be used in connection with the ID of the MT 106.

As another example, the algorithm 113 may be as follows: when the MTMA 105 is running and then a transition to walking is detected, do not conclude that the transition from running to walking has occurred if running is again detected within 5 seconds. A similar methodology can be used in connection with the ID of the MT 106.

2. Second Set of Embodiments

FIG. 18B is a flowchart of an example of a second set of embodiments of the MTMAI system 101 that employs exceptions. These embodiments implement an algorithm 113 (essentially implemented by program code 563-565 set forth hereafter) that employs a confirmation request to the user in combination with a "passive" user response before (a) concluding that a discontinuance or transition has occurred with respect to the MTMA 105 (and/or MT 106) or (b) initiating an action. As shown in FIG. 18B, the MTMAI system 101 includes at least the following program code (or logic): program code 561 designed to receive data from one or more sensors 116; program code 562 designed to detect an MTMA 105 associated with the MT 106 transporting the WCD 104 (and/or to detect the ID of the MT 106 itself), based upon the movement data from the one or more sensors 116; program code 563 designed to detect discontinuance or transition of the MTMA 105 (and/or MT 106) or to confirm the desire for an action; program code 564 designed to request a user input(s); and program code 565 designed to initiate the action based upon lack of the user input, or in the alternative, to refrain from initiating the action if an appropriate user input(s) is in fact received.

As examples, the user input request may be an audible message communicated over a WCD speaker 120, which states: "Walking has stopped. Override by pressing the pound key" or "You have stopped running. If incorrect, please press the star key" or "Your shoe order will be initiated unless your predefined code is entered." The predefined code could be any sequence of numbers and/or letters. In embodiments where voice recognition software is employed in the WCD 104, the user can communicate responses with voice commands.

In some embodiments, the user input request may be in the form of a message displayed on a screen associated with the WCD 104.

In some embodiments, the action may include identifying a telephone number to call corresponding to a security organization that is situated in close proximity of the WCD 104.

The algorithm 113 may be, for example: when the MTMA 105 is running and code 563 detects that running has ceased, conclude that running has ceased when the user does not respond to the user input request.

As another example, the algorithm 113 may be: when the MTMA 105 is running and then walking is detected by code 563, do not conclude that the transition from running to walking has occurred when the user responds to the user input request with an appropriate response.

In some embodiments, the program code 565 can be designed to initiate an action based upon lack of the user input and lapse of a predefined time period, or in the alternative, to refrain from initiating the action if an appropriate user input(s) is in fact received during the predefined time period. A clock can be started upon detection of the discontinuance or transition of the MTMA 105 (and/or MT 106) in order to monitor this time period. In some of these embodiments, the algorithm 113 may be, for example: when the MTMA 105 is running and code 563 detects that running has ceased, conclude that running has ceased when the user does not respond to the user input request within the predefined time period. As another example, the algorithm 113 may be: when the MTMA 105 is running and then walking is detected by code 563, do not conclude that the transition from running to walking has occurred when the user responds to the user input request with an appropriate response within the predefined time period.

3. Third Set of Embodiments

FIG. 18C is a flowchart of an example of a third set of embodiments of the MTMAI system 101 that employs exceptions. These embodiments implement an algorithm 113 (essentially implemented by program code 573-575 set forth hereafter) that employs a confirmation request to the user in combination with an "active" user response before (a) concluding that discontinuance or transition of the MTMA 105 (and/or MT 106) has occurred or (b) initiating an action. As shown in FIG. 18C, the MTMAI system 101 includes at least the following program code (or logic): program code 571 designed to receive data from one or more sensors 116; program code 572 designed to detect an MTMA 105 associated with the MT 106 transporting the WCD 104 (and/or to determine an ID for the MT 106 itself), based upon the movement data from the one or more sensors 116; program code 573 designed to detect discontinuance or transition of the MTMA 105 (and/or MT 106); program code 574 designed to request a user input(s) to confirm the discontinuance or transition or to confirm the desire to have an action initiated; and program code 565 designed to refrain from initiating the action based upon lack of the user input, or in the alternative, to initiate the action if an appropriate user input(s) is in fact received.

As examples, the user input request may be an audible message communicated over a WCD speaker 120, which states: "Please confirm walking by pressing the pound key" or "You have stopped running. If correct, please press the star key" or "Please confirm that you would like an ambulance called by pressing any key." In embodiments where voice recognition software is employed in the WCD 104, the user can communicate responses with voice commands.

In some embodiments, the user input request may be in the form of a message displayed on a display screen 120 associated with the WCD 104.

In some embodiments, the action may include identifying a telephone number to call corresponding to a security organization (e.g., local police) that is situated in close proximity of the WCD 104.

The algorithm 113 may be, for example: when the MTMA 105 is running and the code 573 detects that running has ceased, do not conclude that running has ceased until the user confirms that running has ceased with an appropriate user input via an I/O device 120.

As another example, the algorithm 113 may be: when the MTMA 105 is running and then walking is detected by the program code 573, do not conclude that the transition from running to walking has occurred until the user confirms this with an appropriate user input via an I/O device 120.

In some embodiments, the program code 565 may be designed to refrain from initiating an action based upon lack of the user input and lapse of a predefined time period, and further designed to initiate the action if an appropriate user input(s) is in fact received during the predefined time period.

A clock can be started upon detection of the discontinuance or transition of the MTMA 105 and/or MT 106. In some of these embodiments, the algorithm 113 may be, for example: when the MTMA 105 is running and the code 573 detects that running has ceased, do not conclude that running has ceased until the user confirms with an appropriate user input during the predefined time period. As another example, the algorithm 113 may be: when the MTMA 105 is running and then walking is detected by the program code 573, do not conclude that the transition from running to walking has occurred until the user confirms this with an appropriate user input during the predefined time period.

4. Fourth Set of Embodiments

FIG. 18D is a flowchart of an example of a fourth set of embodiments of the MTMAI system 101 that employs exceptions. These embodiments implement an algorithm 113 (essentially implemented by program code 603-604 set forth hereafter) that employs a waiting time period before attempting to detect, in whole or in part, one or more other MTMAs 105 and/or MTs 106. As shown in FIG. 18D, the MTMAI system 101 includes at least the following program code (or logic): program code 601 designed to receive data from one or more sensors 116; program code 602 designed to detect an MTMA 105 based upon the sensor data 96; program code 603 designed to cause the detection logic to refrain from attempting, in whole or in part, to identify one or more other MTMAs 105 (and/or MTs 106) until a waiting time period has lapsed; and program code 604 designed to commence the detection process for detecting one or more other MTMAs 105 (and/or MTs 106) after expiration of the waiting time period.

The waiting time period can be preset based upon the first detected MTMA 105 (and/or MT 106), or it can be adjusted dynamically based upon the first detected MTMA 105 (and/or MT 106) and one or more inputs from other sensors 116, such as the GPS receiver data, audio data from a microphone, pressure data, etc.

The predefined time period can correspond to the time that would typically be involved with performing a known MTMA 105 that the MT 106 is currently engaged in.

As an example, if it is known that the MTMA 105 is skiing and that the MT 106 is at the top of a known ski slope, then the program code 603 can impose a waiting time period that corresponds to the length of time needed for the MT 106 to travel to the bottom of the ski slope.

In some embodiments, the user can predefine in user preferences the waiting time period for one or more detected MTMAs 105 (and/or MTs 106). For example, the user may predefine 6 hours for an MTMA 105 that corresponds to sleeping, or 2.5 hours for an MTMA 105 that corresponds to biking.

The waiting time period can be based upon historical information associated with one or more MTMAs 105 (and/or MT 106). For example, with respect to MTMA detection, if the MTMA 105 is sleeping, and it is known from the past (from archive information stored in memory 102) that the MT 106 typically sleeps for 6 hours, then the waiting time period may be set, initially or dynamically, to be 6 hours. As another example, with respect to MT detection, if it is known that a specific MT in the form of a person sleeps 6 hours every night, then the waiting time period may be set, initially or dynamically, to this length of time.

M. Embodiments of MTMAI Systems that Employ Historical Data Algorithms

1. First Set of Embodiments

FIG. 19A is a flowchart of an example of a first set of embodiments of the MTMAI system 101 that employs an algorithm(s) 113 that takes into consideration a previous MTMA(s) 105 and/or MT 106 (in historical data 117b) when attempting to identify a new MTMA 105 and/or new MT 106, respectively. As shown in FIG. 19A, the MTMAI system 101 includes at least the following program code (or logic): program code 651 designed to receive data from one or more sensors 116; program code 652 designed to detect a first MTMA 105 (and/or first MT 106) based upon an analysis of the sensor data 96 from the sensors 116; and program code 653 designed to detect a second MTMA 105 (and/or second MT 106) based upon analysis of new sensor data 96 and the first MTMA 105 (and/or first MT 106). The premise of the algorithm 113 is that some MTMAs 105 (and/or MTs 106) have a relation to other MTMAs 105 (and/or MTs 106), and so therefore, if one knows a current MTMA 105 (and/or current MT 106), this information can be used to help identify one or more future MTMAs 105 (and/or future MTs 106).

As an example, consider an MT 106 in the form of a person whose current MTMA 105 is golfing. The next MTMA 105 would likely not be skydiving. There would likely need to be intermediate MTMAs 105 before skydiving would even be possible. The more likely next MTMAs 105 could be riding in a golf cart, walking, running, etc.

As another example, consider an MT 106 in the form of a person whose current MTMA 105 is flying in an airplane. It would be highly unlikely for the next MTMA 105 to be skiing. The more likely next MTMAs 105 could be landing in the airplane, walking after flying stops, etc.

As yet another example, consider an MT 106 in the form of a person whose current MTMA 105 is swimming. It would be highly unlikely for the next MTMA 105 to be skiing or skydiving. The more likely next MTMAs 105 could be riding in a boat, standing, walking, etc.

As still another example, consider a scenario where two MTs 106, in the form of persons A and B, use the same WCD 104, but at different alternate time periods. Furthermore, if it is known that person A previously used the WCD 104, then it would be likely that person B is now transporting the WCD 104.

In some embodiments, the memory 102 can store and maintain a database (preferably, relational) 119 (FIG. 2D, 2E) that defines the relationships between and among MTMAs 105 (and/or MTs 106). So, when the program code 653 attempts to identify a new MTMA 105 (and/or MT 106), the database 119 is accessed. An identifier associated with the current MTMA 105 (and/or MT 106) is used as an index to look up a set of one or more other MTMA (and/or MT) identifications that will be considered when attempting to determine the next MTMA 105 (and/or MT 106). Said another way, the program code 653 identifies a subset of possible IDs stored in the database 119 based upon the first detected MTMA 105 (and/or MT 106), the subset including one or more MTMA IDs (and/or MT IDs), but less than all of the entire set of MTMA IDs (and/or MT IDs).

2. Second Set of Embodiments

FIG. 19B is a flowchart of an example of a second set of embodiments of the MTMAI system 101 that employs an algorithm(s) 113 that takes into consideration historical data 117b (FIG. 2E) when attempting to identify a new MTMA 105 and/or new MT 106. As shown in FIG. 19B, the MTMAI system 101 includes at least the following program code (or logic): program code 671 designed to receive data from one or more sensors 116; program code 672 designed to retrieve historical data 117b from memory 102; and program code 673 designed to detect an MTMA 105 (and/or MT 106) based upon (a) the sensor data 96 and (b) the historical data 117b. The historical data 117b can be any data concerning the past that can help identify a current MTMA 105 (and/or MT 106), for example but not limited to, one or more historical MTMAs 105 (and/or MT 106), one or more historical events, one or more previous relationships between MTMAs 105 (and/or MT 106) and time information (time of day, day of week, etc.), past actions taken by the AD system 101, one or more previous sequences or patterns of MTMAs 105 (and/or MT 106), frequency of MTMAs 105 (and/or MT 106), length of time for an MTMA 105 to have concluded, transition time in order to commence a new MTMA 105 from a previous MTMA 105, etc.

As an example, when an MT 106 in the form of a person has taken a two hour walk every morning starting at 7:00 am for the last month, it is likely that the person will also engage in this MTMA 105 at this time and for this duration in the future. So, as an example, the algorithm 113 may be designed so that if the sensor data 96 indicates inconclusively that the MTMA 105 is either walking or riding, then the algorithm 113 checks the TOD and selects walking when the TOD is about 7:00 am.

As another example, when an MT 106 in the form of a person skies every day but never rides in a motor vehicle, it is likely that the person will continue with this pattern. So, as an example, the algorithm 113 may be designed so that if the sensor data 96 indicates inconclusively that the MTMA 105 is either skiing or riding a motor vehicle, then the algorithm 113 will conclude that the MTMA 105 is skiing.

3. Third Set of Embodiments

FIG. 19C is a flowchart of an example of a third set of embodiments of the MTMAI system 101 that employs an algorithm(s) 113 that takes into consideration historical data 117b (FIG. 2E) when attempting to identify a new MTMA 105 and/or a new MT 106 by selecting which one or more sensors 116 and/or sensor data 96 to use in order to make the identification. As shown in FIG. 19C, the MTMAI system 101 includes at least the following program code (or logic): program code 681 designed to retrieve historical data 117b (FIG. 2E) from database 119; program code 682 designed to select one or more sensors 116 and/or one or more sensor data 96 based at least in part upon the historical data; and program code 683 designed to identify the MTMA 105 (and/or MT 106) based upon data from the selected sensor(s) 116 or the selected sensor data 96.

In some embodiments, the program code 682 can be designed to cause the sensor(s) 116 to be turned on and off. In other embodiments, the sensors 116 are operational and produce sensor data 96, and the program code 682 merely selects which sensor data 96 to utilize to make the MTMA identification (and/or MT identification).

As an example, the historical data 117b may indicate that an MT 106 in the form of an automobile drives every morning from 10:00 am to noon. Therefore, the algorithm 113 may be implemented as follows. Based upon this historical data 117b and the fact that is it currently 11:00 am, the program code 682 selects the accelerometer data and the microphone data, which both can be utilized to detect that an automobile engine is running, and from this, the program code 683 can identify the MTMA 105 as an automobile driving.

As another example, consider an MT 106 that is associated with a WCD 104 that fails to produce GPS data during a time period each day or all of the time because the WCD 104 cannot receive a sufficient number of data signals from GPS satellites. In this case, the program code 682 may be designed to select accelerometer data and gyroscope data, while ignoring GPS data, so that the program code 683 can identify the MTMA 105.

As yet another example, consider an MT 106 in the form of a person who only walks and runs each day. In this scenario, the program code 682 may be designed to only select accelerometer data and gyroscope data, while ignoring other available sensor data 96, so that the program code 683 can identify the MTMA 105 as either walking or running.

4. Fourth Set Of Embodiments

FIG. 19D is a flowchart of an example of a fourth set of embodiments of the MTMAI system 101 that employs an algorithm(s) 113 that determines that a previously identified MTMA 105 and/or previously identified MT 106 (in historical data 117b) is correct, incorrect, or questionable, based upon one or more newly detected MTMAs 105 and/or MT 106. As shown in FIG. 19D, the MTMAI system 101 includes at least the following program code (or logic): program code 691 designed to receive sensor data 96 from one or more sensors 116; program code 692 designed to detect a first MTMA 105 (and/or first MT 106) based upon an analysis of the sensor data 96 from the sensors 116; program code 693 designed to detect a one or more new MTMAs 105 (and/or new MT 106) based upon analysis of new sensor data 96; program code 694 designed to make a determination as to whether the first MTMA 105 (and/or first MT 106) was correct, incorrect, or questionable. The premise of the algorithm 113 is that some MTMAs 105 (and/or some MTs 106) have a relation to other MTMAs 105 (and/or other MTs 106), and so therefore, if one knows a current MTMA 105 (and/or current MT 106), this information can be used to help determine whether a previously identified MTMA 105 (and/or previously identified MT 106) was accurate or not. In some embodiments, if the first MTMA 105 (and/or first MT 106) is incorrect or questionable, then the MTMAI system 101 can attempt another identification of the MTMA 105 (and/or MT 106) using archived sensor data 96 or advise the AD system 102 of same so that the AD system 102 can take action, if necessary. In some embodiments, if correct, then any metric associated with the first MTMA detection (and/or first MT detection) certainty can be increased.

As an example, if skiing was identified as the MTMA 105 and then flying in an airplane is detected, then the MTMA 105 of skiing can be brought into question.

N. Embodiments of MTMAI Systems that Employ User Preferences

1. First Set of Embodiments

FIG. 20A is a flowchart of an example of a first set of embodiments of the MTMAI system 101 that employs user preferences data 117c (FIG. 2E). Essentially, the MTMAI system 101 takes into consideration user preferences data 117c, which are input or selected by a user, when attempting to identify an MTMA 105 and/or MT 106. The user preferences data 117c identifies the one or more MTMAs 105 and/or MTs 106 that will be the focus for detection. As shown in FIG. 20A, the MTMAI system 101 includes at least the following program code (or logic): program code 701 designed to receive data from one or more sensors 116; program code 702 designed to access the user preferences data 117c stored in memory 102 that identifies one or more MTMAs 105 (and/or MTs 106) to attempt to identify; and program code 703 designed to identify an MTMA 105 (and/or an MT 106) based upon the sensor data 96 and the user preferences data 117c.

The user can define the user preferences data 117c via any suitable user interface. For instance, a graphical user interface (GUI) 112, in the form of software, can be stored in memory 102 that drives appropriate user input screens to the user via a display 120 and prompts the user for selections or inputs. MTMA options (and/or MT options) can be selected or otherwise input by the user. In essence, the user preferences data 117c defines the searching universe.

In some embodiments, the user may define, via user preferences, only the MTMAs 105 (and/or MTs 106) of interest to the user.

In some embodiments, the user can advise the MTMAI system 101, via user preferences, to track a particular number of the most often detected MTMAs 105 (and/or MTs 106) by accessing the historical data 117b.

In some embodiments, the user can advise the MTMAI system 101, via user preferences, to track a particular number of the least often detected MTMAs 105 (and/or MTs 106) by accessing the historical data 117b.

In some embodiments, the program code 703 is designed to compute one or more statistical metrics for each MTMA 105 and to compare the metrics in order to detect the MTMA 105 (and/or MT 106).

As an example, in connection with MTMAs 105, the user may advice the MTMAI system 101, via user preferences, to detect all instances of running, and may advise the AD system 102, via user preferences, to track all instances and when the running exceeds 100 hours, communicate with a server associated with a retailer to order a new pair of running shoes.

2. Second Set of Embodiments

FIG. 20B is a flowchart of an example of a first second set of embodiments of the MTMAI system 101 that employs user preferences data 117c (FIG. 2E). Essentially, the MTMAI system 101 takes into consideration user preferences data 117c, which are input or selected by a user, when attempting to identify an MTMA 105 and/or MT 106. The user preferences data 117c define the one or more sensors 116 that will be utilized in order to detect one or more MTMAs 105 and/or MTs 106. As shown in FIG. 20B, the MTMAI system 101 includes at least the following program code (or logic): program code 711 designed to receive data from one or more sensors 116; program code 712 designed to access the user preferences data 117c stored in memory 102 that identifies one or more sensors 116 to use to attempt to identify one or more MTMAs 105 (and/or MTs 106); and program code 713 designed to identify an MTMA 105 (and/or MT 106) based upon the sensor data 96 and the user preferences data 117c.

The user can define the user preferences data 117c via any suitable user interface. For instance, the GUI 112, in the form of software, can be stored in memory 102 that drives appropriate user input screens to the user via a display 120 and prompts the user for selections or inputs. Sensor options can be selected or otherwise input by the user.

As an example, the user may specific, via user preferences, that the MTMAI system 101 should only use data from an accelerometer 116 to identify the one or more MTMAs 105 (and/or MTs 106) in situations where it is known that other sensor data 96 will not be available, will be unreliable, will cause undue delay, etc.

In some embodiments, the program code 713 can be designed to turn sensors on or off based upon the user preferences data 117c that define which will be utilized.

In some embodiments, the user preferences data 117c can define which one or more sensors 116 will be used to identify specific MTMAs 105 (and/or MTs 106). For example, use the accelerometer data when attempting to identify running or a specific person.

In some embodiments, the user preferences data 117c can define use of one or more sensors 116 for all MTMAs 105 (and/or MTs 106). For example, use the microphone for detecting all MTMAs 105. Or, as another example, use the accelerometer, gyroscope, and microphone for detecting all MTs 106.

In some embodiments, the user preferences data 117c can define use of one or more sensors 116 for categories or groupings of MTMAs 105 (and/or MTs 106). For example, use the accelerometer data and gyroscope data when attempting to identify the MTMAs 105 in the group consisting of running, walking, and standing. However, in the case of flying and driving, use the pressure sensor 116 and the accelerometer data.

O. Embodiments of MTMAI Systems that Employ Sensor Data Selection

1. First Set of Embodiments

FIG. 21A is a flowchart of an example of a first set of embodiments of the MTMAI system 101 that employs a sensor data 96 selection algorithm 113 in order to assist with identifying an MTMA 105 and/or MT 106. As shown in FIG. 21A, the MTMAI system 101 includes at least the following program code (or logic): program code 761 designed to receive sensor data 96 from one or more sensors 116; program code 762 designed to attempt to identify an MTMA 105 (and/or MT 106) based upon the sensor data 96 from the one or more sensors 116; program code 763 designed to determine whether or not the MTMA 105 (and/or MT 106) can be identified; program code 764 designed to, when the program code 763 cannot identify the MTMA 105 (and/or MT 106) with sufficient accuracy, analyze data from one or more other sensors 116; and program code 765 designed to determine the MTMA 105 (and/or MT 106) based upon the original sensor in combination with the new other sensor data 96 or merely based upon the new other sensor data 96.

The program code 764 may be designed to request or acquire the data from the other sensors 116. In some embodiments, the program code 764 may be designed to initiate operation (turn on) of the other sensors 116 so that they produce data that can be analyzed.

In some embodiments, the program code 762 is designed to attempt to identify the MTMA 105 (and/or MT 106) by correlating the sensor data 96 with a plurality of reference data signatures 117 using the detection engine 315 (FIG. 15). A correlation value for is produced for each correlation of the sensor data 96 with a specific one of the reference data, the correlation value indicative of a degree to which the sensor data 96 matches the specific one of the reference data. The program code 763 is designed to compare the correlation value with a predetermined threshold and to determine whether or not the MTMA 105 (and/or MT 106) has been determined with sufficient accuracy based upon the comparison.

In some embodiments, the program code 763 may be designed to (a) communicate a proposed MTMA 105 (and/or proposed MT 106) to the user via a suitable I/O device 120, for instance, a display image, audible message, etc., (b) request confirmation from the user that the identified MTMA 105 (and/or identified MT 106) is correct, and (c) to notify the program code 764 to analyze data from the other sensors 116 when the user does not confirm the proposed MTMA 105 (and/or proposed MT 106).

In some embodiments, the other sensors that are consulted are identified by time information (TOD, TOW, etc.), event detection, temperature, predefined user preferences data 117c, etc.

2. Second Set of Embodiments

In FIG. 21B is a flowchart of an example of a second set of embodiments of the MTMAI system 101 that employs a sensor data selection algorithm 113 in order to assist with identifying an MTMA 105 and/or MT 106. As shown in FIG. 21A, the MTMAI system 101 includes at least the following program code (or logic): program code 771 designed to receive sensor data 96 from one or more sensors 116; program code 772 designed to attempt to identify an MTMA 105 (and/or MT 106) based upon the sensor data 96 from the one or more sensors 116; program code 773 designed to determine whether or not the MTMA 105 (and/or MT 106) can be identified with sufficient accuracy; program code 774 designed to, when the program code 763 can identify the MTMA 105 (and/or MT 106) with sufficient accuracy, refrain from analyzing data from one or more other sensors 116; and program code 765 designed to determine the MTMA 105 (and/or MT 106) based upon the received sensor data 96. In some embodiments, the program code 772 is designed to attempt to identify the MTMA 105 (and/or MT 106) by correlating the sensor data 96 with a plurality of reference data signatures 117 using the detection engine 315 (FIG. 15). A correlation value for is produced for each correlation of the sensor data 96 with a specific one of the reference data, the correlation value indicative of a degree to which the sensor data 96 matches the specific one of the reference data. The program code 773 is designed to compare the correlation value with a predetermined threshold and to determine whether or not the MTMA 105 (and/or MT 106) has been determined with sufficient accuracy based upon the comparison. If so, then the program code 774 insures that the MTMAI system 101 does not analyze other sensor data 96, and the program code 775 conclusively determines the MTMA 105 (and/or MT 106).

In some embodiments, the program code 773 may be designed to (a) communicate a proposed MTMA 105 (and/or proposed MT 106) to the user via a suitable I/O device 120, for instance, a display image, audible message, etc., (b) request confirmation from the user that the identified MTMA 105 is correct, and (c) to notify the program code 774 to not analyze data from the other sensors 116 when the user does confirm the proposed MTMA 105 (and/or proposed MT 106).

3. Third Set of Embodiments

FIG. 21C is a flowchart of an example of a third set of embodiments of the MTMAI system 101 that employs a sensor data selection algorithm 113 in order to assist with identifying an MTMA 105 and/or MT 106. As shown in FIG. 21C, the MTMAI system 101 includes at least the following program code (or logic): program code 781 designed to determine one or more MTMAs 105 (and/or MTs 106) to detect; program code 782 designed to select one or more sensors 116, or sensor data 96, based upon the determined MTMAs 105 (and/or determined MTs 106; and program code 783 designed to detect the determined MTMAs 105 (and/or determined MTs 106) by analyzing selected sensor data 96.

The program code 781, which is designed to determine one or more MTMAs 105 (and/or MTs 106) to detect, can take many different forms. As an example, the user could specific which MTMAs 105 (and/or MT 106) to attempt to detect via (a) selection or input provoked by a suitable GUI 112 or (b) user preferences 117c.

As another example, the MTMAs 105 (and/or MTs 106) to detect could be based at least in part upon historical data 117b. For instance, the algorithm 113 may be: search for the 5 most often detected MTMAs 105 (and/or MTs 106).

As yet another example, the MTMAs 105 (and/or MTs 106) to detect could be preset (fixed).

The program code 782, which is designed to select one or more sensors 116 or sensor data 96, based upon the determined MTMAs 105 (and/or MTs 106), can take various forms. For example, an MTMA-sensor cross reference table 117d (FIG. 2E) can be stored in memory 102 and used to define which one or more sensors 116 or sensor data 96 will be used to attempt to identify each MTMA 105. For instance, in the case of driving, the selected sensors 116 or sensor data 96 might be an accelerometer 116, GPS receiver, and a microphone 116. As another example, an MT-sensor cross reference table 117h (FIG. 2E) can be stored in memory 102 and used to define which one or more sensors 116 or sensor data 96 will be used to attempt to identify each MT 106. For instance, in the case of an MT 106 in the form of a person, the selected sensors 116 or sensor data 96 might be an accelerometer 116, gyroscope, and a microphone 116.

As another example, the program code 782 may be designed to select the one or more sensors 116 or the sensor data 96 merely based upon availability or integrity.

As yet another example, the program code 782 may be designed to select the one or more sensors 116 or the sensor data 96 to minimize power consumption, while still identifying the MTMAs 105 (and/or MTs 106). For instance, if the MTMA 105 is driving and driving can be determined with high certainty most of the time with an accelerometer 116, then only use the accelerometer 116 and do not activate other sensors 116, such as the GPS receiver 116, etc.

As still another example, the program code 782 may be designed to select the one or more sensors 116 or the sensor data 96 based upon historical data 117b relating, for instance, on how successful or trustworthy MTMA detection (and/or MT detection) has been in the past in connection with the sensors 116.

The program code 783, which is designed to detect the determined MTMAs 105 (and/or MTs 106) by analyzing selected sensor data 96, can take numerous forms, as described at various locations in the present disclosure.

In some embodiments, the program code 782 can be further designed so that the sensor or sensor data selection is implemented in a plurality of successive analysis stages, where the selection is based upon the success or lack of success of previous analysis stages in detecting the MTMAs 105 (and/or MTs 106). For example, in a single stage implementation, the program code 782 may be designed to initially select one or more sensors 116 or sensor data 96 to utilize in an attempt to identify the MTMAs 105 (and/or MTs 106) and then make a determination on whether or not other additional sensors 116 or sensor data 96 are needed or should be utilized after analyzing the initially selected sensor data 96. For instance, the program code 782 may determine that the MTMAs 105 (and/or MT 106) cannot be determined with sufficient accuracy using only the initially selected sensor data 96, in which case, other sensor data 96 is needed for helping in the attempt to identify the MTMAs 105 (and/or MTs 106).

4. Fourth Set of Embodiments

FIG. 21D is a flowchart of an example of a fourth set of embodiments of the MTMAI system 101 that employs a sensor data selection algorithm 113 in order to assist with identifying one or more MTMAs 105 and/or MTs 106. This set of embodiments involves making the selection based at least in part upon time information, e.g., time of day (TOD), time of week (TOW), time of month (TOM), time of year (TOY), time usually associated with a current MTMA 105, time usually associated with a current MT 106, time remaining in connection with battery power of the WCD 104, etc. As shown in FIG. 21D, the MTMAI system 101 includes at least the following program code (or logic): program code 791 that determines the time information; program code 792 that selects one or more sensors 116 or sensor data 96 based at least in part upon the time information; and program code 793 that detects one or more MTMAs 105 (and/or MTs 106) by analyzing data from the selected sensors 116 or sensor data 96.

The program code 791, which determines the time information, can take various configurations. In one embodiment, the program code 791 may be designed to merely identify the TOD, TOW, etc., directly or indirectly, from an on-board clock associated with the WCD 104, and the program code 792 may be configured to select the one or more sensors 116 merely based upon this time information.

In some embodiments, the program code 791 may be designed to identify the TOD, TOW, etc., directly or indirectly, from an on-board clock associated with the WCD 104, and the program code 792 may be configured to select the one or more sensors 116 based upon this time information as well as historical data 117b associated with MTMAs 105 (and/or MTs 106). For example, in connection with MTMA detection, if it is known that running occurs each day from 6:00 am to 8:00 am, then during this time period, the sensors 116 or sensor data 96 that are most appropriate for detecting the MTMA 105 of running should be selected and utilized. As another example, if it is known that a specific MT 106 has possession of the WCD each day from 6:00 am to 8:00 am, then during this time period, the sensors 116 or sensor data 96 that are most appropriate for detecting the specific MT 106 should be selected and utilized. As yet another example, in the case of MTMA detection, if a current MTMA 105 usually takes 15 minutes, then switch to a new one or more sensors 116, after expiration of the 15 minute time period, that are better for detecting another different MTMA 105.

In some embodiments, the program code 791 may be designed to identify the TOD, TOW, etc., directly or indirectly, from an on-board clock associated with the WCD 104, and the program code 792 may be configured to select the one or more sensors 116 based upon this time information in combination with user preferences data 117c. The user may define which sensors 116 or sensor data 96 to used relative to TOD, TOW, etc.

In some embodiments, the program code 791 may be designed to identify the TOD or TOW from an on-board clock associated with the WCD 104, and the program code 792 may be configured to select the one or more sensors 116 based upon this time information in combination with a detected event in the WCD environment. Detection of events is described in detail elsewhere in this disclosure.

In some embodiments, the program code 791 may be designed to identify the TOD or TOW from an on-board clock associated with the WCD 104, and the program code 792 may be configured to select the one or more sensors 116 based upon this time information in combination with a location of the WCD 104. Detection of WCD location can be accomplished by using location data 109a from a GPS receiver, WiFi equipment, cell towers, etc., and map data 109b (or other Earth reference data).

In some embodiments, the program code 791 may be designed to identify how much WCD battery power remains, and the program code 792 may be configured to select the one or more sensors 116 based upon this time information. The program code 792 may select one or more sensors 116 that will minimize power consumption, while still enabling detection of the MTMA 105 (and/or MT 106).

The program code 793, which is designed to detect the determined MTMAs 105 (and/or MTs 106) by analyzing selected sensor data 96, can take numerous forms, as described at various locations in the present disclosure.

P. Embodiments of MTMAI Systems that Employ Environmental Event Detection

1. First Set of Embodiments

FIG. 22A is a flowchart of an example of a first set of embodiments of the MTMAI system 101 that employs an environmental event detection algorithm 113 in order to assist with identifying one or more MTMAs 105 and/or one or more MTs 106. As shown in FIG. 22A, the MTMAI system 101 includes at least the following program code (or logic): program code 801 (event detection logic) designed to detect an event in the environment associated with the WCD 104; program code 802 (sensor selection logic) designed to initiate and/or select one or more sensors 116 and/or sensor data 96 that will be used to attempt to identify the MTMA 105 (and/or MT 106), the selection being based upon the event detection; and program code 803 (MTMA identification logic) designed to detect the MTMA 105 by analyzing the data from the selected sensors 116 and/or sensor data 96. The event can be any environmental occurrence in an environment associated with the WCD 104, for example but not limited to, an acoustic, thermal, magnetic, optical, electromagnetic, chemical, dynamic, wireless, atmospheric, or biometric condition.

a. Event Detection Logic

The program code 801, which is designed to detect an event in the environment associated with the WCD 104, can take various forms. One nonlimiting example is illustrated in FIG. 22B.

In some embodiments, the MTMAI system 101 may be designed with logic for storing identification information relating to a plurality of events and with logic for enabling the user to select which of the events will be detected.

With reference to FIG. 22B, the program code 801 is designed to include an event detection engine 815, which detects events using correlation, as will be further described hereafter. FIG. 22B shows the one or more sensors 116, such as but not limited to, an accelerometer, a gyroscope, an audio microphone, etc., for receiving one or more event reference signatures 117e (FIG. 2E) that are used to identify events. The event detection engine 815 may also be designed to also access and receive reference signatures from a remote computer 816 via the TX/RX 114 and the Internet 810.

The event detection engine 815 stores the one or more event reference signatures 117e in memory 102 (FIG. 2E) that are used to identify events, correlates sensed signal data with the reference signatures 117e, and detects occurrences of the events. A non-limiting example of such a detection engine 815 is described in U.S. Pat. No. 7,872,574, which is incorporated herein by reference in its entirety. The discussion hereafter will describe incorporation of the latter detection engine in the architecture of the present disclosure.

The event detection engine 815 is designed to be operated in several modes. The architecture of the event detection engine 815 will be apparent as each of these modes is described in detail hereafter.

i. First Mode

In a first mode, the RCS 90 is connected to a reference memory array 860 by a switch 850. One or more reference signatures 117e are collected by the RCS 90 and loaded into the reference memory array 860.

Reference signatures 117e can be collected from the RCS 90. These can be stored locally on the WCD 104 and used for future comparisons, or these can be requested in real time when a sensed signature is being analyzed to identify an event.

The preprocessor 870 extracts the reference signature data from the reference memory array 860 and reformats the data to facilitate rapid correlation. The frequency domain is a preferred format, but time domain correlation or a combination thereof can also be employed. The preprocessor 870 analyzes each signature 117e by a sequence of Fourier transforms taken repeatedly over a period of time corresponding to the duration of the signature. The Fourier transform is preferably a two-dimensional vector, but a single measure of amplitude versus frequency is sufficient. In the preferred embodiment, among many possible embodiments, the event detection engine 815 processes a 3-dimensional array of amplitude, frequency, and time. The transformed signature arrays are stored back into a reference memory array 860 for subsequent rapid correlation. Preferably, each reference signature array includes an identifier field associated with the signature 117e.

ii. Second Mode

In a second mode of operation, event detection engine 815 can acquire the reference signatures 117e directly from the local environment via a sensor(s) 116. The data sensed by the sensor 116 is selected by the user via the switch 850 and loaded directly into the reference memory array 860. Preferably, several seconds of signal are collected in this particular application. Then, the preprocessor 870 reformats the reference data to enable rapid correlation, preferably by Fourier transform.

iii. Third Mode

In a third mode of operation, the event detection engine 815 monitors the sensor data 96 continuously (at discrete successive short time intervals due to the computer-based architecture) for data that matches those stored in the reference memory array 860. To reduce computational burden, the preprocessor 870 is designed to monitor the sensor 116 for a preset threshold level of signal data before beginning the correlation process. When the signal data exceeds the preset threshold level, the preprocessor 870 begins executing a Fourier transform. After several seconds or a period equal to the period of the event reference signatures 117e, the transformed active sensed data is stored at the output of the preprocessor 870. Then, array addressing logic 880 begins selecting one reference signature 117e at a time for correlation. Each event reference signature 117e is correlated by a correlator 890 with the active sensed data to determine if the event reference signature 117e matches the active sensed data.

A comparator 900 compares the magnitude of the output of the correlator 890 with a threshold to determine a match. When searching for a match, the correlator 890 is compared with a fixed threshold. In this case, the switch 910 selects a fixed threshold 911 for comparison. If the correlation magnitude exceeds the fixed threshold 911, then the comparator 900 has detected a match. The comparator 900 then activates the correlation identifier register 420 and the correlation magnitude register 930. The magnitude of the comparison result is stored in the correlation magnitude register 930, and the identity of the event is stored in the correlation identifier register 920. The fixed threshold 911 can be predefined by a programmer or the user of the WCD 104.

After event detection by the event detection engine 815, the process is stopped and the array addressing logic 880 is reset. A search for new active sensed data then resumes.

iv. Fourth Mode

In a fourth mode of operation, the event detection engine 815 searches for the best match for the sensed data. In this case, the correlation magnitude register 830 is first cleared. Then, the switch 910 selects the output 912 of the correlation magnitude register 830 as the threshold input to the comparator 900. The array addressing logic 880 then sequentially selects all stored references 117e of a set for correlation. After each reference 117e in the set is correlated, the comparator 900 compares the result with previous correlations stored in the correlation magnitude register 930. If the new correlation magnitude is higher, then the new correlation magnitude is loaded into the correlation magnitude register 930, and the respective identifier is loaded into the correlation identifier register 920.

In an alternative embodiment, the correlation process can be performed by an associative process, where the active reference is associated directly with the stored references in a parallel operation that is faster than the sequential operation. New device technologies may enable associative processing. For example, reference memory array 860 can utilize content addressable memory devices for associative processing. ASIC devices and devices, such as the Texas Instruments TNETX3151 Ethernet switch incorporate content addressable memory. U.S. Pat. No. 5,216,541, entitled "Optical Associative Identifier with Joint Transform Correlator," which is incorporated herein by reference, describes optical associative correlation that can be utilized.

This correlation process continues until all stored reference signatures 117e in the set under analysis have been correlated. When the correlation process is complete, the correlation identifier register 920 holds the best match of the identity of the source of the active signal.

b. Sensor Selection Logic

As shown in FIG. 22B, the program code 802 is designed to read this register 920 and then determines which one or more sensors 116 will be utilized to identify the MTMA 105 and/or MT 106. In addition, the identity of the event can also be displayed as a photo or text description in a display 120 or as a verbal announcement via a speaker 120.

As an example, in connection with MTMA detection, when the program code 801 detects an event in the form of a low temperature or a low temperature in combination with a high altitude, the program code 802 may be designed to analyze sensor data 96 from those one or more sensors 116 that are used to determine if the MTMA 105 is skiing.

c. MTMA/MT Identification Logic

The program code 803 is designed to identify the MTMA 105 and/or MT 106 from the selected sensor data 96, using any of the various techniques (e.g., frequency domain analysis, time domain analysis, correlation, etc.) described in the present disclosure.

2. Second Set of Embodiments

FIG. 22C is a flowchart of an example of a second set of embodiments of the MTMAI system 101 that employs an environmental event detection algorithm 113 in order to assist with identifying one or more MTMAs 105 and/or one or more MTs 106. As shown in FIG. 22C, the MTMAI system 101 includes at least the following program code (or logic): program code 1001 (event detection logic) designed to detect an event in the environment associated with the WCD 104; program code 1002 (MTMA selection logic and/or MT selection logic) designed to select a set of one or more MTMAs 105 (and/or MTs 106) that will be the focus of the identification analysis (i.e., those that the MTMAI system 101 will attempt to identify), the selection being based upon the event detection; and program code 803 (MTMA identification logic) designed to detect the MTMA 105 by analyzing the data from the selected sensors 116 or sensor data 96. The event can be any environmental occurrence in an environment associated with the WCD 104, for example but not limited to, an acoustic, thermal, magnetic, optical, electromagnetic, chemical, dynamic, wireless, atmospheric, or biometric condition.

The program code 1001, which is designed to detect an event in the environment associated with the WCD 104, can take various forms. In some embodiments, the program code 1001 is implemented the same way that program code 801 is implemented, utilizing the event detection engine of FIG. 22B.

The program code 1002 (MTMA selection logic and/or MTMA selection logic), which is designed to select one or more MTMAs 105 (and/or MTs 106) that the MTMAI system 101 will attempt to identify, can take various configurations.

The program code 1003 is designed to identify the MTMA 105 (and/or MT 106) from the selected set of one or more MTMAs 105 (and/or MTs 106) using any of the various techniques (e.g., frequency domain analysis, time domain analysis, correlation, etc.) described in the present disclosure.

3. Third Set of Embodiments

FIG. 22D is a flowchart of an example of a third set of embodiments of the MTMAI system 101 that employs an environmental event detection algorithm 113 in order to assist with identifying one or more MTMAs 105 and/or one or more MTs 106. As shown in FIG. 22D, the MTMAI system 101 includes at least the following program code (or logic): program code 1011 (event detection logic) designed to detect an event in the environment associated with the WCD 104; program code 1012 (sensor and MTMA selection logic and/or MT selection logic) designed to initiate and/or select a set of one or more sensors 116 and/or sensor data 96 and to select a set of one or more MTMAs 105 (and/or MTs 106) that will be the focus of the identification analysis (i.e., those that the MTMAI system 101 will attempt to identify), the foregoing selections being based upon the event detection; and program code 803 (MTMA identification logic and/or MT identification logic) designed to detect the one or more MTMAs 105 (and/or MTs 106) by analyzing the data from the selected sensors 116 or sensor data 96. The event can be any environmental occurrence in an environment associated with the WCD 104, for example but not limited to, an acoustic, thermal, magnetic, optical, electromagnetic, chemical, dynamic, wireless, atmospheric, or biometric condition.

The program code 1011, which is designed to detect an event in the environment associated with the WCD 104, can take various forms. In some embodiments, the program code 1011 is implemented the same way that program code 801 is implemented, utilizing the event detection engine of FIG. 22B.

The program code 1012 (sensor and MTMA selection logic and/or MT selection logic), which is designed to select one or more MTMAs 105 (and/or MTs 106) that the MTMAI system 101 will attempt to identify, can take various configurations.

The program code 1013 is designed to identify the MTMA 105 (and/or MT 106) from the selected set of one or more MTMAs 105 (and/or one or more MTs 106) using any of the various techniques (e.g., frequency domain analysis, time domain analysis, correlation, etc.) described in the present disclosure.

4. Fourth Set of Embodiments

FIG. 22E is a flowchart of an example of a fourth set of embodiments of the MTMAI system 101 that employs an environmental event detection algorithm 113 in order to assist with identifying one or more MTMAs 105 and/or MTs 106. As shown in FIG. 22E, the MTMAI system 101 includes at least the following program code (or logic): program code 1021 designed to receive data from one or more sensors 116; program code 1022 (MTMA detection logic and/or MT detection logic) designed to detect an MTMA 105 (and/or MT 106) based upon the sensor data 96; program code 1023 (event detection logic) designed to detect an event in the environment associated with the WCD 104, after or during the MTMA detection process (and/or MT detection process) implemented by the program code 1022; program code 1024 designed to perform a verification process to determine whether the detected MTMA 105 (and/or detected MT 106) is correct, incorrect, or questionable. In some embodiments, if the MTMA 105 (and/or MT 106) is incorrect or questionable, then the MTMAI system 101 can attempt another identification of the MTMA 105 (and/or MT 106). In some embodiments, if correct, then any metric associated with the MTMA detection certainty (and/or MT detection certainty) can be increased.

As an example, in connection with MTMA detection, assume that the MTMA 105 has been identified as running. Then, an event in the form of a motor vehicle engine noise is detected, which calls into question whether or not the MTMA 105 is in fact running. In this case, the MTMAI system 101 may attempt another identification to insure that the MTMA is running.

The program code 1022, which is designed to identify the MTMA 105 (and/or MT 106) from the sensor data 96 can use any of the various techniques (e.g., frequency domain analysis, time domain analysis, correlation, etc.) described in the present disclosure.

The program code 1023, which is designed to detect an event in the environment associated with the WCD 104, can take various forms. In some embodiments, the program code 1023 is implemented the same way that program code 801 is implemented, utilizing the event detection engine of FIG. 22B.

5. Fifth Set of Embodiments

FIG. 22F is a flowchart of an example of a fifth set of embodiments of the MTMAI system 101 that employs an environmental event detection algorithm 113 in order to assist with identifying one or more MTMAs 105 and/or one or more MTs 106. As shown in FIG. 22F, the MTMAI system 101 includes at least the following program code (or logic): program code 1031 designed to receive data from one or more sensors 116; program code 1032 (MTMA detection logic) designed to detect an MTMA 105 (and/or MT 106) based upon the sensor data 96; program code 1033 (event detection logic) designed to detect an event in the environment associated with the WCD 104; program code 1034 designed to identify a second MTMA 105 (and/or second MT 106) based at least in part upon the detected event.

In some embodiments, the program code 1034 identifies the second MTMA 105 (and/or second MT 106) based not only upon the detected event, but also historical data 117b.

Q. Embodiments of MTMAI Systems that Employ Data from Multiple WCDs

The following embodiments of the MTMAI system 101 are designed to analyze data associated with a plurality of WCDs 104 in order to identify one or more MTMAs 105 and/or MTs 106.

1. First Set of Embodiments

FIG. 23A is a flowchart of an example of a first set of embodiments of the MTMAI system 101 that analyzes data associated with a plurality of WCDs 104, specifically sensor data 96 from one or more sensors 116 associated with each WCD 104, in order to identify one or more MTMAs 105 and/or MTs 106. As shown in FIG. 23, the MTMAI system 101 includes at least the following program code (or logic): program code 1101 designed to receive data from (a) one or more sensors 116 associated with the local WCD 104 and (b) one or more sensors 116 associated with one or more remote WCDs 104; and program code 1102 designed to identify the MTMA 105 (and/or MT 106) based upon the sensor data 96.

The WCDs 104 can be designed to communicate using any of numerous communication technologies, including for example, RF, Bluetooth, WiFi, etc.

In some embodiments, the sensor data 96 from the local and remote WCDs 104 is from the same type of sensor (e.g., pressure sensor data 96 from a local and remote sensor 116). An algorithm 115 (FIG. 2D) can be designed to analyze the sensor data 96 and identify the MTMA 105 (and/or MT 106) associated with the local WCD 104 and perhaps even the remote WCD 104. Signal processing techniques described elsewhere in this disclosure can be employed.

In some embodiments, the sensor data 96 is from different types of sensors 116 (e.g, accelerometer data from one and GPS data 109a from another). An algorithm 115 (FIG. 2D) can be designed to analyze the sensor data 96 from the different sensors 116 and identify the MTMA 105 (and/or MT 106) associated with the local WCD 104 and perhaps even the remote WCD 104. Signal processing techniques described elsewhere in this disclosure can be employed.

2. Second Set of Embodiments

FIG. 23B is a flowchart of an example of a second set of embodiments of the MTMAI system 101 that analyzes sensor data 96 from one or more remote WCDs 104 in order to identify one or more MTMAs 105 (and/or MT 106) associated with a local WCD 104. The general idea with this set of embodiments is that knowledge of a remote MTMA 105 (and/or ID of a remote MT 106) associated with a remote WCD 104 can sometimes assist a local WCD 104 in determining its MTMA 105 (and/or ID of its MT 106). As shown in FIG. 23B, the MTMAI system 101 includes at least the following program code (or logic): program code 1121 designed to receive data locally from one or more sensors 116; program code 1122 designed to receive a message that a remote party is involved in a particular MTMA 105 (remote MTMA 105; and/or has a specific MT ID); and program code 1123 designed to identify a local MTMA 105 (and/or local MT 106) associated with the local WCD 104 based upon the local sensor data 96 and the remote MTMA 105 (and/or ID of remote MT 106) of the remote WCD 104.

With respect to the program code 1122, the message can take any suitable form that indicates the particular MTMA 105 (and/or ID of MT 106) associated with the remote WCD 104. Furthermore, the message can be communicated directly or indirectly from the remote WCD 104 to the local WCD 104, or communicated from some other computer system that has knowledge of the remote MTMA 105 (and/or remote MT 106). Moreover, the message can be pushed or pulled (solicited) to the local WCD 104.

The program code 1123 can take a variety of possible configurations. As an example, in connection with MTMA detection, it may be known, based upon historical data 117b, that two WCDs 104 exhibit the same MTMA 105 most of the time or most of the time during a particular time period. In this case, the identification of the remote MTMA 105 can assist the local WCD in determining its MTMA 105. An algorithm 113 can give substantial weight to the remote MTMA 105 in determining the local MTMA 105.

Furthermore, note that the remote WCD 104 can be in close proximity to the local WCD 104, for example, each could be associated with a runner, the runners running side by side.

In some embodiments, the MTMAI system 101 and/or the AD system 102 of the local WCD 104 may be designed with program code that communicates information to the local user indicating the identity of the remote MTMA 105 (and/or MT 106) and perhaps other information, for example, the location of the remote WCD 104, etc. Such information could enable the local user to associate with the remote user, if desired. As an example, in connection with MTMA and/or MT detection, one runner may wish to join another runner.

R. Embodiments of MTMAI Systems that Employ Sampling Rate Changes to Enhance MTMA Detection FIG. 23C is a flowchart of an example of a set of embodiments of the MTMAI system 101 that employs a change in the sampling rate in order to enhance MTMA detection and/or MT detection. As shown in FIG. 23C, the MTMAI system 101 includes at least the following program code (or logic): program code 1131 designed to receive sensor data 96 from one or more sensors 116; program code 1132 designed attempt to identify the MTMA 105 (i.e., contingent MTMA 105; and/or contingent MT 106) based upon the sensor data 96; program code 1133 designed to acquire one or more new sensor data 96 sets by changing a data sampling rate when the MTMA identification is not possible or not identifiable beyond a certain level of confidence; and program code 1134 designed to identify the MTMA 105 (and/or MT 106) based upon the new sensor data 96 associated with the new sampling rate(s).

In some embodiments, the program code 1132 and/or program code 1133 can be designed to produce a probability or other metric and compare same to a threshold in order to determine if the MTMA 105 (and/or MT 106) can be identified with sufficient confidence.

The program code 1133 may be designed to iteratively change the sampling rate one or more times in order to produce a respective number of data sets for analysis.

The program code 1133 can be designed to increase, decrease, or both increase and decrease the sampling rate of the sensor data 96 in order to produce more data sets for analysis.

In some embodiments, wherein the sampling rate is increased, the new sampled data is analyzed alone or in combination with one or more previous sampled data in order to attempt to make the MTMA identification and/or MT identification. In these embodiments, one or more noise filters may need to be employed due to the increase in data samples.

In some embodiments, wherein the sampling rate is decreased, the new sampled data is analyzed alone or in combination with one or more previous sampled data in order to attempt to make the MTMA identification and/or MT identification. In these embodiments, noise is reduced, which can lead to a more accurate identification in some instances.

In some embodiments, wherein the sampling rate is both increased and decreased, the new sampled data is analyzed alone or in combination with one or more previous sampled data in order to attempt to make the MTMA and/or MT identification.

S. Embodiments of Action Determination (AD) Systems

Once the MTMA 105 and/or MT 106 is identified and the pertinent information communicated to the AD system 102 by the MTMAI system 101, the AD system 102 can take any appropriate one or more intelligent ID-based and/or activity-based actions. The action can be, for example but not limited to, the placement of an order for or purchase of a good or service, causing or changing a schedule relating to delivery or pickup of a good or service, solicitation of or selection and output of an advertisement, pushing an advertisement based upon a detected skill level of the WCD user, pushing a recommendation to the WCD user (e.g., recommend a ski run based upon the detected skill level, advising the user to join with another who has a similar skill level, etc.), pushing a weather report, temporary or permanent prevention of a requested communication session, activating and/or deactivating one or more programs and/or devices (e.g., GPS receiver, WiFi transceiver, Bluetooth transceiver, cellular transceiver, program drivers associated with any of the foregoing, etc.) associated with the WCD 104 based at least in part upon the MTMA (e.g., to save WCD battery power), approval/disapproval of a credit or debit card transaction at a POS device (FIGS. 24M and 24N), unlocking or locking a lock, etc.

In some embodiments, the AD system 102 can implement one or more algorithms 115 (FIG. 2D) in order to determine an appropriate action, based upon the MTMA detection and/or MT detection.

A history of MTMAs 105 and/or MTs 106 associated with the WCD 104 may be recorded, as part of historical data 117b (FIG. 2E), for analysis purposes. The progress of a person's skill level can be monitored.

The AD system 102 may be designed to store statistics of the MTMAs 105 and/or MTs 106 over a prolonged period of time and provide the statistics or a derivative thereof to a user. For example, in connection with MTMA detection, the user can be provided with a listing of the percentage of time spent walking or running during a day. These percentages can be computed from simple algorithms 115.

If the MTMA 105 is a form of exercise or entertainment, then the AD system 102 of the WCD 104 may be designed to turn on an audio file, such as music. If the MTMA 105 stops, for example, if the WCD 104 user stops during a jog or a bike ride, the AD system 102 could be designed to pause or turn down the volume of the audio file. The AD system 102 may also be designed to play different audio based on what MTMA 105 is identified. For example, the user may have different playlists for jogging and for bike rides.

The knowledge a user's performed MTMAs 105 can be used to analyze a user's daily patterns and report any anomalies. For example, if the user is known to take the bus/drive to work at a specific time every weekday, then if the user oversleeps, the AD system 102 can be designed to cause the WCD 104 to sound an alarm.

Studying the user's daily/weekly/monthly habits can provide information for more effective advertising. A person who regularly jogs may be pushed advertisements for running shoes. Also, a user can be alerted in the event of health related problems determined by the studies.

In some embodiments, user preferences (input by the user and stored as user preferences data 117c of FIG. 2E) can define one or more actions to initiate based upon detection of an MTMA 105, a plurality of MTMAs 105 (e.g., a sequence, total number, total time associated with the plurality, etc.), etc.

In some embodiments, the AD system 102 can be designed to initiate one or more actions based upon detection of an MTMA 105, a plurality of MTMAs 105 (e.g., a sequence, etc.), etc. in combination with detection of an event, a plurality of events (e.g., a sequence, etc.), etc. by the event detection engine 815 (FIG. 22B).

In some embodiments, the AD system 102 can be designed to initiate one or more actions based upon detection of an MTMA 105 or an MTMA transition and further detection of a WCD location. For instance, if the AD system 102 knows that a WCD user is in a parking lot and has just transitioned from riding to walking, then the AD system 102 may be designed to lock the motor vehicle door as the user walks away from the vehicle, automatically launch an application on the WCD 104 to pay for parking, etc.

In some embodiments, the AD system 102 can be designed to identify a proposed action, communicate the proposed action to the user, and request confirmation from the user that the action is appropriate, before initiating the proposed action.

In some embodiments, the AD system 102 can be designed to communicate information to a remote WCD 104 that indicates the identity of the MT 106 and/or the MTMA 105 associated with the local WCD 104, along with perhaps other information, for example, a location of the local WCD 104, so that the remote user can meet with the local user based upon the common MTMA 105.

In some embodiments, the AD system 102 can be designed to initiate a communication session with a remote communication device to request an action based upon the identification of an MTMA 105, a plurality of MTMAs 105, length of an MTMA 105, etc.

In some embodiments, the AD system 102 can be designed to initiate commencement of at least one of a sequence of steps for implementing an action based upon a contingent determination of an MTMA 105, and then later, if it is determined that the contingent MTMA 105 was incorrect, then cancel the action by stopping the commencement of further steps of the sequence.

In some embodiments, the AD system 102 (or the MTMAI system 101) may be designed to interject a delay period after detection of an MTMA 105 and commencement of an action. This would be desirable in embodiments where the initially detected MTMA 105 is determined to be erroneous at a later time, in which case the action item may be cancelled or changed.

In some embodiments, the AD system 102 (or the MTMAI system 101) may be designed to post to Facebook or Twitter, or insert a message in an email or text message indicating the MTMA 105 in which the sending party is involved. The posted or inserted message could be requested or could be set with user preferences 117c.

In some embodiments, the AD system 102 may be designed to adjust the driving settings of a motor vehicle based upon a detected MT ID of the driver who carries the WCD 104 with the sensor(s) 116.

In some embodiments, the AD system 102 may be designed to take an action based upon a variance in an MTMA 105. This can be detected by comparing current MTMA information with historical data 117b associated with historical MTMAs 105. For instance, consider a scenario where a WCD user is in a hurry as determined from the sensor data 96. In this case, the WCD may be equipped with program code that asks where the user is headed or what is the overall mission, and then further actions can be taken, such as finding the nearest hospital, checking traffic predicament data, checking biometric conditions of the user, initiating further communications to assist with the overall mission, etc.

T. Embodiments Employing MTMAI System And AD System

The following description sets forth various exemplary embodiments that employ both the MTMAI system 101, in whole or in part, and the AD system 102, in whole or in part, in order to detect one or more MTMAs 105 and/or one or more MTs 106, then initiate one or more intelligent ID-based and/or activity-based actions. It should be emphasized however that, although some specific examples of combined systems are set forth hereafter, any combination of embodiments of the MTMAI system 101 and the AD system 102 described elsewhere in this document are potentially combinable.

1. First Set of Embodiments

FIG. 24A is a flowchart of an example of a first set of embodiments, which involves selecting actions based upon user preferences. As shown in FIG. 24A, the first set of embodiments includes at least the following program code (or logic): program code 1201 designed to receive data from one or more sensors 116; program code 1202 designed to store user preferences (user preferences data 117c of FIG. 2E) defining an action to be initiated or taken when one or more MTMAs 105 (and/or MTs 106) are detected; program code 1203 designed to detect the one or more MTMAs 105 (and/or MTs 106) based upon the sensor data 96 from the one or more sensors 116; and program code 1204 designed to initiate or take an action based upon the detected one or more MTMAs 105 and the user preferences.

2. Second Set of Embodiments

FIG. 24B is a flowchart of an example of a second set of embodiments, which involves initiating an action based upon event detection while involved in an MTMA 105 and/or based upon event detection and specific MT detection. As shown in FIG. 24B, the second set of embodiments includes at least the following program code (or logic): program code 1211 designed to receive data from one or more sensors 116; program code 1212 designed to detect an MTMA 105 (and/or MT 106) based upon the sensor data 96 from the one or more sensors 116; program code 1213 designed to detect the one or more events in a local environment associated with the WCD 104 based upon environment data from the one or more sensors 116; and program code 1214 designed to initiate or take an action based upon the detected one or more MTMAs 105 (and/or one or more MTs 106) and the detected one or more events. In some embodiments, the events can be detected using the event detection engine 815 (FIG. 22B).

3. Third Set of Embodiments

FIG. 24C is a flowchart of an example of a third set of embodiments, which involves requesting user confirmation of an identified action. As shown in FIG. 24C, the third set of embodiments includes at least the following program code (or logic): program code 1221 designed to receive data from one or more sensors 116; program code 1222 designed to detect an MTMA 105 (and/or MT 106) based upon the sensor data 96 from the one or more sensors 116; program code 1223 designed to identify one or more actions to initiate or take, communicate the action to the user with an appropriate I/O device 120 (FIG. 2D), and request confirmation from the user that the action is permissible and/or appropriate; and program code 1224 designed to initiate or take the action based upon the detected one or more MTMAs 105 (and/or MTs 106) when the confirmation is received from the user.

In some embodiments, the action involves initiating and engaging in a communication session with a remote communication device to request an action.

4. Fourth Set of Embodiments

FIG. 24D is a flowchart of an example of a fourth set of embodiments, which involves detecting a plurality of the same or different MTMAs 105 (e.g., a sequence, number of instances, length of time associated with a plurality of the same MTMAs 105, etc.; and/or same or different MTs 106)) and initiating one or more actions based upon the detected plurality. As shown in FIG. 24D, the fourth set of embodiments includes at least the following program code (or logic): program code 1231 designed to receive data from one or more sensors 116; program code 1232 designed to detect a plurality of MTMAs 105 (and/or MTs 106) based upon the sensor data 96 from the one or more sensors 116; and program code 1233 designed to initiate one or more actions based upon the detected plurality of MTMAs 105 (and/or MTs 106).

In some embodiments, the program code 1233 may be designed with code that computes a value indicative of a number of MTMA sessions (and/or MT sessions), compares the value with a predefined threshold (which could be predefined with user preferences data 117c), and initiates the action based upon the comparison.

In some embodiments, the action involves initiating and engaging in a communication session with a remote communication device to request an action.

5. Fifth Set of Embodiments

FIG. 24E is a flowchart of an example of a fifth set of embodiments, which involves tracking the time period (or length of time) associated with one or more MTMAs 105 and/or MTs 106, and initiating an action based upon the time period. As shown in FIG. 24E, the fifth set of embodiments includes at least the following program code (or logic): program code 1241 designed to receive data from one or more sensors 116; program code 1242 designed to detect a time period associated with the one or more MTMAs 105 (and/or MTs 106) based upon the sensor data 96 from the one or more sensors 116; and program code 1243 designed to initiate one or more actions based upon the time period.

In some embodiments, the action involves initiating and engaging in a communication session with a remote communication device to request an action.

As a nonlimiting example, consider a scenario where the system is designed to place a purchase order for a new pair of running shoes after a user has run in excess of 500 hours.

6. Sixth Set of Embodiments

FIG. 24F is a flowchart of an example of a sixth set of embodiments, which involves a conditional selection of an action and permitting or cancelling the full completion of the action based upon subsequently received MTMA detection information and/or subsequently received MT detection. As shown in FIG. 24F, the sixth set of embodiments includes at least the following program code (or logic): program code 1251 designed to receive data from one or more sensors 116; program code 1252 designed to detect an MTMA 105 (contingent MTMA 105; and/or contingent MT 106) based upon the information that is currently available to make the decision; program code 1253 designed to request commencement of at least one of a sequence of steps or implementing an action based upon the detected contingent MTMA 105 (and/or detected contingent MT 106); and program code 1254 designed to, based upon a further analysis of the sensor data 96, conclude that the contingent MTMA 105 (and/or contingent MT 106) is incorrect and cancel the action by stopping the commencement of a further one or more steps of the sequence, or in the alternative, conclude that the contingent MTMA 105 (and/or contingent MT 106) is correct and permit completion of the one or more steps of the sequence.

In some embodiments, the action involves initiating and engaging in a communication session with a remote communication device to request an action.

As a nonlimiting example, consider a scenario where the system is designed to place a purchase order for a new pair of running shoes after a user has run in excess of 500 hours.

7. Seventh Set of Embodiments

FIG. 24G is a flowchart of an example of a seventh set of embodiments, which involves a conditional selection of an action and permitting or cancelling the full completion of the action based upon subsequently received MTMA detection information and/or subsequently received MT detection information. As shown in FIG. 24G, the seventh set of embodiments includes at least the following program code (or logic): program code 1261 designed to receive data from one or more sensors 116; program code 1262 designed to identify a first contingent MTMA 105 (and/or first contingent MT 106) and a second contingent MTMA 105 (and/or second contingent MT 106) based upon an initial analysis of the sensor produced data; program code 1263 designed to initiate or otherwise request commencement of at least one of a first sequence of first steps for implementing a first action based upon the determined first contingent MTMA 105 (and/or first contingent MT 106); program code 1264 designed to initiate or otherwise request commencement of at least one of a second sequence of second steps for implementing a second action based upon the determined second contingent MTMA 105 (and/or second contingent MT 106); program code 1265 designed to, based upon a further analysis of the sensor produced data, (a) determine that the first contingent MTMA 105 (and/or first contingent MT 106) was incorrect, cancel the first action by stopping the commencement of a further one or more first steps of the first sequence, and permit the second action to be implemented, or in the alternative, (b) determine that the first contingent MTMA 105 (and/or first contingent MT 106) was correct and permit commencement of the remaining first steps of the first action to permit completion of same, while cancelling the second action by stopping the commencement of the remaining second steps of the second sequence. Note that, in some embodiments, the first and second actions can be commenced substantially concurrently. Furthermore, in some embodiments, the permission and cancellation of actions can occur substantially concurrently In some embodiments, the detection of the first and second contingent MTMAs 105 (and/or MTs 106) may be based upon probabilities that are derived for each MTMA 105 (and/or each MT 106) and a predefined threshold.

In some embodiments, the program code 1265 may be designed to select which action to permit and which action to cancel based upon probabilities of each that have been later computed or received.

8. Eighth Set of Embodiments

FIG. 24H is a flowchart of an example of an eighth set of embodiments, which involves interception of a communication attempt to the WCD 104 and determining whether to permit or prevent consummation of the communication session based upon a detected MTMA 105 and/or detected MT 106. As shown in FIG. 24H, the eighth set of embodiments includes at least the following program code (or logic): program code 1271 designed to receive a request (or indication) from a requestor to engage in a communication session with the WCD 104 associated with the MT 106; program code 1272 designed to detect an MTMA 105 pertaining to the MT 106 associated with the WCD 104 (and/or ID of the MT 106) from the plurality of possible MTMAs 105 (and/or MTs 106), based at least in part upon an analysis of sensor data 96 from one or more sensors 116 associated with the WCD 104; and program code 1273 designed to determine whether to permit or prevent (at least initially) (a) consummation of the communication session, (b) an alert associated with the attempted communication session, or (c) both (a) and (b), based at least in part upon the detected MTMA 105 (and/or MT 106).

The request observed by the program code 1271 can be any data indicative of an incoming telephone call, an incoming text message, an incoming email, etc.

The program code 1272, which is designed to detect the MTMA 105 (and/or MT 106), is architected using any of the methodologies described elsewhere in this document.

The program code 1273 may be designed to use an algorithm 115 (FIG. 2D) to assist in its decision-making process.

The program code 1273 may be designed to access user preferences data 117c (FIG. 2E) to assist in its decision making process. As an example, the user may input a preference that indicates that the user is to receive no communications or alerts while jogging. Or, as another example, the user might input user preference data 117c that indicates that the user should receive incoming telephone calls while driving, but not emails or text messages.

In some embodiments, program code is provided and designed to, when the detection of the MTMA 105 (and/or MT 106) terminates or after a predefined time period after the detection of the MTMA 105 (and/or MT 106) terminates, produce a local alert (e.g., a displayed message on the screen, etc.) with the WCD 104 that advises the WCD user of the missed communication session and an identity (e.g., telephone number or name associated with an incoming call or text message, etc.) of the requestor. The foregoing features could also be activated and/or predefined by user preferences data 117c (FIG. 2E).

In some embodiments, program code is provided and designed to communicate a message to the remote requestor indicating that the communication session is being prevented and perhaps even a reason why. The MTMA 105 in which the MT 106 is involved could also be communicated to the requestor. As an example, a prerecorded message could be sent to a caller that explains that the called party cannot speak at the present time because the called party is running, driving, etc.

In some embodiments, program code is provided and designed to, when the positive detection of the MTMA 105 (and/or MT 106) terminates or after a predefined time period after the detection of the MTMA 105 (and/or MT 106) terminates, produce a local alert with the WCD 104 that advises a WCD user of the missed communication session and an identity of the requestor.

In some embodiments, program code is provided and designed to enable the requestor to provide one or more inputs that cause the WCD 104 to automatically alert or initiate a communication session with the WCD user when or a specified time period after the positive detection of the MTMA 105 (and/or MT 106) terminates. As an example, keystroke or voice recognition software can be employed to communicate such information with a voice band caller.

In some embodiments, program code is provided and designed to communicate a message to the requestor indicating a manner in which the request may be fulfilled, despite the initial prevention. For example, the message may indicate a number of times in which the requestor should make future requests in order for the communication session to be consummated. As another example, the message may indicate a time period in which the requestor should wait before initiating another request to engage in another communication session with the WCD 104. As yet another example, the message could indicate a ring cadence to be employed in a first future request in order for the communication session to be consummated in connection with a second future request.

In some embodiments, program code is provided and designed to store requestor identification data 117f (FIG. 2E; telephone number, email address, text message identifier, etc.) in MT/MTMA database 119 or elsewhere in memory 102 (FIG. D), compare received requestor identification information associated with the request with the stored requestor identification data 117f, and perform the preventing at least in part upon the comparison.

In some embodiments, program code is provided and designed to communicate a message to the requestor indicating a different communication method that can be employed to communicate with the WCD 104 or the user of the WCD 104. For example, the message may advise the requestor to call a different telephone number, to send an email (and perhaps indicate an email address), to send a text message (and perhaps indicate a number to send the message), etc.

In some embodiments, program code is provided and designed to, prevent the communication session, at least initially, and then, after detecting an event (See Section XI herein), permit communication with the WCD 104.

In some embodiments, program code is provided and designed to communicate an alert to a user of the WCD 104, and enable the user to enter one or more inputs to the WCD 104 that will cause permission or prevention of the communication session, notwithstanding the detected MTMA 105 (and/or MT 106).

In some embodiments, the program code 1273 may be designed to prevent consummation of the communication session based upon a detected MTMA 105 (and/or MT 106) and to select and initiate a notification method to notify or communicate to the user or the user's designee. The notification methods can include, for example but not limited to, engaging in a telephone communication session with a different communication device; engaging in a voicemail communication session; engaging in a voicemail communication session within a particular voicemail queue; or forwarding the incoming request to another telephone number, email address, or text address. In yet other embodiments, the program code 1273 is designed to cause translation of a voice call or message into a text message or email message, using conventional translation software and then forward same to a text address or email address, respectively. An example of a translation system that could be utilized is described in U.S. Pat. No. 8,139,726, which is incorporated herein by reference in its entirety.

9. Ninth Set of Embodiments

FIG. 24I is a flowchart of an example of a ninth set of embodiments, which involves causing an advertisement 107 (FIG. 2D) to be communicated to a user of the WCD 104 based upon the detected MTMA 105 and/or MT 106. As shown in FIG. 24I, the ninth set of embodiments includes at least the following program code (or logic): program code 1281 designed to detect an MTMA 105 pertaining to the MT 106 associated with the WCD 104 (and/or an ID for the MT 106), based at least in part upon an analysis of sensor data 96 from one or more sensors 116 associated with the WCD 104, and causing an advertisement 107 to be communicated to the user of the WCD 104 based at least in part upon the detected MTMA 105 (and/or detected MT 106). The advertisement can be communicated to the user from the WCD itself or another communication device. The advertisement can be sent to the user via email, text message, telephonic voice message, etc.

As an example, it may be determined that the MTMA 105 is running and/or that the MT 106 is a person that is a runner. Further, an advertisement pertaining to runners could then be selected and communicated to the user of the WCD 104 while the user is running. The advertisement can be selected remotely and then communicated to the WCD 104, or selected locally on the WCD 104 and then communicated to the user.

These embodiments may be provided with program code that is designed to select the advertisement based, in whole or in part, upon the detected MTMA 105 (and/or MT 106). More specifically, other sensor data 96 may also be considered in selecting the advertisement, for example but not limited to, a location of the WCD 104 so that the selecting is further based upon the location in addition to the detected MTMA 105 (and/or MT 106).

In some embodiments, a party (such as a telephone company, network service provider, etc.) may be involved in the selection and/or communication of the advertisement to the user. In this case, such party may receive a payment for or otherwise monetarily benefiting from causing the advertisement to be communicated. In further embodiments of this nature, such party could enable an advertiser to communicate the advertisement directly to the WCD 104 by advising an RCS 90 associated with the advertiser of WCD identification information (e.g., telephone number, email address, etc.) and MTMA identification information (and/or MT identification information.

In some embodiments, program code is provided and designed to enable a user of the WCD 104 to enable and disable the receipt of an advertisement(s).

10. Tenth Set of Embodiments

FIG. 24J is a flowchart of an example of a tenth set of embodiments, which involves activating and/or deactivating one or more programs and/or subsystems associated with the MCD 104 based upon the detected MTMA 105 and/or detected MT 106. As shown in FIG. 24J, the tenth set of embodiments includes at least the following program code (or logic): program code 1291 designed to detect an MTMA 105 pertaining to the MT 106 associated with the WCD 104 (and/or detect an ID of the MT 106), based at least in part upon an analysis of sensor data 96 from one or more sensors 116 associated with the WCD 104, and program code 1292 designed to activate, deactivate, or change an operational characteristic of one or more programs and/or subsystems based at least in part upon the detected MTMA 105 (and/or detected MT 106).

There are many possible scenarios that could involve these embodiments. An example would be to deactivate a power consuming program and/or subsystem (GPS receiver, WiFi transceiver, Bluetooth transceiver, cellular transceiver, texting engine, a smartphone function, any programs in or supporting any of the foregoing subsystems, etc.) to preserve battery power. Another example would be to activate a timer when it is determined that MT 106 is running in order to track the length of the run in terms of time. Yet another example would be tracking distance travelled while driving in a motor vehicle using a GPS receiver. Still another example would be, in the context of running, to play music, to play music that substantially matches the cadence of the running motion, etc.

In some embodiments, a confirmation request can be communicated to the WCD user to enable the user to confirm whether or not to activate and/or deactivate a program or subsystem. See section VI herein, involving confirmation techniques.

In some embodiments, an operational characteristic of a map program is changed. The operational characteristic can be the type of information associated with a map image. For example, when a person transitions from riding in a motor vehicle to walking, the map image can be changed so that the image is more appropriate for walking. The map image associated with riding in a motor vehicle may show gas stations, etc., while the map image associated with walking may show restaurants, bars, etc. The operational characteristic could also be the scale of the image. A higher scale (a larger distance per unit of length in the map image) could be associated with riding as opposed to walking.

11. Eleventh Set of Embodiments

FIG. 24K is a flowchart of an example of an eleventh set of embodiments, which involves using sensor data 96 to identify both a WCD user and a change in the WCD user. As shown in FIG. 24K, the eleventh set of embodiments includes at least the following program code (or logic): program code 1301 designed to produce sensor data 96 with or receive sensor data 96 from the one or more sensors 116 associated with the WCD 104, the sensor data 96 indicative of movement of the WCD 104; program code 1302 designed to establish identification data for the user based upon the sensor data 96; and program code 1303 designed to determine whether the WCD 104 is in possession of the user based upon whether a change occurs in the identification data. The aforementioned code can be implemented on the WCD 104 itself, on a computer system that is remote from the WCD 104, or on a combination of the forgoing. Furthermore, it is possible to determine an identity of a human being user with accelerometer data alone. However, it may be desirable in many instances to determine the identity with assistance from gyroscope data, audio data from a microphone, location data, and/or other sensor data 96.

U.S. Pat. No. 8,391,445, U.S. Pat. No. 8,315,876, and International Application No. PCT/EP2011/053700, which are incorporated herein by reference in their entirety, describe examples of voice recognition systems, any of which can be employed by the MTMAI system 101 of this disclosure to identify or assist in identifying the MT 106 using audio data from a microphone 116 (FIG. 2D).

The identification of the MT can be any indicia that delineates the MT separately from others. An MT reference signature 117g that defines the characteristics of an MT 106 is stored by program code 1302 and monitored by program code 1303 in the database 119 (FIG. 2E). The stored MT reference signatures are compared, for example, with mathematical correlation in the time domain, the frequency domain, or both, with currently sensed reference signatures in order to determine if a change has occurred.

In some embodiments, a confidence value (e.g., correlation value, probability, etc.) is produced by an algorithm 113 that is indicative of an extent of correspondence of the currently sensed data to an MT reference signature. When the confidence value exceeds a predefined threshold, then the code 1302 and/or code 1303 concludes that they match and adopts the ID associated with the MT reference signature. As an example of a correlation process, refer to Section H herein.

An identification in the form of a motor vehicle may be, for example but not limited to, a type of vehicle, a license plate number, a specific vehicle identification number (VIN), etc. An ID for an MT in the form of a person may be, for example but not limited to, the name of the person, a social security number, a bank account number, a credit card number, a pseudo name, such as "User 1" or "Anonymous 1," a fingerprint data, a code name, etc.

The program code 1303 is designed to determine whether the change occurs in the identification data based upon detection of or transition of an MTMA 105 associated with the user.

In some embodiments, the program code is supplemented with POS verification code that causes a financial account transaction (in connection with a credit card account, debit card account, bank account, etc.) at a POS device involving the purchase of a good and/or service to be either permitted or prevented. In essence, the transaction is permitted when the WCD 104 is in the possession of the user that corresponds with, or is authorized to use, the financial account and is prevented when the WCD 104 is not in possession of the user, but in the possession of a person that does not correspond with, or is not authorized to use, the financial account sought to be used in the transaction. This configuration involving POS devices will be described in further detail later in this disclosure.

12. Twelfth Set of Embodiments

FIG. 24L is a flowchart of an example of a twelfth set of embodiments, which involves determining identification of an MT 106 that transports a WCD 104 with sensor data 96 that is indicative of changes in physical orientation of the WCD 104 in three dimensional space, such as a three dimensional coordinate system. As shown in FIG. 24L, the twelfth set of embodiments includes at least the following program code (or logic): program code 1311 designed to produce or receive sensor data 96 with one or more sensors 116 (e.g., accelerometer data, gyroscope data, etc.) associated with the WCD 104, the sensor data 96 indicative of physical movement of the WCD 104 in three dimensional (3D) space, the sensor data 96 including data sets comprising three movement values and a corresponding time value, each of the three movement values indicative of physical movement of the WCD 104 relative to a respective axis of a 3D coordinate system (orthogonal) at the time value; and program code 1312 designed to determine an identification of the MT 106 of the WCD 104 based at least in part upon the sensor data 96. It should be noted that the data sets can also be mapped into a different type of mathematical coordinate system, such as a polar coordinate system. The foregoing code can be implemented on the WCD 104 itself, on a computer system that is remote from the WCD 104, or on a combination of the forgoing. Furthermore, it is possible to determine an identity of a human being user with accelerometer data alone. However, it may be desirable in many instances to determine the identity with assistance from gyroscope data, microphone data, location data, and/or other sensor data 96.

The program code 1312 can be designed to determine the ID by comparing and matching (within a predefined level of accuracy) the sensor data 96 or derivative thereof with one or more MT reference signatures in a database (remote or local). The code 1312 can be designed to analyze one or more statistical characteristics of the sensor data 96 in the time domain, frequency domain, or both, in order to establish the identification. Furthermore, the program code 1312 can be designed to determine that the MT 106 is no longer transporting the WCD 104 based at least in part upon a comparison of current sensor data 96 with the MT reference signatures.

The program code 1312 can be designed to determine a mathematical relationship between different data sets to enable analysis of the different data sets in the 3D coordinate system (see normalization methods, including the rotation matrix, as previously discussed) and to determine the identification based at least in part upon the analysis of the different data sets in the 3D coordinate system.

In some embodiments, the MT 106 is a human being user, and other program code may be provided that interacts with program code 1312 in order to, based at least in part upon the identification, determine whether or not the user is authorized to use a financial account sought to be used in connection with a financial transaction at a point of sale (POS) device, or terminal, for example but not limited to, an electronic cash register, peripheral devices communicatively coupled to same, etc., involving a purchase a good and/or service. This other program code can be designed to cause the financial transaction to be permitted when the user is authorized and to cause the financial transaction at the POS device to be prevented when the user is not authorized. This configuration involving POS devices will be described in further detail in the next section of this disclosure.

13. Thirteenth Set of Embodiments

FIG. 24M and FIG. 24O are a flowchart and block diagram, respectively, of an example of a thirteenth set of embodiments, which involves a fraud prevention system 1293. In general, a transaction (e.g., credit card charge, debit card charge, bank account charge or withdrawal, entry of a person into the U.S., etc.) at an ID verification device (IDVD) 1294, for example but not limited to, a point of sale (POS) device, an electronic cash register, credit, debit or other card swipe device, automated teller machine (ATM), passport scanner or reader, etc., is verified by using ID information determined by one or more sensors 116 associated with the WCD 104 that is transported by a user (MT 106). As an example, FIG. 24O illustrates a credit card 1295 being used by a user at the IDVD 1294 in the form of a POS device. In essence, these embodiments involve verifying that the movement characteristics of a user (MT 106) of the WCD 104 match user account information at the POS device 1294.

As shown in FIG. 24M, the thirteenth set of embodiments includes at least the following program code (or logic): program code 1315 designed to access identification information from an ID apparatus transported by the user with an IDVD 1294; program code 1316 designed to access sensor information derived from one or more sensors associated with the WCD that is transported by the user; and program code 1317 designed to determine whether the sensor data 96 (or sensor information) corresponds, or matches or is consistent, with the ID information. The aforementioned code can be implemented on the WCD 104 itself, on one or more computer systems that are remote from the WCD 104, or on any combination of the foregoing.

The identification information can be any MT ID, as previously defined. The ID apparatus can be, for example but not limited to, a credit, ATM, or debit card, passport, etc. The ID information can be accessed from, for example but not limited to, an RFID tag, magnetic stripe, microchip, memory associated with a smartphone (e.g., read via near field communication (NFC), etc.

When the IDVD 1294 is a POS device, further program code may be provided to permit a financial transaction at the POS device for purchase of a good and/or service by the user when a determination is made that the sensor information corresponds to the ID and to prevent the financial transaction at the POS device for the purchase of the good and/or service by the user when a determination is made that the sensor information does not correspond to the ID. The aforementioned can be accomplished by engaging in a communication session with the appropriate computer system that approves or disapproves the transaction at the POS device.

14. Fourteen Set of Embodiments

FIG. 24N and FIG. 24O are a flowchart and block diagram, respectively, of an example of a fourteenth set of embodiments, which involves another fraud prevention system 1293. In general, as mentioned previously a transaction (e.g., credit card charge, debit card charge, bank account charge or withdrawal, entry of a person into the U.S., etc.) at an IDVD 1294, for example but not limited to, a POS device, an electronic cash register, credit, debit or other card swipe device, ATM, passport scanner or reader, etc., is verified by using ID information determined by one or more sensors 116 associated with the WCD 104 that is transported by a user (MT 106). As an example, FIG. 24O illustrates a credit card 1295 being used by a user at the POS device 1294. In essence, these embodiments involve verifying that the movement characteristics of a user (MT 106) of the WCD 104 match user account information at the POS device 1294.

As shown in FIG. 24N, the fourteenth set of embodiments includes at least the following program code (or logic): program code 1321 designed to produce, receive, or access sensor data 96 with one or more sensors 116 associated with the WCD 104; program code 1322 designed to store historical data 117*b* (FIG. 2E) based upon the produced sensor data 96 in the past; program code 1323 designed to establish ID data for the user (any MT ID, as previously defined) based upon the historical data 117*b*; program code 1324 designed to, based upon the ID data, verify whether the WCD 104 is in the possession or close proximity of the correct user during the transaction (e.g., an attempted purchase of a good and/or service by the user (MT 106) at the POS device 1294 involving a financial account (e.g., credit card account, debit card account, bank account, etc.) associated with the user). The aforementioned code can be implemented on the WCD 104 itself, on a computer system that is remote from the WCD 104, or on a combination of the foregoing.

The program code 1324 can be designed to permit the transaction at the IDVD device 1294 when the WCD 104 is verified as being in close proximity of the user and to prevent the transaction at the IDVD device 1294 when the WCD 104 is not verified as being in close proximity of the user.

In some embodiments, the ID of the user is identified by MTMAs 105 associated with the user prior to and/or during the verification process.

15. Fifteenth Set of Embodiments

FIGS. 24P and 24Q illustrate a flowchart and block diagram, respectively, of an example of a fifteenth set of embodiments, which involves associating a detected MTMA 105 and/or ID of the MT 106 with a media file 1330. The media file is any image, audio, and/or video file that can be stored on a device having a computer-based architecture. Examples of which are way, mp3, mpeg, avi, or aiff files. As shown in FIG. 24O, in the fifteenth set of embodiments, the MTMAI system 101 and/or AD system 102 includes at least the following program code (or logic): program code 1331 designed to detect or receive the MTMA 105 (and/or ID of the MT 106), using any of the methods of detection as described in this disclosure; program code 1332 designed to capture or retrieve a media file 1330; and program code 1333 designed to associate metadata 1334 (e.g., descriptive metadata) with the media file 1330 that is indicative of the MTMA 105 (and/or MT 106) associated with the WCD 104. The program code 1331 can be detected before, during, or after the media file 1330 is captured or retrieved. Or, in some embodiments, the MTMA 105 (or MT 106) can be determined as the predominant MTMA 105 (or MT 106) over a time period that includes the time when the media file 1330 is captured or retrieved.

As illustrated in FIG. 2D, the media file 1330 can be stored in memory(ies) 102 of the WCD 104. The media file 1330 could also be captured by the WCD 104 or a different WCD 104, and then stored in a remote memory associated with an RCS 90 by way of TX/RX 114. The program code 1332, which is designed to capture or retrieve a media file 1330, can access the media file 1330 from one of these memories.

The program code 1333, which is designed to associate metadata 1334 with the media file 1330 that is indicative of the MTMA 105 (and/or MT 106) associated with the WCD 104, can be designed to create and add metadata or change or supplement existing metadata associated with the media file 1330.

Other data can also be associated with the metadata 1334, including geographic location information associated with the MT 106.

Many possible applications are envisioned. As an example, consider a human being MT 106. When the MT ID is associated with a set of media files 1330, the media files 1330 can be searched by the name of the person who captured the media files 1330. As another example, when the MTMA 105 is associated with a media file 1330, more specific algorithms for filtering and improving the media content can be employed. For instance, a first filter can be derived for optimizing video content while the MT 106 is motor vehicle driving, while a second filter can be derived for optimizing video content while the MT 106 is running.

U. Variations, Modifications, and Other Possible Applications

It should be emphasized that the above-described "embodiments" of the present invention, particularly, any "preferred" embodiments, are merely possible nonlimiting examples of implementations, merely set forth for conveying a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

With respect to variations, note that although one or more elements of one embodiment may not be described in connection with another, the elements can typically be employed in the other embodiment.

As another example of a variation, the calculations for identifying the MTMA 105 and/or MT 106 may rely on the raw readings from the accelerometer along the three axes or the combined net acceleration in the horizontal direction, or total net acceleration. That is, the data may be manipulated into a different form, such as rotation about the axes (similar to gyroscope data).

As yet another example of a variation, in some embodiments, the MTMA 105 and/or MT 106 may be identified without the normalization process of the present disclosure with a one axis, two axis, or three axis accelerometer. As a nonlimiting example, if the MTMAs 105 to be identified are standing and moving, this can be determined from analyzing the raw accelerometer data without rotating or otherwise normalizing the data by merely reviewing the data for a change, which would indicate movement and a non-change, which would indicate standing. However, as more MTMAs 105 are added to the list of those that need to be identified, the normalization process of the present disclosure becomes more desirable because it enables more accurate analysis of acceleration data and therefore MTMA identification.

As still another variation, when an MTMA 105 and/or MT 106 is "detected" as mentioned in connection with many embodiments, this can be changed to a transition to or a transition from the MTMA 105 in alternative embodiments (as opposed to current detection of the MTMA 105 and/or MT 106).

As yet another variation, in some embodiments, the MTMAI and AD systems 101, 102 associated with a WCD 104 can learn a WCD owner's one or more MTMAs 105 (and/or ID of the MT 106) and then make a determination that the WCD 104 has been stolen, in which case, a remedial action(s) can be initiated, such as deactivating the WCD 104, purging data stored on or in connection with the WCD 104, etc. For example, the MTMAI may identify an owner's particular walking style, and then detects that another person is carrying the WCD 104.

As yet another variation, in some embodiments, sensor data 96, perhaps accelerometer data, from a plurality of WCDs 104, perhaps on a mass scale, is uploaded to a RCS(s) 90, perhaps in the cloud, where the data is analyzed and detections/actions are taken based upon the collective analysis of the data.

V. Appendix

The following is a nonlimiting example of source code (in Python code) that can be employed to implement the fourth set of embodiments of the MTMAI system (that employs normalization) of FIG. 7 in order to identify a most probable MTMA 105.

At least the following is claimed:

1. A system, comprising:
a transceiver;
one or more sensors designed to produce data indicative of movement of the wireless communication device (WCD) in three dimensions of three dimensional (3D) space, the one or more sensors including at least an accelerometer and the produced data including accelerometer data;
a memory that stores computer program code;
a processor that executes the computer program code; and
wherein the computer program code comprises:
code operable to store user preferences in the memory that are selected or otherwise input by a user of the WCD, the user preferences defining a set of mobile thing motion activities (MTMAs) to detect, the user preferences also defining a predefined time or distance threshold for a specific MTMA of the defined set, the user preferences further defining an action to be intiated when one or more occurrences of the specific MTMA have exceeded the predefined time or distance threshold, the action involving initiation of a communication session involving one or more data transfers with a remote computer system via the transceiver and initiation of a purchase of a good or service during the communication session;
code operable to track a duration, in terms of time or distance, of the one or more occurences of the specific MTMA based at least upon the data from the one or more sensors; and
code operable to initiate the action involving the purchase of the good or service when the occurences exceed the predefined time or distance threshold.

2. The system of claim 1, wherein the program code further comprises code operable to determine respective likelihoods for each of the MTMAs of the set based at least in part upon the data and operable to select one of the MTMAs of the set as detected based at least in part upon the respective likelihoods.

3. The system of claim 1, wherein the computer program code further comprises code operable to request the user to confirm whether or not to purchase the good or service prior to initiating the action.

4. The system of claim 1, wherein the system is implemented within the WCD.

5. The system of claim 1, wherein the system is implemented at a computer system that is remote from the WCD.

6. A wireless communication device (WCD), comprising:
a transceiver;
one or more sensors designed to produce data indicative of movement of the WCD in three dimensions of three dimensional (3D) space;
a memory that stores computer program code;
a processor that executes the computer program code; and
wherein the computer program code comprises:
code operable to store a user preference in the memory that is input or selected by the user, the user preference defining an action to be taken when one or more mobile thing motion activities (MTMAs) associated with a WCD user are detected, the action involving initiation of a communication session involving one or more data transfers with a remote computer system via the transceiver and initiation of a purchase a good or service during the communication session;
code operable to detect the one or more MTMAs based at least upon the produced sensor data from the one or more sensors; and
code operable to initiate the action based at least upon the detected one or more MTMAs and the user preference.

7. The WCD of claim 6, wherein the one or more MTMAs are a plurality of instances of the same MTMA.

8. The WCD of claim 7, wherein the computer program code further comprises code operable to monitor a total time duration or a total travel distance associated with the plurality and to cause the initiate code operable to initiate the action when the total duration exceeds a predefined threshold.

9. The WCD of claim 8, wherein the store code stores another user preference that defines the predefined threshold and that is input or selected by the user.

10. The WCD of claim 6, wherein the one or more MTMAs include at least two different MTMAs.

11. The WCD of claim 7, wherein the computer program code further comprises code operable to request the user to confirm whether or not to purchase the good or service prior to initiating the action.

12. A computer system that communicates with a remote wireless communication device (WCD) transported by a mobile thing (MT), comprising:
- a transceiver;
- a memory that stores computer program code;
- a processor that executes the computer program code; and
- wherein the computer program code comprises:
  - code operable to receive and store sensor information from the WCD in memory;
  - code operable to receive and store a user preference in the memory that is input or selected by a user, the user preference defining an action to be taken when one or more mobile thing motion activities (MTMAs) associated with the MT are detected, the action involving initiation of a communication session involving one or more data transfers with a remote computer system via the transceiver and initiation of a purchase a good or service during the communication session;
  - code operable to detect the one or more MTMAs based at least upon the sensor information; and
  - code operable to initiate the action based at least upon the detected one or more MTMAs and the user preference.

13. The system of claim 12, wherein the one or more MTMAs are a plurality of instances of the same MTMA.

14. The system of claim 13, wherein the computer program code further comprises code operable to monitor a total time duration or a total travel distance associated with the plurality and to cause the initiate code operable to initiate the action when the total duration exceeds a predefined threshold.

15. The system of claim 14, wherein the user preference store code stores another user preference that defines the predefined threshold and that is input or selected by the user.

16. The system of claim 12, wherein the one or more MTMAs include at least two different MTMAs.

17. The system of claim 12, wherein the computer program code further comprises code operable to engage in a communication session involving one or more data transfers and, during the session, request the user to confirm whether or not to purchase the good or service prior to initiating the action.

18. A method implemented in a computer system, comprising:
- analyzing information derived from sensor data, the sensor data from one or more sensors designed to produce data indicative of movement of a wireless communication device (WCD) in three dimensions of three dimensional (3D) space;
- storing a user preference in a memory that is input or selected by a user of the WCD, the user preference defining an action to be initiated when one or more mobile thing motion activities (MTMAs) associated with the user are detected, the action involving initiating a process for a purchase of a good or service during a communication session;
- detecting the one or more MTMAs based at least upon the analysis; and
- initiating the action based at least upon the detected one or more MTMAs and the user preference.

19. The method of claim 18, wherein the one or more MTMAs are a plurality of instances of the same MTMA.

20. The method of claim 19, further comprising monitoring a total duration of the plurality and initiating the action when a total time duration or total travel distance exceeds a predefined threshold.

21. The method of claim 20, further comprising storing another user preference in the memory that defines the predefined threshold and that is input or selected by the user.

22. The method of claim 18, wherein the one or more MTMAs include at least two different MTMAs.

23. The method of claim 18, further comprising engaging in a communication session involving one or more data transfers and, during the session, requesting the user to confirm whether or not to purchase the good or service.

24. The method of claim 18, wherein the computer system resides within the WCD and wherein the method is performed by computer program code that is stored in the memory and executed by a processor residing within the WCD.

25. The method of claim 18, wherein the computer system resides remotely from the WCD, wherein the remote computer system communicates with the WCD via one or more networks, and wherein the method is performed by computer program code that is stored in the memory and executed by a processor residing within the remote computer system.

26. The method of claim 18, wherein the one or more sensors includes an accelerometer and further comprising:
- storing parameters that define a plurality of mobile thing motion activities (MTMAs) that can be performed by the user associated with the WCD;
- determining respective likelihoods for the MTMAs based at least in part upon accelerometer data and the stored parameters; and
- selecting an MTMA as detected in the set of MTMAs based at least in part upon the respective likelihoods.

27. The method of claim 26, further comprising enabling the user to define the plurality of MTMAs by selecting or inputing user preferences.

28. The method of claim 26, further comprising:
- outputting the selected MTMA to the user of the WCD; and
- requesting confirmation from the user that the selected MTMA is correct.

* * * * *